United States Patent
Blakey et al.

(10) Patent No.: US 12,052,175 B2
(45) Date of Patent: Jul. 30, 2024

(54) CONTROLLING A DESTINATION OF NETWORK TRAFFIC

(71) Applicant: SNAPT, INC, San Jose, CA (US)

(72) Inventors: David Michael Blakey, Cape Town (CA); Mark Graeme Trent, Cape Town (CA); Willem Nicolaas Van Der Schyff, Cape Town (CA)

(73) Assignee: SNAPT, INC, San Jose, CA (US)

( * ) Notice: Subject to any disclaimer, the term of this patent is extended or adjusted under 35 U.S.C. 154(b) by 10 days.

(21) Appl. No.: 17/628,845

(22) PCT Filed: Jul. 24, 2020

(86) PCT No.: PCT/IB2020/057014
§ 371 (c)(1),
(2) Date: Jan. 20, 2022

(87) PCT Pub. No.: WO2021/014419
PCT Pub. Date: Jan. 28, 2021

(65) Prior Publication Data
US 2022/0272041 A1    Aug. 25, 2022

Related U.S. Application Data

(60) Provisional application No. 62/878,625, filed on Jul. 25, 2019.

(51) Int. Cl.
*H04L 47/125*    (2022.01)
*G06F 9/50*    (2006.01)
(Continued)

(52) U.S. Cl.
CPC .......... *H04L 47/125* (2013.01); *G06F 9/5022* (2013.01); *G06F 9/5083* (2013.01);
(Continued)

(58) Field of Classification Search
CPC ..... G06F 9/5022; G06F 9/5083; H04L 67/61; H04L 43/0817
See application file for complete search history.

(56) References Cited

U.S. PATENT DOCUMENTS 10,055,262 B1 * 8/2018 Thomas ............... G06F 9/5083
2002/0174010 A1    11/2002 Rice, III
(Continued)

OTHER PUBLICATIONS

Cloudflare, Inc., "What is Anycast DNS?" Mar. 30, 2019, retrieved on [Oct. 26, 2020]. Retrieved from the internet <URL: https://web.archive.org/web/20190330165714/https://www.cloudflare.com/learning/dns/what-is-anycast-dns/>.
(Continued)

*Primary Examiner* — Barbara B Anyan
(74) *Attorney, Agent, or Firm* — Womble Bond Dickinson (US) LLP

(57) ABSTRACT

There is provided a system and method for controlling network traffic. The method is conducted at a destination controller accessible by a server computer. Telemetry data is received by the destination controller from a plurality of network nodes managed by the server computer. A data transfer request originating from a user device is received by the destination controller. The destination controller accesses a list of stored network node addresses and applies one or more rules to the list of network node addresses to identify a network node address pointing to a network node for handling network traffic originating from the user device that generated the data transfer request. The network node identified by the destination controller then services the data transfer request, and transmits updated telemetry data of the network node to the destination controller where the list is updated.

18 Claims, 46 Drawing Sheets

(51) Int. Cl.
*H04L 43/062* (2022.01)
*H04L 43/0817* (2022.01)
*H04L 47/762* (2022.01)
*H04L 47/80* (2022.01)
*H04L 67/61* (2022.01)

(52) U.S. Cl.
CPC ........ *H04L 43/062* (2013.01); *H04L 43/0817* (2013.01); *H04L 47/762* (2013.01); *H04L 47/803* (2013.01); *H04L 67/61* (2022.05)

(56) References Cited

U.S. PATENT DOCUMENTS

| | | |
|---|---|---|
| 2004/0264481 A1 | 12/2004 | Darling et al. |
| 2009/0193414 A1 | 7/2009 | Broussard et al. |
| 2010/0023621 A1 | 1/2010 | Ezolt et al. |
| 2011/0019675 A1 | 1/2011 | Hellwig et al. |
| 2011/0283013 A1 | 11/2011 | Grosser et al. |
| 2011/0314517 A1 | 12/2011 | Yamato et al. |
| 2012/0259986 A1 | 10/2012 | Rozinov et al. |
| 2013/0268646 A1 | 10/2013 | Doron et al. |
| 2014/0007157 A1 | 1/2014 | Harrison et al. |
| 2014/0184910 A1* | 7/2014 | Bailey ............. H04N 21/42208 348/554 |
| 2014/0304414 A1 | 10/2014 | Yengalasetti et al. |
| 2014/0304704 A1 | 10/2014 | Kruglick |
| 2017/0264588 A1 | 9/2017 | Hunt et al. |
| 2018/0288138 A1 | 10/2018 | Venkiteswaran et al. |
| 2018/0359177 A1* | 12/2018 | Sorenson, III ...... H04L 43/0817 |
| 2019/0199790 A1 | 6/2019 | Yang et al. |
| 2019/0373053 A1* | 12/2019 | Ferraro .................. H04L 67/61 |
| 2020/0310881 A1* | 10/2020 | Gonzalez ............. G06F 9/5022 |
| 2021/0193305 A1* | 6/2021 | Junker ............. G06Q 10/06312 |

OTHER PUBLICATIONS

Extended European Search Report dated Jul. 18, 2022, in corresponding European Application No. 20845011.4.

* cited by examiner

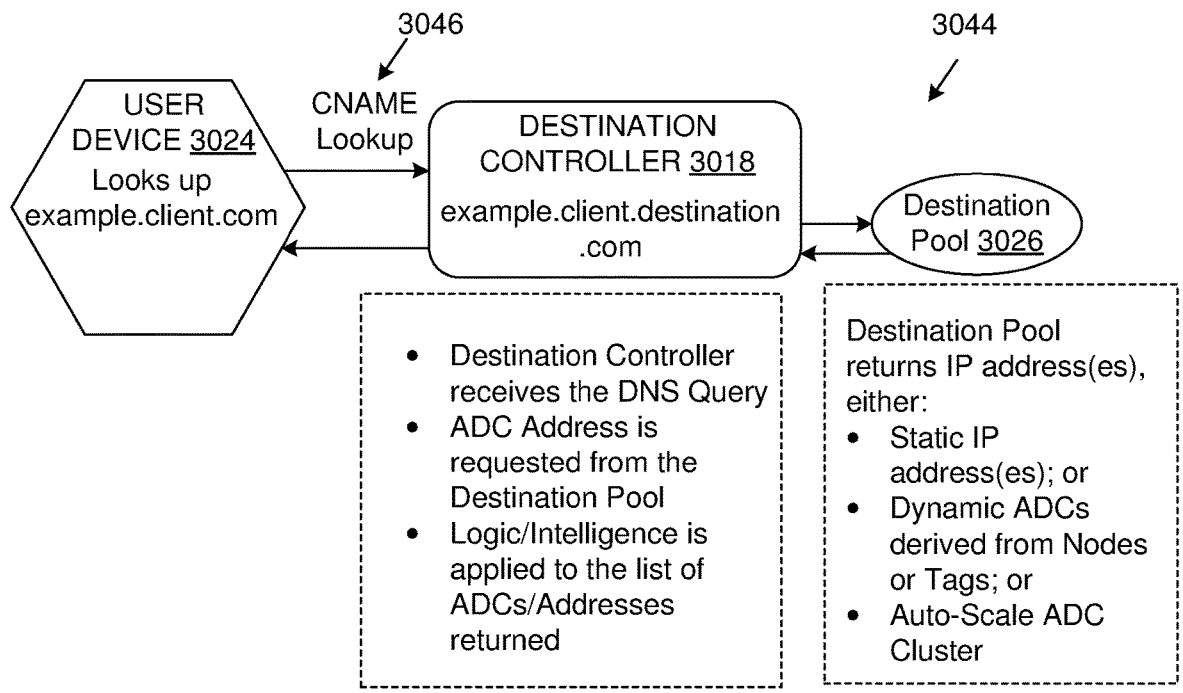
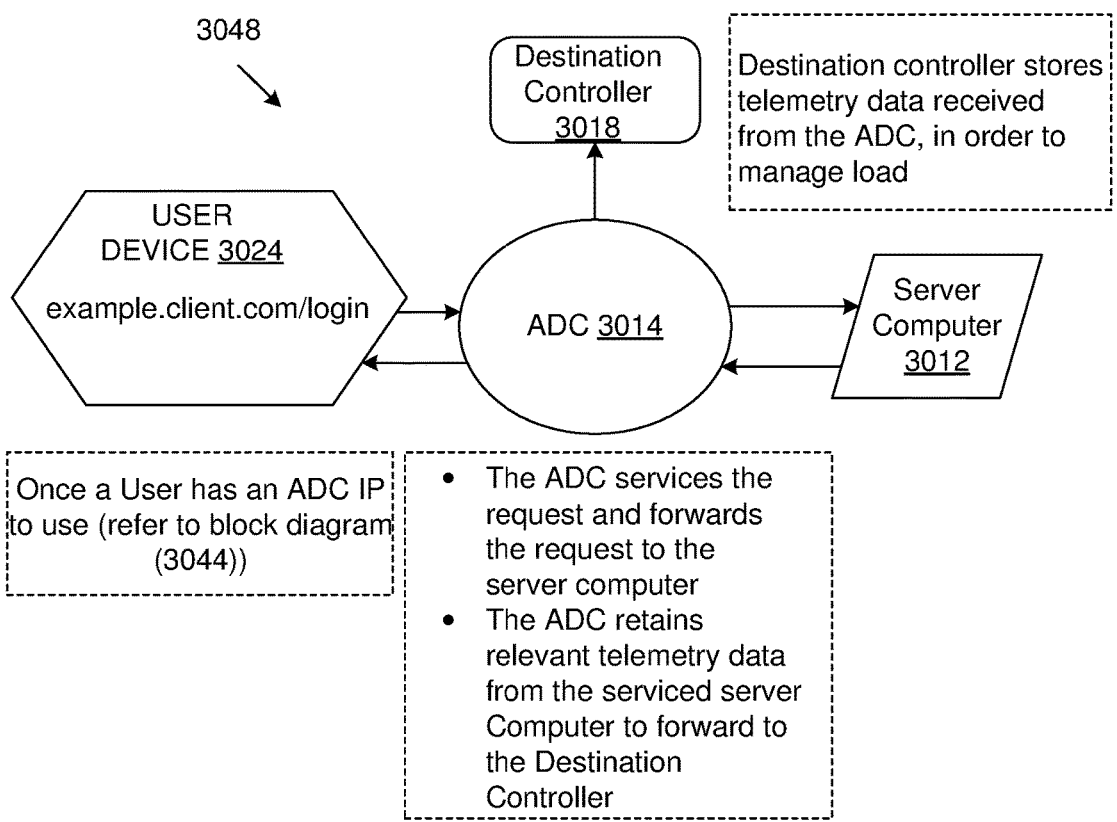
Figure 2

PRIOR ART COMPARED TO PRESENT DISCLOSURE

PRIOR ART COMPARED TO PRESENT DISCLOSURE

NOVA

| Dashboard | Organization | Nodes ▼ | Locations ▼ | ADCs ▼ |

Hello, Dave

Options

Manage Organization  Customer Name

Users
Total registered users                3

Teams
Total teams created                   0

Nodes
Nodes in organization                 11

Connected
Connected nodes                       9

Subscription
Your NOVA package                     nova

Node Allowance
How many can you run                  50

Users

James Doe          Remove
james@client.com

Jane Doe           Remove
jane@client.com

John Doe           Remove
john@client.com

Email address      Invite

Subscription

Great! You currently have an active NOVA subscription

Plan               nova
Nodes              50
Retention          days
Feature Level      /3

◁ Monitoring Node health monitoring & alerting                                    [Docs]

Below are your active Node monitors. You may create any number of monitors and should they fail you will be notified via email, text, Slack or webhook.

| Monitor | Last Alert | Tags | Notify after | Actions |
|---|---|---|---|---|
| CPU Usage <br> CPU utilization is greater than 50 | 2019-07-01 06:56:48 | ALL NODES | 2 failed checks | EDIT STATUS \| DELETE |
| CPU Usage <br> CPU utilization is greater than 25 | 2019-07-01 06:56:48 | ALL NODES | 2 failed checks | EDIT STATUS \| DELETE |
| Example rule <br> Total connections is greater than 1000 | never | ALL NODES | 2 failed checks | EDIT STATUS \| DELETE |
| Klaus Servers <br> CPU utilization is greater than 50 | 2019-07-01 06:56:48 | ALL NODES | 3 failed checks | EDIT STATUS \| DELETE |
| Memory usage over 50% <br> Memory utilization is greater than 50 | 2019-04-22 10:41:58 | ALL NODES | 3 failed checks | EDIT STATUS \| DELETE |

Add Monitor    [+ Create]

△ CPU Usage View alert status and history | Docs

Monitor details

Name
Your name for this Monitor — CPU Usage

Description
Nova's verbal description of the Monitor — CPU Utilization is greater than 50

Monitor
When did this Monitor last trigger an alert — 2019-07-01 06:56:48

Log history recent monitor notifications

- SplusADC-1
  Reading was 55 at 2019-07-01 06:56:48 — 59 minutes ago
- LondonTest-0
  Reading was 100 at 2019-07-01 06:38:10 — 1 hour ago
- LondonTest-0
  Reading was 100 at 2019-06-30 06:47:13 — 1 day ago

Nodes on Monitor

| Node | Status | Limit | Current |
|---|---|---|---|
| LondonTest-0 Connected and stable. | ✓ Safe | 50 | 1 |
| SplusADC-1 Connected and stable. | ✓ Safe | 50 | 1 |
| SingaporeTest-0 Connected and stable. | ✓ Safe | 50 | 0 |
| KlausLB-0 Connected and stable. | ? Safe | 50 | 1 |
| KlausLB-1 Offline and not monitored. | Offline | 50 | |
| PartnerLB-0 Connected and stable. | ✓ Safe | 50 | 0 |
| SFOTest-0 Connected and stable. | ✓ Safe | 50 | 0 ← 10006 |

Figure 43

Edit Destination   Stats Test                                Docs

Destination Options

Manual IP Addresses 8.8.8.8.8.4.4

Nova attempts to auto discover node IP addresses. This can fail for Nodes behind firewalls or with redirects. You may use manual IP addresses above instead. Otherwise, any nodes you select here will automatically update when we detect an IP address change.

Tags
Select the Tag groups include in this Destination

☐ ALL NODES

Nodes
Select the Nodes to include in this Destination

Nothing selected

Health Checks
Should you wish to send a health check to the backends, please specify the type and port. For example, HTTPS and port 443.

Check Type
○ HTTPS  ○ HTTP  ⦿ TCP  ○ Disabled

Check Port

53

Edit | Cancel

DigitalOcean Cloud   Digital Ocean

[Docs]

Cloud details

Name
Your name for this cloud                Snapt DO

Cloud Provider
Which service provider owns this       DigitalOcean

DigitalOcean details

Droplet Limit
Maximum droplets allowed on your account    100

Email
Your registered account

Deploy Nova   launch a new Nova ADC in DigitalOcean

You may deploy a new Nova ADC node into this cloud account automatically. Please check the region is the closest to your servers, and the cost of the droplet.

Node name    New York 1  ▾    1 VCPUs, 1024 MB, +-5/month  ▾    - 1 +    [Launch Droplet(s)]

Endpoints on cloud

| Name | Image ID | Tags | Addresses |
|---|---|---|---|
| KlausLB-NOVA-8daf | NOVA | nova-automatic-DONOTUSE | ... |
| KlausLB-NOVA-8daf | NOVA | nova-automatic-DONOTUSE | ... |
| snapt-jenkins | ubuntu-18-04-x64 | snaptplus | ... |
| PartnerLB-NOVA-8daf | NOVA | nova-automatic-DONOTUSE | ... |

ADCs — Manage and create Nova ADCs

Connections
Total active connections
0

Requests
Total requests
422,816

Connect Rate
Connections per second
2/s

Request Rate
Requests per second
2/s

Upstream Health
Online percentage
38%

Data
Total data transfer
8.35 GB

Below are your active ADCs. These can be deployed to active nodes in order to create live ADCs. Live statistics reset when a change is made.

| Name | Nodes | Current | Data | Requests | Blocked | Upstreams | | Actions | | |
|---|---|---|---|---|---|---|---|---|---|---|
| Partner ADC<br>SSL termination ADC | 1 | 0 | 253.11 MB | 181,913 | 0 | 1U | 0D | Stats | Edit | Deploy |
| Snapt Plus<br>SSL termination ADC | 3 | 0 | 61.14 MB | 78,778 | 14,580 | 6U | 15D | Stats | Edit | Deploy |
| Snapt Shop<br>SSL termination ADC | 1 | 0 | 8.04 GB | 162,125 | 872 | 2U | 0D | Stats | Edit | Deploy |

Add new ADC

+ Create

Viewing ADC: Snapt Plus  [Docs]

ADC details

Name  Snapt Plus
Your name for this ADC

Type  SSL Termination
the type of ADC

ADC text description

This ADC is accepting traffic on 0.0.0.0:80  0.0.0.0:443. It is then passing that data to: 1 backend(s).

It's currently attached to the following nodes: OfficeDemo-1; OfficeDemo-2; SplusADC-1

Live Nodes nodes running this ADC

| Node | Conns | Total | Cache Hit | Req/s | Bytes in/out | Blocked | Average Latency |
|---|---|---|---|---|---|---|---|
| OfficeDemo-1 | 0 | 26,025 | 0% | 1 | 688.13KB / 19.25MB | 4,078 | 105ms |
| OfficeDemo-2 | 0 | 29,299 | 0% | 1 | 955.44KB / 19.89MB | 4,924 | 130ms |
| SplusADC-1 | 0 | 23,468 | 0% | 0 | 1.23MB / 19.17MB | 5,580 | 122ms |
| TOTAL | 0 | 78,792 | 0% | 2 | 2.83MB / 58.31MB | 14,582 | 119ms |

ADC Per IP Rates

| Upstreams | |
|---|---|
| 2U | 5D |
| 2U | 5D |
| 2U | 5D |

← 10013

ADC Flow listens and backends

- ADC: Snapt Plus
  - Backend: SplusDO go back to ADCs

Figure 50

Viewing Snapt Plus on SplusADC-1

| | | | | |
|---|---|---|---|---|
| Connect Connect to upstream | 1ms | Connections Active connections | 0 | Cached Items Items stored in memory | 17 |
| Response Waiting for reply | 2ms | Session Rate Sessions processed/second | 0/s | Cache Rate Percentage of hits | 0% |
| Total To respond to client | 122ms | Idle Idle time percentage | 100% | Cache Size Stored objects size | 1.08 MB |

Live Node Upstreams — upstreams running on this node

Node IP Rates

| | | Rates | | | Connections | | | Data | | Latency | | HTTP Rsp | | | |
|---|---|---|---|---|---|---|---|---|---|---|---|---|---|---|---|
| | | RPS | Peak | Cur | Peak | Total | In | Out | Resp | Total | 1-3xx | 4xx | 5xx |
| ADC: Snapt Plus FRONTEND | | 0 | 24 | 0 | 9 | 23,471 | 1.23 MB | 19.17 MB | 1 ms | 117 ms | 556 | 23,091 | 0 |
| splusdo0 | UP | 0 | 4 | 0 | 1 | 259 | 85.03 KB | 465.48 KB | 1 ms | 117 ms | 20 | 239 | 0 |
| splusdo1 | DOWN | 0 | 0 | 0 | 0 | 0 | 0 | 0 | | | 0 | 0 | 0 |
| splusdo2 | UP | 0 | 30 | 0 | 1 | 332 | 231.42 KB | 13.58 MB | 2 ms | 126 ms | 295 | 37 | 0 |
| splusdo3 | DOWN | 0 | 0 | 0 | 0 | 0 | 0 | 0 | | | 0 | 0 | 0 |
| splusdo4 | DOWN | 0 | 0 | 0 | 0 | 0 | 0 | 0 | | | 0 | 0 | 0 |
| splusdo5 | DOWN | 0 | 0 | 0 | 0 | 0 | 0 | 0 | | | 0 | 0 | 0 |
| splusdo6 | DOWN | 0 | 0 | 0 | 0 | 0 | 0 | 0 | | | 0 | 0 | 0 |

CONTROLLING A DESTINATION OF NETWORK TRAFFIC

CROSS-REFERENCE TO RELATED APPLICATIONS

This application is a national stage filing under 35 U.S.C. 371 of PCT/IB2020/057014, filed Jul. 24, 2020, which International Application was published by the International Bureau in English on Jan. 28, 2021, as WO 2021/014419, which claims priority from U.S. provisional patent application No. 62/878,625 filed on Jul. 25, 2019, which applications are hereby incorporated by reference in their entirety in this application.

FIELD OF ART

This disclosure relates to data processing. More particularly, but not exclusively, this disclosure relates to a system and method for controlling a destination of traffic in a digital network.

BACKGROUND

Application delivery controllers (ADCs) are computer network devices typically used in datacenters. An ADC may for example be a network device that helps websites to direct network traffic to remove an excess load from two or more servers. ADCs are often also used to provide load balancing and may be located between a firewall of a router and a web or server farm. Load balancing is utilized to distribute workloads across multiple computing resources. Dedicated software or hardware is used, for example utilizing a Domain Name System (DNS) server process. A common application of load balancing is to provide a single Internet service from multiple servers or server farms.

For Internet services, a server-side load balancer is usually a software program that is listening on a port where end-users or clients connect to access online services. The load balancer forwards requests to a backend server, which usually replies to the load balancer. This allows the load balancer to reply to the client without the client even knowing about the internal separation of functions.

However, load balancing can become difficult at scale, especially at a global scale and problems arise when multiple load balancers are used. For example, a load balancer in the United States may have a different configuration than a load balancer in Europe or elsewhere. A Global Server Load Balancer (GSLB), or Global Server Load Balancing scheme is sometimes used in an effort to direct global Internet traffic. In traditional GSLB deployments, ADCs are arranged behind a GSLB, and a backend server is arranged behind the ADCs. However, when the backend server is offline for some reason, the GSLB would not be able to determine which ADC to make use of. This may adversely affect service up-time and may delay or inhibit requests from end-users being fulfilled. The ADCs generally return static Internet Protocol (IP) addresses which may result in inadequate scaling possibilities, or may prevent or inhibit migration of ADCs.

Moreover, when a request originates in one geographic region, and data is required from a datacenter in a second geographic region, the request may only be redirected to the second geographic region once it has already arrived at a GSLB located in the first geographic region. In other words, known load balancers can only control the destination to which traffic is directed once the traffic has arrived at the load balancer. This may lead to slow response times and inefficiencies.

Known ADC deployments also have problems with IP addresses that can change regularly and at large scale, for example, when a new set of more than one thousand ADC systems are redeployed with dynamic network discovery. Dynamic network discovery allows servers to be deployed without statically defining specific networking elements, but to rather have those elements be discovered and applied from a controlling server, in this case a Dynamic Host Configuration Protocol (DHCP). Keeping track of large numbers of these devices also requires a vast amount of computational resources. None of the known systems or methods that the applicant is aware of addresses or solves the aforementioned problems. Known protocols tend to take more time to establish a secure connection than the time that is actually needed to perform an instruction, for example when Transport Layer Security (TLS) and known GSLB schemes are used. Hence, the known systems do not provide for near real-time communications with large numbers of ADCs, they lack scalability and are generally inefficient and unsuited for applications that require a hyper-scale.

There is accordingly scope to address the aforementioned problems and deficiencies, or at least to provide a useful alternative to the known systems and methods.

It should be appreciated that the preceding discussion is not an acknowledgment or admission that any of the material referred to was part of the common general knowledge in the art as at the priority date of the application.

SUMMARY

In accordance with an aspect of the disclosed embodiments there is provided a computer-implemented method for controlling network traffic, the method being conducted at a destination controller accessible by a server computer, the method comprising:

receiving, by the destination controller, telemetry data from a plurality of network nodes managed by the server computer;

receiving, by the destination controller, a data transfer request originating from a user device that is connected to the destination controller;

accessing, by the destination controller, a list of stored network node addresses;

applying, by the destination controller, one or more rules to the list of network node addresses to identify a network node address pointing to a network node for handling network traffic originating from the user device that generated the data transfer request, wherein the network node identified by the destination controller:

services the data transfer request; and transmits updated telemetry data of the network node to the destination controller, the destination controller updating the list of network nodes based on received updated telemetry data.

Further features provide for the list of network node addresses to be stored in a destination pool which is accessible to the destination controller; and for the network node identified by the destination controller to forward data relating to the data transfer request to the server computer for further processing.

Still further features provide for the method to include receiving a connection request originating from the network node that has a client interface thereat that generates the connection request as an outbound connection request from that network node to the server computer; and establishing, by the network node, a persistent data communication session between the client interface of the network node and the server computer.

The plurality of network nodes managed by the server computer may be a plurality of application delivery controllers (ADCs); and the network node identified by the destination controller may be an ADC.

Further features provide for the destination controller to be identified by a Domain Name System (DNS) address, or a fully qualified domain name (FQDN), pointing to a computing device associated with the destination controller; and for the destination pool to be a database including the list of addresses of at least some of the plurality of network nodes managed by the server computer.

The telemetry data may include data relating to the ADC or data relating to the server computer which manages the network node or ADC; and the telemetry data may include any one or more of:
  data relating to a Transmission Control Protocol (TCP) keepalive state of the ADC or of the server computer;
  processing capabilities of the ADC, or of the server computer;
  current processing capacity of the ADC or of the server computer;
  whether the ADC is offline or online, or whether the server computer is offline or online;
  geographical location of the ADC or of the server computer;
  ADC response time or server computer response time;
  number of requests per second, or number of requests that are able to be processed per second;
  data relating to a central processing unit (CPU) of the ADC or of the server computer;
  memory data of the ADC or of the server computer;
  load data of the ADC or of the server computer; and
  error rate associated with the ADC or with the server computer.

Further features provide for the network node to be a container or data structure, a virtual machine, or a single hardware instance.

Still further features provide for the method to include labelling or tagging each ADC or each network node; and for the label or tag to include data relating to the telemetry data or data relating to a computing device associated with the network node or with the ADC.

The method may include providing a plurality of server computers, each managing one or more ADCs.

Further features provide for the one or more rules that are applied by the destination controller to the list to include any one or more of:
  that load data, equilibrium data, or balance data of one or more of the ADCs or of one or more of the server computers is to be used in order to determine where to direct network traffic;
  that a geographical location of the user device, the network node, the ADC, or of a server computer is to be used to determine where to direct network traffic; or
  that automatic ADC scaling is to be applied, whereby a number of ADCs used is increased or decreased automatically, based on load or traffic conditions or a number of data transfer requests received.

The method may include routing traffic to a disaster recovery service if the label associated with an ADC indicates failure or overload of a computing device at the ADC, or at the server that is managing that ADC.

The method may include assigning additional ADCs to handle traffic if the telemetry data is indicative that one of the plurality of ADCs is overloaded or offline; arranging the plurality of ADCs in one or more ADC clusters; and assigning a number of labelled ADCs into a group or cluster.

Further features provide for the method to include implementing an artificial intelligence (AI) module in conjunction with the destination controller; for the AI module to be configured for accessing stored telemetry data from each ADC that is managed, and to react in response thereto, and performing one or more of the following:
  routing traffic away from server computers that lack efficiency or that are off-line;
  automatically increasing a number of ADCs to handle network traffic from one or more user devices; and
  increasing the number of allocated ADCs based on:
    traffic patterns or statistics;
    outages of ADCs or server computers; or
    telemetry data of one or more other ADCs or network nodes.

The method may include directing network traffic to a plurality of ADCs, based on a label of the labelled network node or user device that generated the data transfer request; alternatively, for the method to include directing network traffic to a plurality of server computers, based on the label of each of the plurality of ADCs.

Further features provide for the method to include, by the server computer, issuing an instruction for a network node or for an ADC to return data including specific information about the network node or ADC.

The client interface of each network node or ADC may be a thin client; and the client interface of each network node may be operating system agnostic. The thin client may occupy less than 100 megabytes, alternatively less than 10 megabytes of storage space on a memory associated with each network node; the server computer may be network node-agnostic; and the client interface of each network node may be server-agnostic.

Further features provide for the data transfer request to include a DNS query; and for the method to include utilizing or implementing an anycast DNS network.

Still further features provide for the client interface of each network node to be configured, once a connection between the client interface of the network node and the server computer is lost, to automatically transmit another outbound connection request for the server computer to reconnect or re-establish the persistent data communication session; and for the client interface to be configured to repetitively attempt to re-establish the persistent data communication session, for the repetitive attempts to occur at intervals of once per second, or at increasing intervals of about 1, 2, 3, 4, 5, 6, 7, 8, 9, or up to 10 seconds, and may continue to attempt to connect at 10 second intervals, or at any other suitable interval.

Yet further features provide for the client interface to be a standard client interface; for the standard client interface to be downloaded onto the network node from the server computer; alternatively, for the standard client interface to be installed onto a computing device at the network node during manufacture of that computing device.

Further features provide for the server computer to form part of, or to be connected to a customer cloud infrastructure that includes a plurality of other server computers that are arranged carry out steps of the method; and for the customer cloud infrastructure to be in data communication with a control interface of the server computer using an application programming interface (API), for example using a representational state transfer (REST) API or RESTful API.

Still further features provide for the plurality of server computers to be arranged in one or more server clusters; for the plurality of server computers to provide server redundancy; for the communications to be provided by a communications protocol; for the communications protocol to be an anycast or a unicast protocol; and for the communications protocol to include a set of protocol rules that governs communications between the server computer and the client interface of each network node.

Yet further features provide for the communications between the customer cloud infrastructure and the server computer, as well as between the server computer and the client interface of the network node to be provided by a secure communications link, for example by way of Hypertext Transfer Protocol Secure (HTTPS) utilizing Secure Sockets Layer (SSL) or Transport Layer Security (TLS), or any other cryptographic protocol, including asymmetric cryptography that utilizes public and private key pairs; for the communications to be provided by HTTP or HTTPS tunneling technology; alternatively, for the communications to be provided by User Datagram Protocol (UDP), or any other protocol.

A further feature provides for the method to include: authenticating, by the server computer, the network node or ADC before establishing the persistent data communication session with the client interface of that network node or ADC.

Still further features provide for the method to include performing, by the server computer, a handshake process or authentication process between the server computer and the client interface of the network node to initiate the persistent data communication session; for the persistent data communication session to be a secure link which is established or negotiated, after which the server computer may transmit data via the persistent data communication session to the client interface of the endpoint device, so that subsequent responses or data may be sent and received without requiring the persistent data communications session or secure link to be re-negotiated.

Yet further features provide for the handshake process or authentication process to be performed in less than a second; alternatively, in less than 500 milliseconds (ms), and preferably in about 150 milliseconds; for the persistent data communication session to be a bi-directional session that enables communication between the server computer and the client interface of the network node; for the persistent data communication session to enable the step of transmitting, by the server computer, data via the persistent data communication session to the client interface of the network node within less than 100 milliseconds, and preferably within about 25 milliseconds or within about 5 milliseconds; alternatively, for a latency of the bi-directional persistent data communication session to be about 5 milliseconds, excluding a round trip time (RTT).

Further features provide for the client interface of each network node to be client software operated on a computing device associated with the network node; for the client software to be hard coded; for the client software to be installed during manufacture of the computing device associated with the network node; for the client interface software to be downloaded from the server computer and/or dynamically updated during the persistent data communication session.

Still further features provide for the method to include: controlling, by the server computer, each network node in near real-time; for the method to include implementing, by the server computer or by the customer cloud infrastructure, or by the destination controller, a machine learning or artificial intelligence algorithm, static logic or other event to react in near real-time to data received from one or more of the plurality of network nodes.

A yet further features provides for the server computer to be a physical server or a virtual server.

In accordance with a further aspect of the disclosure there is provided a system for controlling network traffic, the system comprising:

a server computer in data communication with a plurality of network nodes, each of the network nodes including a client interface thereat;

a destination controller that is accessible by the server computer and that is configured for receiving telemetry data from the plurality of network nodes managed by the server computer, and receiving a data transfer request originating from a user device that is connected to the destination controller;

a database that includes a list of stored network node addresses, wherein the database is accessible by the destination controller and the destination controller is configured to apply one or more rules to the list of network node addresses to identify a network node address pointing to a network node for handling network traffic originating from the user device that generated the data transfer request, to cause the identified network node to service the data transfer request; and a list updating component which is configured to receive updated telemetry data from the identified network node and to update the list of network node addresses in the database with the received updated telemetry data.

Further features provide for the identified network node to be configured to forward data relating to the data transfer request to the server computer for further processing; for the list of network node addresses to be stored in a destination pool which is accessible to the destination controller; and for the network node identified by the destination controller to forward data relating to the data transfer request to the server computer for further processing.

Still further features provide for the server computer to be configured for receiving a connection request originating from the network node that has a client interface thereat that generates the connection request as an outbound connection request from that network node to the server computer; and establishing, by the network node, a persistent data communication session between the client interface of the network node and the server computer.

Yet further features provide for the plurality of network nodes managed by the server computer to be a plurality of application delivery controllers (ADCs); and for the network node identified by the destination controller to be an ADC.

The destination controller may be identified by a Domain Name System (DNS) address, or a fully qualified domain name (FQDN), pointing to a computing device associated with the destination controller.

A further feature provides for the destination pool to be a database including the list of addresses of at least some of the plurality of network nodes managed by the server computer.

Still further features provide for the telemetry data to include data relating to the ADC or data relating to the server computer which manages the network node or ADC; and for the telemetry data to include any one or more of:

data relating to a Transmission Control Protocol (TCP) keepalive state of the ADC or of the server computer;

processing capabilities of the ADC, or of the server computer;

current processing capacity of the ADC or of the server computer;

whether the ADC is offline or online, or whether the server computer is offline or online;

geographical location of the ADC or of the server computer;

ADC response time or server computer response time;

number of requests per second, or number of requests that are able to be processed per second;

data relating to a central processing unit (CPU) of the ADC or of the server computer;

memory data of the ADC or of the server computer;

load data of the ADC or of the server computer; and error rate associated with the ADC or with the server computer.

Yet further features provide for the network node to be a container or data structure, a virtual machine, or a single hardware instance.

Further features provide for the server computer or the destination controller to be configured to label or tag each ADC or each network node; and for the label or tag to include data relating to the telemetry data or data relating to a computing device associated with the network node or with the ADC.

A still further feature provides for the system to include a plurality of server computers, each managing one or more ADCs.

Yet further features provide for the one or more rules that are applied by the destination controller to the list to include any one or more of:

that load data, equilibrium data, or balance data of one or more of the ADCs or of one or more of the server computers is to be used in order to determine where to direct network traffic;

that a geographical location of the user device, the network node, the ADC, or of a server computer is to be used to determine where to direct network traffic; or that automatic ADC scaling is to be applied, whereby a number of ADCs used is increased or decreased automatically, based on load or traffic conditions or a number of data transfer requests received.

Further features provide for the system to be configured for routing traffic to a disaster recovery service if the label associated with an ADC indicates failure or overload of a computing device at the ADC, or at the server that is managing that ADC.

Still further features provide for the server computer and/or the destination controller to be configured for assigning additional ADCs to handle traffic if the telemetry data is indicative that one of the plurality of ADCs is overloaded or offline; for the plurality of ADCs to be arranged in one or more ADC clusters; and for a number of labelled ADCs to be assigned into a group or cluster.

Yet further features provide for the system to include an artificial intelligence (AI) module that is used in conjunction with the destination controller; for the AI module to be configured for accessing stored telemetry data from each ADC that is managed, and to react in response thereto, and performing one or more of the following:

routing traffic away from server computers that lack efficiency or that are off-line;

automatically increasing a number of ADCs to handle network traffic from one or more user devices; and increasing the number of allocated ADCs based on:

traffic patterns or statistics;

outages of ADCs or server computers; or telemetry data of one or more other ADCs or network nodes.

Further features provide for the system to be configured for directing network traffic to a plurality of ADCs, based on a label of the labelled network node or user device that generated the data transfer request; alternatively, for the system to be configured for directing network traffic to a plurality of server computers, based on the label of each of the plurality of ADCs.

Still further features provide for the server computer to be configured for issuing an instruction for a network node or for an ADC to return data including specific information about the network node or ADC; for the client interface of each network node or ADC to be a thin client; and for the client interface of each network node to be operating system agnostic.

Yet further features provide for the thin client to occupy less than 100 megabytes, alternatively less than 10 megabytes of storage space on a memory associated with each network node; for the server computer to be network node-agnostic; and for the client interface of each network node to be server-agnostic.

Further features provide for the data transfer request to include a DNS query; and for the system to be configured for utilizing or implementing an anycast DNS network.

In accordance with a further aspect of the disclosure there is provided a computer program product for controlling network traffic, the computer program product comprising a non-transitory computer-readable medium having stored computer-readable program code for performing the steps of:

receiving, by a destination controller that is accessible by a server computer, telemetry data from a plurality of network nodes managed by a server computer;

receiving, by the destination controller, a data transfer request originating from a user device that is connected to the destination controller;

accessing, by the destination controller, a list of stored network node addresses;

applying, by the destination controller, one or more rules to the list of network node addresses to identify a network node address pointing to a network node for handling network traffic originating from the user device that generated the data transfer request, wherein the network node identified by the destination controller:

services the data transfer request; and transmits updated telemetry data of the network node to the destination controller, the destination controller updating the list of network nodes based on received updated telemetry data.

Further features provide for the computer-readable medium to be a non-transitory computer-readable medium and for the computer-readable program code to be executable by a processor associated with the server computer, or a processor associated with the network node, or a processor associated with the destination controller.

Embodiments of the disclosure will now be described, by way of example only, with reference to the accompanying drawings.

BRIEF DESCRIPTION OF THE DRAWINGS

In the drawings:

FIG. 2 are high-level block diagrams showing a Canonical Name (CNAME) lookup performed by a user device which originates a data transfer request, and showing how requests are handled in an exemplary implementation of the system;

FIGS. 38-51 are example screenshots showing a control interface that may be used by an operator of the disclosed systems and methods.

DETAILED DESCRIPTION

Figure 1:
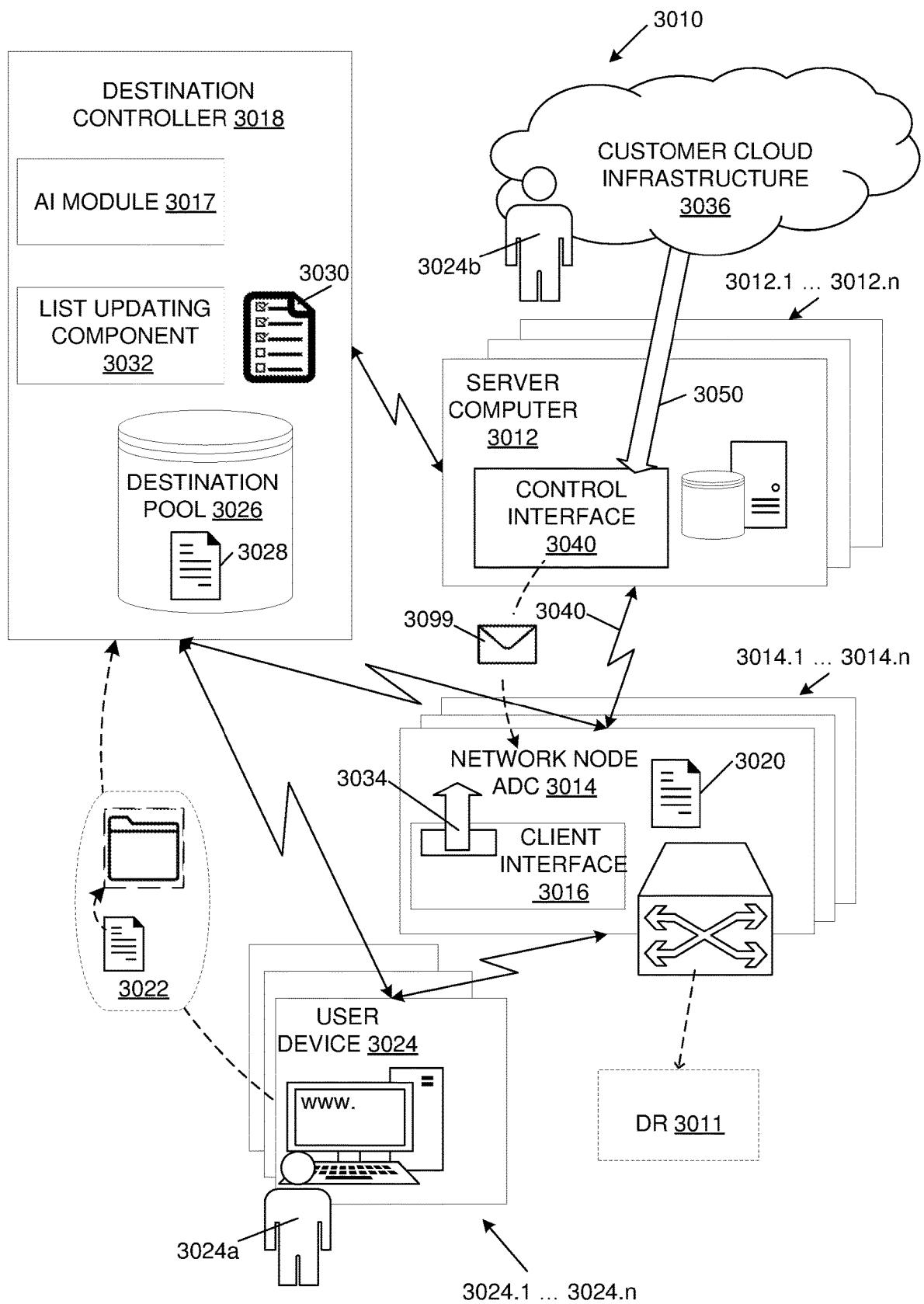
FIG. 1 is a high-level block diagram showing an exemplary implementation of a system for controlling network traffic.

In this specification, the terms "endpoint", "endpoint device", "network node" or plural forms of these terms will be used to include any physical or virtual computing device or node in a digital communications network including, but not limited to, a server, a system, an ADC, or any other computing device.

There is provided a system and method for managing network traffic in a digital network. A backend server may be provided and may form part of a cloud computing implementation. A plurality of physical or virtual servers may be used, for example arranged in server clusters. An end-user may require access to a website, or may require data to be transferred from a user computing device to a remote location. One or more network nodes or application delivery controllers (ADCs) may be provided to handle network traffic originating from the user device and/or from a plurality of other user devices forming part of the digital network. The respective network node or ADC may be authenticated and then a secure tunnel or persistent communication session may be established between the backend server and the network node or ADC. Software which may be referred to as a client interface, may be resident on the network node to facilitate this process and the software may be either hard coded, downloadable from the backend, or pre-installed to the network node. The network node may generate an outbound request to initiate the persistent communication session with the backend server. Once authentication is performed, the secure tunnel may be kept open as a persistent secure connection. A destination of traffic originating from the end user device may be determined as the traffic leaves the end user device, by using a destination controller that may be provided by a Domain Name System (DNS) address or a fully qualified domain name (FQDN) managed or provided by the backend server.

It should be appreciated that like features may be designated by like reference numerals in the Figures.

Referring to FIG. 1, there is provided an example embodiment of a system (3010) for controlling network traffic. It will be appreciated that the components of the system may be in data communication with one another over a digital network, for example over the Internet. The system (3010) may include a server computer (3012) in data communication with a plurality of network nodes (3014.1 to 3014.n). In the exemplary embodiment, the network node (3014) may be an application delivery controller (ADC). Each of the network nodes (3014.1 to 3014.n) may include a client interface (3016) thereat. A destination controller (3018) may be provided by or accessible by the server computer (3012). The destination controller (3018) may be identified by a Domain Name System (DNS) address, or a fully qualified domain name (FQDN), pointing to a computing device associated with the destination controller (3018). The destination controller (3018) may provide an intelligent DNS endpoint whereto network traffic may be directed. Intelligent routing decisions may be made by the destination controller, as will be described in more detail below.

The destination controller (3018) may be configured for receiving telemetry data (3020) from the plurality of network nodes (3014.1 to 3014.n) managed by the server computer (3012). The destination controller (3018) may be arranged to receive a data transfer request (3022) originating from a user device (3024) connected to the destination controller (3018). A destination pool or database (3026) may be provided at, or may form part of the destination controller (3018). The destination pool may include a list (3028) of stored network node addresses. The database or destination pool (3026) may be accessible by the destination controller (3018). The destination pool may be a database including the list of addresses of at least some of the plurality of network nodes (3014.1 to 3014.n) managed by the server computer (3012) or by a plurality of server computers (3012.1 to 3012.n). In the exemplary embodiment, the destination controller may be configured to apply one or more rules (3030) to the list (3028) of network node addresses to identify a network node address pointing to a network node (3014) for handling network traffic originating from the user device (3024) that generated the data transfer request (3022). The destination controller (3018) and/or the server computer (3012) may cause the identified network node (3014) to service the data transfer request (3022). The data transfer request may include the user device requiring to transfer data from the user device to a remote location, for example accessing a website hosted by a datacenter remote from the user device and transferring data to and from the remote datacenter. A list updating component (3032) may be provided and may be configured to update the list (3028) of network node addresses in the database (3026), by receiving updated telemetry data (3020) of the identified network node (3014) (or from other network nodes (3014.2 to 3014.n)). Updated telemetry data may also be received from other network nodes, as will be described in more detail below. It will be appreciated that the user device may be any computing device or data processing device or endpoint including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like.

The network node or ADC (3014) identified by the destination controller (3018) may forward data relating to the data transfer request (3022) to the server computer (3012) for further processing. It will be appreciated that the plurality of network nodes (3014.1 to 3014.n) managed by the server computer (3012) may be a plurality of application delivery controllers (ADCs), and the network node (3014) identified by the destination controller may be an ADC. The data transfer request (3022) may be, or may include a domain name system (DNS) query. In the present disclosure, an anycast DNS network may be used or implemented to provide communications between the various components of the system.

The client interface (3016) of the network node (3014) may be configured for generating a connection request (3034) as an outbound connection request from that network node (3014) to the server computer (3012) where the connection request may be received. The client interface of the network node (3014) may be configured to establish a persistent data communication session (3040) between the client interface (3016) of the network node (3014) and the server computer (3012). This persistent data communication session (3040) may be similar to a persistent data communication session (40) which is described in more detail below with reference to FIGS. 14-37. A customer cloud infrastructure (3036) may be in data communication with a control interface (3040) of the server computer (3012) using an application programming interface (API), for example using a representational state transfer (REST) API (3050) (also referred to as a RESTful API) and utilizing Hypertext Transfer Protocol Secure (HTTPS). However, other protocols may also be used.

The telemetry data (3020) may include data relating to the ADC (3014) or data relating to the server computer (3012) which manages the network node or ADC (3014). The telemetry data may include any one or more of:

data relating to a Transmission Control Protocol (TCP) keepalive state of the ADC (3014) or of the server computer (3012), or of the data connection between the ADC and other components of the system (3010);

processing capabilities of the ADC (3014), or of the server computer (3012); current processing capacity of the ADC (3014) or of the server computer (3012); whether the ADC (3014) is offline or online, or whether the server computer (3012) is offline or online;

a geographical location of the ADC (3014) or of the server computer (3012);

a response time of the ADC (3014) or a response time of the server computer (3012);

a number of requests per second, or a number of requests that are able to be processed per second by either the ADC (3014) or the server computer (3012);

data relating to a central processing unit (CPU) of the ADC (3014) or of the server computer (3012);

memory data of the ADC (3014) or of the server computer (3012);

load data of the ADC (3014) or of the server computer (3012);

state of health of the ADC or of the server computer;
a number of active connections;
an error rate associated with the ADC (3014) or with the server computer (3012) (for example HTTP error rate); and
any measurements or readings relating to the ADC (3014) or relating to the server computer (3012).

It will be appreciated that the network node (3014) may be a container or a data structure, a virtual machine, or a single hardware instance. Each ADC or each network node (3014.1 to 3014.n) may be labelled or tagged by the system (3010). and the label or tag may include data relating to the telemetry data or data relating to a computing device associated with the network node (3014) or ADC. The system may include a plurality of server computers (3012.1 to 3012.n), each managing one or more of the ADCs (3014.1 to 3014.n). The ADC (3014) may be a point of entry to a service or set of services that require availability and/or performance.

In FIG. 2 is shown a block diagram (3044) that illustrates an exemplary Canonical Name (CNAME) lookup (3046) performed by a user device (3024) which originates the data transfer request (3022). As described above, the destination controller may be a computing device associated with a DNS or FQDN address, for example: example.client.destination.com.

The Destination Controller (3018) may work alongside a Destination Pool (3026) to return a suitable Internet Protocol (IP) address, or list of IP addresses depending on the one or more rules (3030) to the user device (3024) or client making the data transfer or lookup request (3022). It will be appreciated that the data transfer request may be a request to access, send, receive, copy, download, or any other type of request over the digital network. The applied rule or rules (3030) may include logic or Intelligence that may be applied to the list (3028) received by the destination pool (3026). The one or more rules (3030) that are applied by the destination controller (3018) to the list (3028) may include any one or more of:
    that load data, equilibrium data, or balance data of one or more of the ADCs (3014.1 to n) or of one or more of the server computers (3012.1 to n) is to be used in order to determine where to direct network traffic;
    that a geographical location of the user device (3024), the network node (3014), the ADC, or of a server computer (3012) is to be used to determine where to direct network traffic; or
    that automatic ADC scaling is to be applied, whereby a number of ADCs (3014.1 to n) used is increased or decreased automatically, based on load or traffic conditions or a number of data transfer requests received.

Still referring to the block diagram (3044) in FIG. 2, once the Destination controller (3018) receives the data transfer request (3022) (also referred to as a DNS query), an ADC address is requested from the destination pool (3026). The one or more rules (provided by digital Logic or Intelligence) may then be applied to the list (3028) of ADCs (3014) or ADC addresses returned. The destination pool (3026) may be referred to as a management endpoint. The destination pool may store, and may return IP address(es), including either: one or more Static IP addresses; or one or more Dynamic addresses of ADCs (3014) derived from labels or Tags; or instructions relating to Auto-Scaling of an ADC cluster may be returned (for example including a number of ADC addresses to be used). The destination controller (3018) may thus provide functionality and may increase the quality of metrics used by the system (3010). A dynamic set of ADCs may be encapsulated by a network node (3014) or a set of network nodes described by tags or labels assigned to the network node, or to each of the ADCs encapsulated by the network node (3014). This may provide utility if static ADCs are migrated or have dynamic networking configurations. If the destination controller (3018) is routed to a network node managed by the server (3012), then regardless of the specifics of the networking configuration (provided the network node is properly connected to the server computer with the persistent data communications session (3040)), requests (3022) may continue to function or to be fulfilled. FIGS. 10-13 show self-explanatory high-level block diagrams illustrating examples of how ADC auto-scaling may be provided by the system (3010).

As mentioned above, the destination pool (3026) may also return instructions relating to auto-scaling of an ADC cluster. A group of 2 or more ADCs (3014) may then be configured to scale according to the rules (3030) or metrics. For example:
    A pair of ADCs (3014.1, 3014.2) may deployed in a redundant configuration or ADC cluster. Due to an increase in load to these ADCs, the system (3010) may be configured to adapt to the increased load and to deploy a further two ADCs (3014.3, 3014.4) in the ADC cluster.
    Because the traffic may be directed by the destination controller (3018) to the auto-scaling ADC Cluster, the load may be seamlessly distributed across the cluster, which now includes the 2 freshly deployed nodes or ADCs (3014.3, 3014.4).
    Furthermore, the configuration may be structured so that the two new nodes or ADCs (3014.3, 3014.4) receive more traffic than the original two ADCs (3014.1, 3014.2), until a load-equilibrium is reached.
    The system (3010) may be adapted to the increased load. Once the traffic decreases (for example when a spike in network traffic drops off), the new network nodes or ADCs (3014.3, 3014.4) may be destroyed and/or removed from the auto-scaling ADC cluster.

The system and method described may provide a closed feedback loop. The system (3010), with the destination controller (3018) may store the telemetry data (3020) from each ADC or network node (3014) that is managed. The telemetry data may be stored at the server (3012), at the network node (3014), or at the destination controller (3018). This may enable the system (3010) to analyze the received data or received requests or queries, and to react accordingly. For example: network traffic may be routed away from servers (3012.1 to 3012.n) or backends that are inefficient or off-line. An artificial intelligence (AI) module (3017) which may use machine learning or per-configured rule sets may be provided, for example at the destination controller (3018) or at the server computer (3012), or at the network node (3014).

The AI module (3017) may be used in conjunction with the destination controller (3018). The AI module (3017) may be configured for utilizing or accessing the stored telemetry data (3020) from each ADC (3014.1 to 3014.n) that is managed, and to react in response thereto, and performing one or more of the following:
    routing traffic away from server computers that lack efficiency or that are off-line;
    automatically increasing a number of ADCs (3014.1 to 3014.n) to handle network traffic from a plurality of user devices (3024.1 to 3024.n); and increasing the number of allocated ADCs based on:
traffic patterns or statistics;
outages of ADCs (3014.1 to 3014.*n*) or server computers (3012.1 to 3012.*n*); or
telemetry data (3020) of one or more other ADCs (3014.1 to n) or network nodes.

As referred to in the introduction of this specification, it will be appreciated that in a traditional GSLB deployment, the servers behind a GSLB are ADC's, and the backend servers are behind the ADC's. In cases where backend servers are offline, the GSLB would not be able to determine which ADC's to make use of in order to maintain a high or suitable up-time, or optimal request fulfillment may be difficult or impossible. However, with the present disclosure, these disadvantages may be alleviated or overcome. Known GSLB deployments may be limited in that these deployments are static, pre-configured systems.

It will also be appreciated that the destination controller (3018) may be in data communication with the plurality of ADCs (3014.1 to 3014.*n*) managed by the server (3012). The telemetry data (3020) may be returned by each ADC (3014) to the destination controller (3018).

In FIG. 2 is also shown a high-level block diagram (3048) showing how requests may be handled, as well as how telemetry data (3020) may be stored by the destination controller (3018) in an exemplary implementation of the system (3010). When a user device (3024) initiates the data transfer request (3022) and obtains the ADC IP address to use, for example by the process referred to above with reference to the block diagram (3044) in FIG. 2, then the user device (3024) may be directed to the ADC (3014) identified by the destination controller (3018). A login process may be used and the login may be performed automatically in some implementations. The identified ADC (3014) may service the data transfer request (3022) and may optionally forward the data transfer request (3022) to the server computer (3012). The ADC (3014) may also retain or store relevant telemetry data (3020) from the serviced server computer (3012), and this telemetry data (3020) may be forwarded to the destination controller (3018). The destination controller (3018) may, in turn, store the telemetry data (3020) received from the ADC (3014), in order to manage load, or in order to perform load balancing or load distribution. The destination controller may also forward the telemetry data (3020) to the AI module (3017) or machine learning component.

Figure 3:
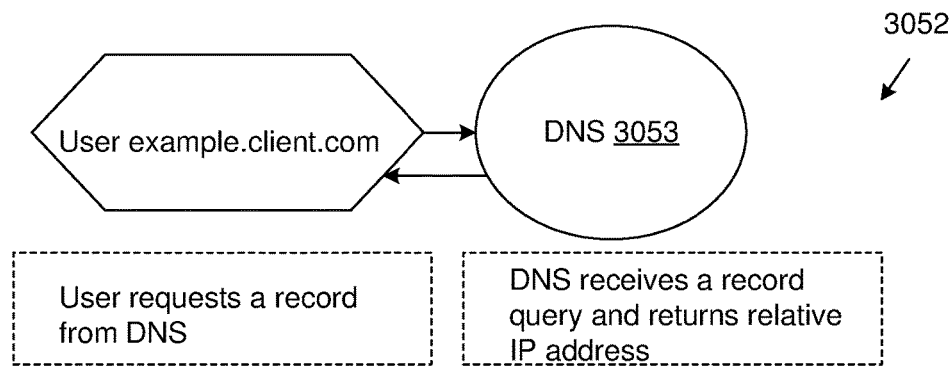
FIG. 3 is a high-level block diagram showing a prior art standard DNS resolution.
Figure 4:
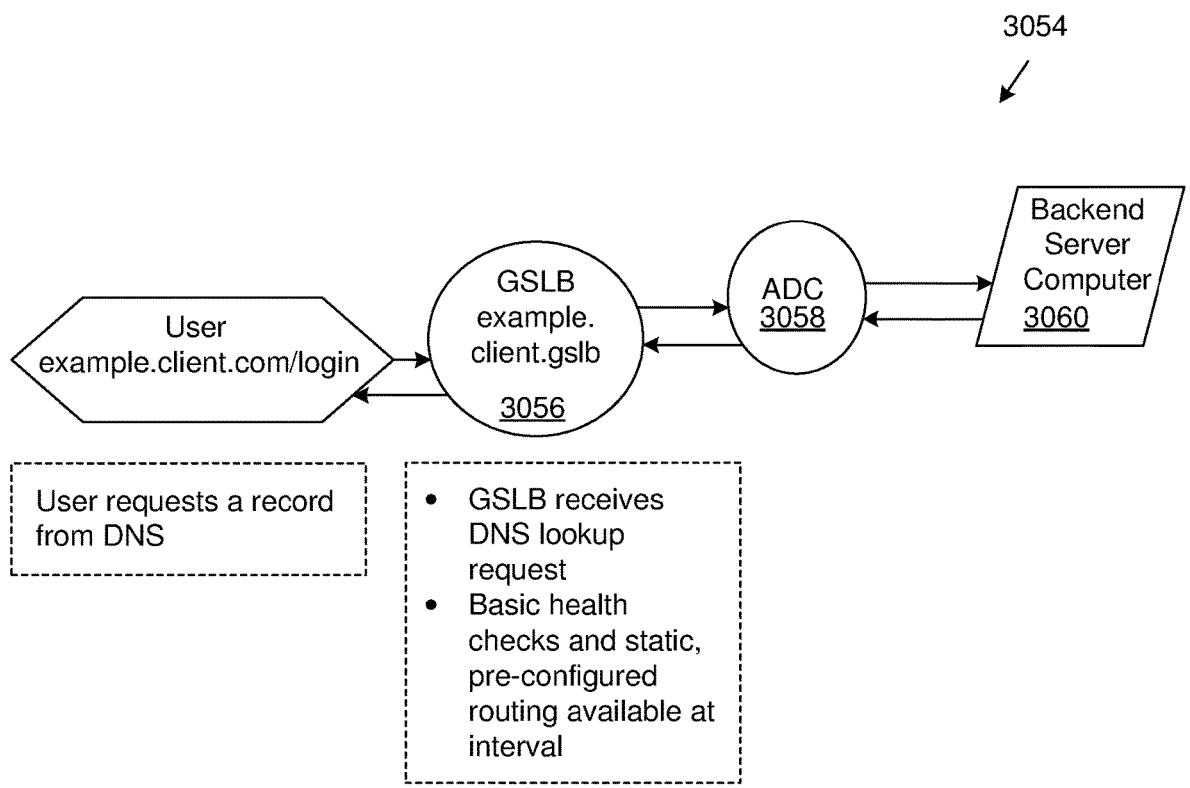
FIG. 4 is a high-level block diagram showing a prior art traditional GSLB deployment.

In FIGS. 3 and 4 are shown prior art implementations, for a standard record DNS resolution (3052) and a traditional GSLB deployment (3054) respectively. Referring to FIG. 3, when a user requests a record from a domain name system DNS (3053), the DNS receives the record query and returns a relative IP address. Referring to FIG. 4, in a traditional global server load balancing (GSLB) deployment, the user requests a record from a DNS. A global server load balancer (GSLB) (3056) receives the DNS lookup. Basic health checks and static, pre-configured routing may be available. An ADC (3058) may then return only a static Internet Protocol (IP) address, which may result in inadequate scaling possibilities, or may prevent or inhibit migration of ADCs. Moreover, as mentioned above, when a backend server computer (3060) is offline for some reason, the GSLB (3056) would not be able to determine which ADC (3058) to make use of. These problems may be alleviated or overcome by the present disclosure.

Referring again to FIG. 1, with the present disclosure, routing traffic to a disaster recovery (DR) service (3011) may be performed in some scenarios. For example, if a label or tag associated with an ADC (3014) indicates failure or overload of a computing device at that ADC (3014), or at a server computer (3012) that is managing that ADC (3014). The DR service (3011) may include additional ADCs or additional server computers for absorbing the traffic that cannot be handled by the offline or inefficient ADCs or server computers.

The present disclosure may enable additional ADCs to be assigned to handle traffic if the telemetry data (3020) is indicative that one of the plurality of ADCs (3014.1 to 3014.*n*) is overloaded or offline. The ADCs (3014.1 to n) may be arranged in one or more ADC clusters or groups. Each cluster may be labelled or tagged by the server computer (3012), or each ADC or network node (3014) may be labelled or tagged by the server computer (3012). Network traffic may thus be directed to a plurality of ADCs, based on a label of the labelled network node (3014) that handled the data transfer request. The user devices (3024.1 to n) may also be labelled. Network traffic may also be directed to a plurality of server computers (3012.1 to n), based on the label of each of the plurality of ADCs (3014.1 to n). The server computer (3012) may also issue an instruction for a network node (3014) or for an ADC to return data including specific information, data, metrics or telemetry data (3020) about that network node or ADC.

As is discussed below with reference to FIGS. 14-37, the client interface (3016) of each network node or ADC (3014) may be a thin client. The client interface of each network node (3014) may also be operating system agnostic. In an exemplary embodiment of the present disclosure, the thin client may occupy less than 100 megabytes, alternatively less than 10 megabytes of storage space on a memory associated with each network node (3014). The server computer (3012) may be network node-agnostic, and the client interface (3014) of each network node (3014) may be server-agnostic. The client interface (3016) of the network node (3014) may be downloaded from the server computer (3012).

Figure 5:
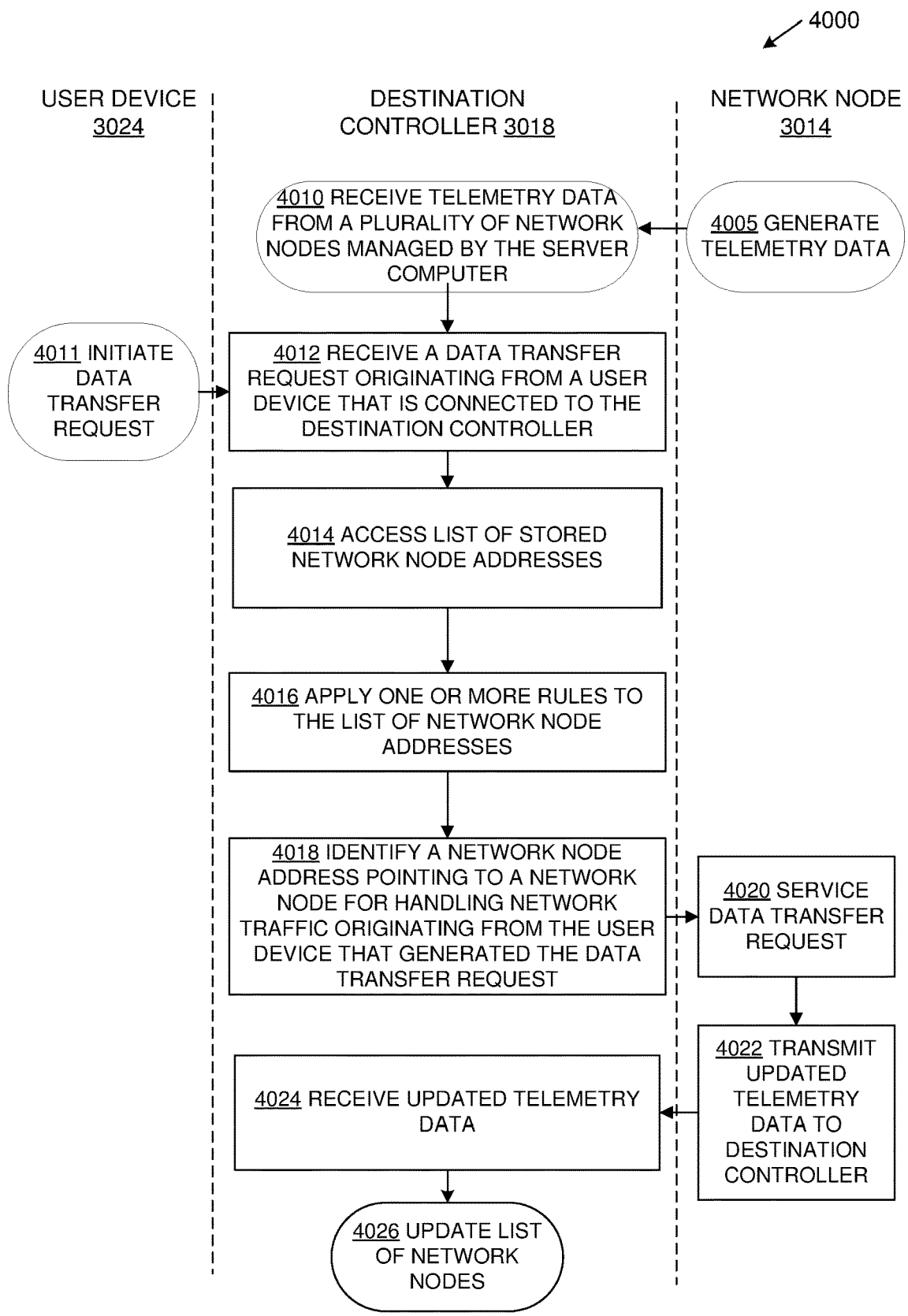
FIG. 5 is a high-level swim-lane flow diagram illustrating an exemplary method for controlling network traffic.

In FIG. 5 is shown a swim-lane flow diagram illustrating an exemplary method (4000) for controlling network traffic (in which respective swim-lanes delineate steps, operations or procedures performed by respective entities or devices). The network node or ADC (3014) may generate (4005) telemetry data (3020). The telemetry data may be generated continually, intermittently, repetitively, or upon request from the server computer (3012), or upon request from the destination controller (3018). The destination controller (3018) may receive (4010) the telemetry data (3020) from the plurality of network nodes (3014.1 to n) managed by the server computer (3012). The destination controller (3018) may receive (4012) a data transfer request (3022) originating from a user device (3024) that is connected to the destination controller (3018). As mentioned above, the user device (3024) may initiate (4011) the request (3022). The destination controller (3018) may access (4014) the list (3028) of stored network node addresses. The destination controller (3018) may apply (4016) one or more rules (3030) to the list of network node addresses to identify (4018) a network node address pointing to a network node (3014) for handling network traffic originating from the user device (3024) that generated the data transfer request (3022). The network node (3014) identified by the destination controller (3018) may service (4020) the data transfer request, and transmit (4022) updated telemetry data (3020) of the network node (3014) to the destination controller (3018) (where it is received (4024)). The destination controller (3018) may update (4026) the list (3028) of network nodes based on received updated telemetry data (3020).

Figure 6:
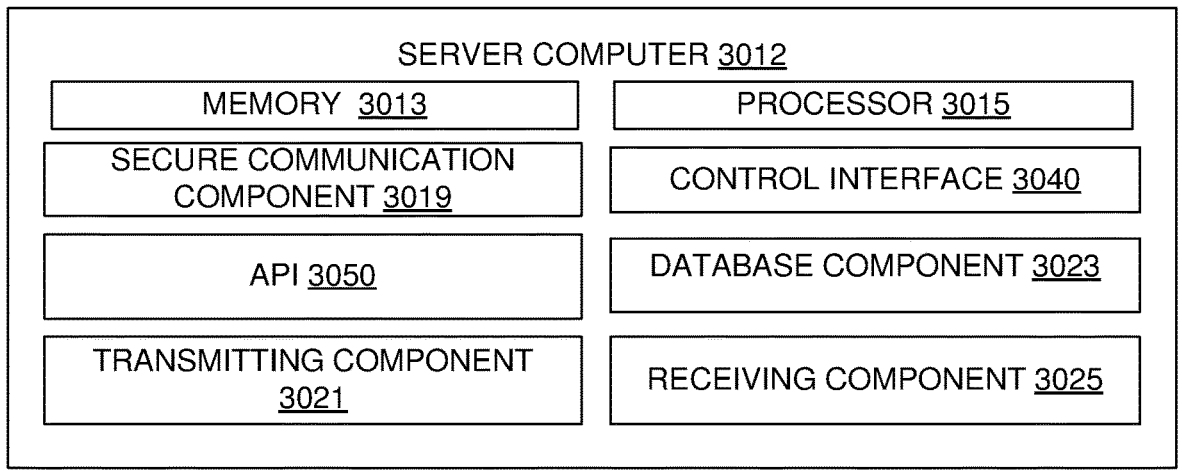
FIG. 6 is a high-level block diagram illustrating exemplary components of a server computer that may form part of the system.

In FIG. 6 is shown a high-level block diagram illustrating exemplary components of the server computer (3012). The server computer may include a memory (3013), a processor (3015), a secure communications component (3019) and the control interface (3040). The server computer may further include an API component (3050) for providing communications with the customer cloud infrastructure (3036). A database component (3023) may be provided and the server computer may include a transmitting component and a receiving component (3021, 3025). One or more of the components of the server computer (3012) may also be provided by the customer cloud infrastructure (3036).

Figure 7:
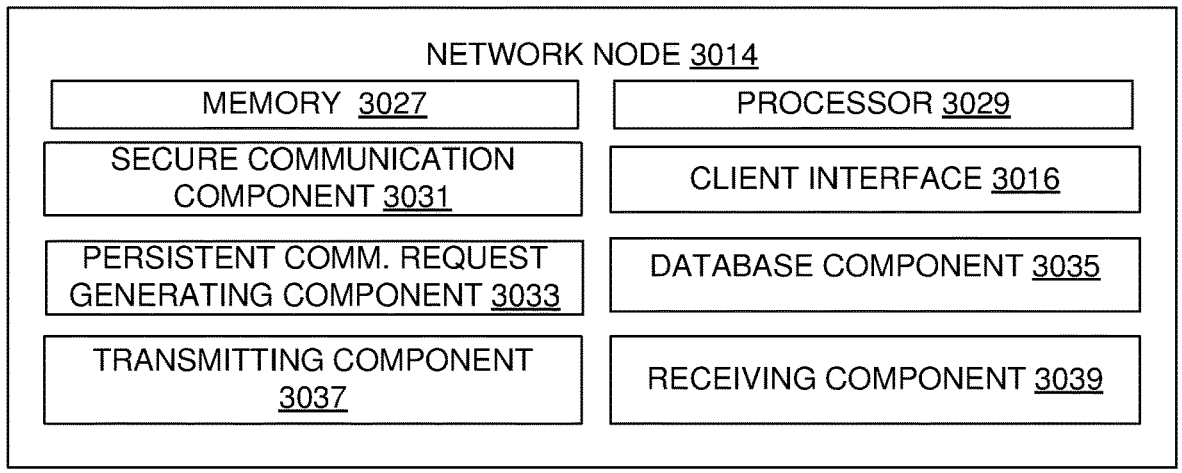
FIG. 7 is a high-level block diagram illustrating exemplary components of a network node that may form part of the system.

In FIG. 7 is shown a high-level block diagram illustrating exemplary components of the network node (3014). The network node may include a memory (3027), a processor (3029), a secure communications component (3031) and the client interface (3016). The network node or ADC may further include a persistent data communications request generating component (3033) for generating an outbound communications request to establish a persistent data communications session (3040) with the server computer (3012) as described below with reference to FIGS. 14-37. A database component (3035) may be provided and the server computer may include a transmitting component and a receiving component (3037, 3039). One or more of the components of the network node (3014) may also be provided by the server computer (3012), or by the customer cloud infrastructure (3036).

Figure 8:
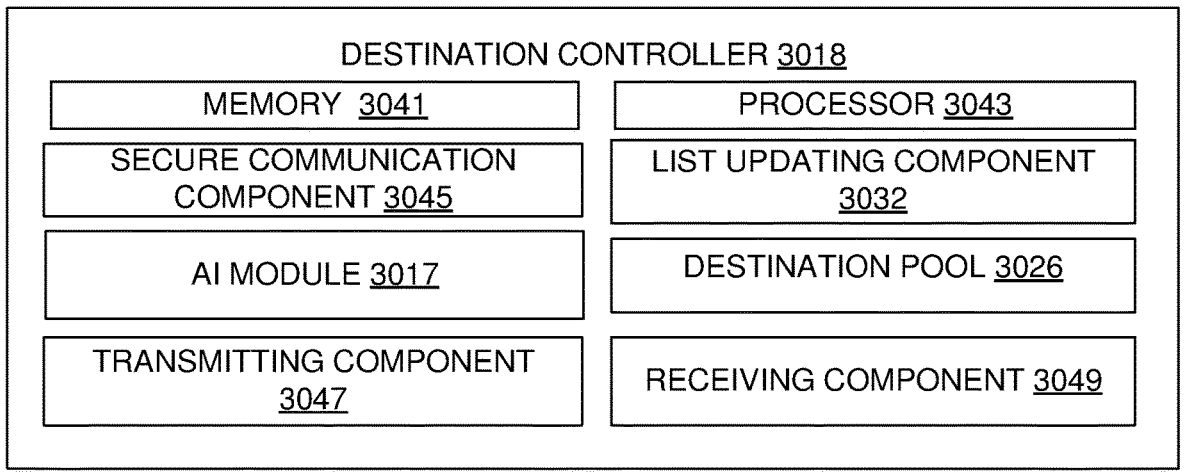
FIG. 8 is a high-level block diagram illustrating exemplary components of a destination controller that may form part of the system.

In FIG. 8 is shown a high-level block diagram illustrating exemplary components of the destination controller (3018). The destination controller (3018) may include a memory (3041), a processor (3043), a secure communications component (3045), and the list updating component (3032). The destination controller may further include the AI module (3017) and a database component or destination pool (3026). The destination controller (3018) may also include a transmitting component and a receiving component (3047, 3049). One or more of the components of the destination controller may also be provided by the server computer (3012), or by the customer cloud infrastructure (3036).

Figure 9:
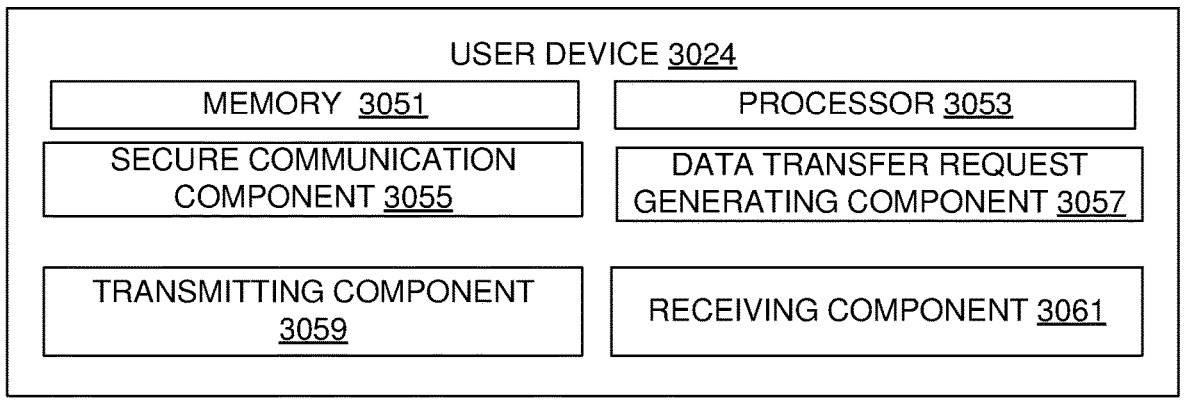
FIG. 9 is a high-level block diagram illustrating exemplary components of the user device.
Figure 10:
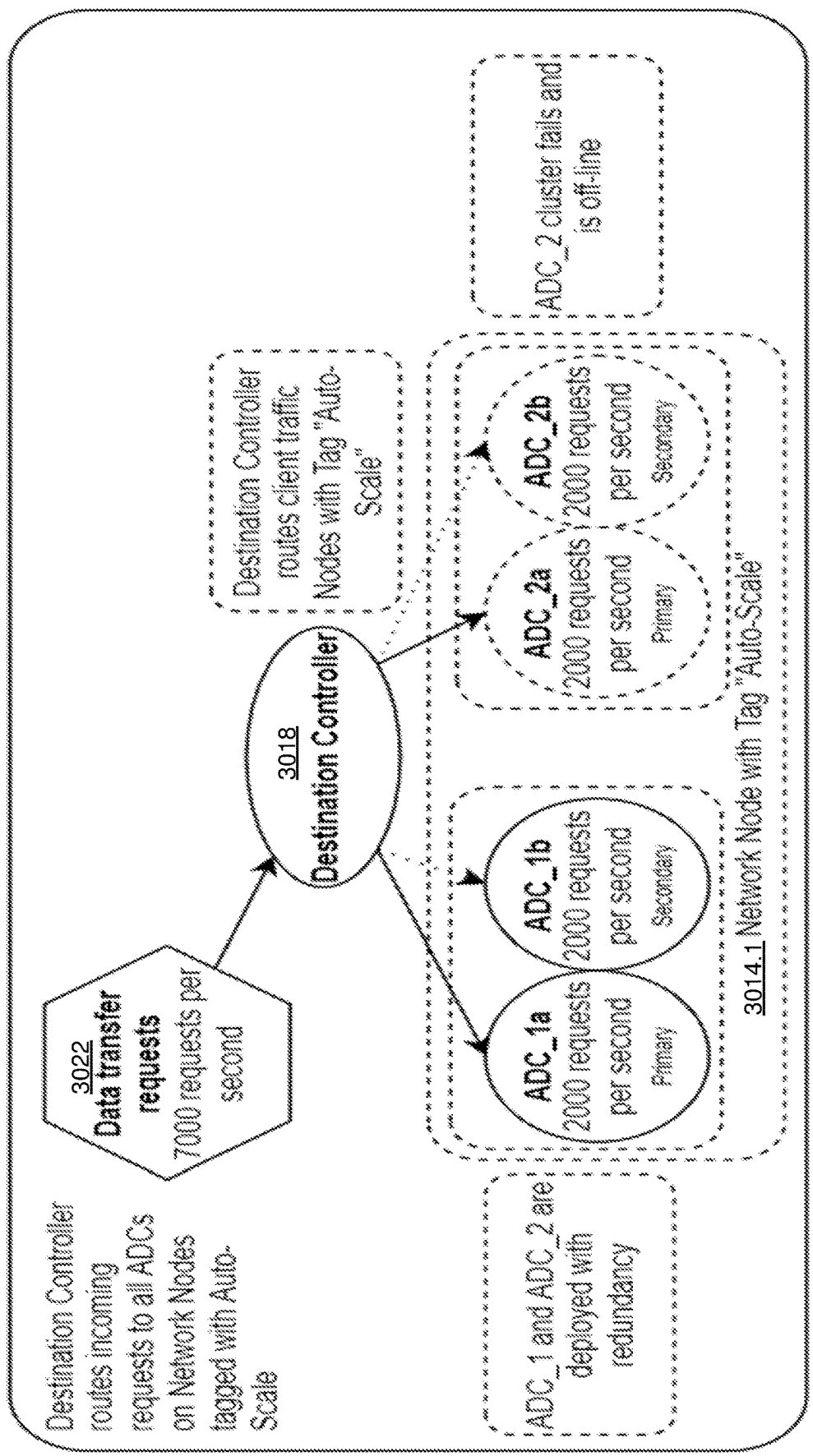
FIGS. 10-13 are high level block diagrams illustrating how ADC auto-scaling may be provided by the system.
Figure 11:
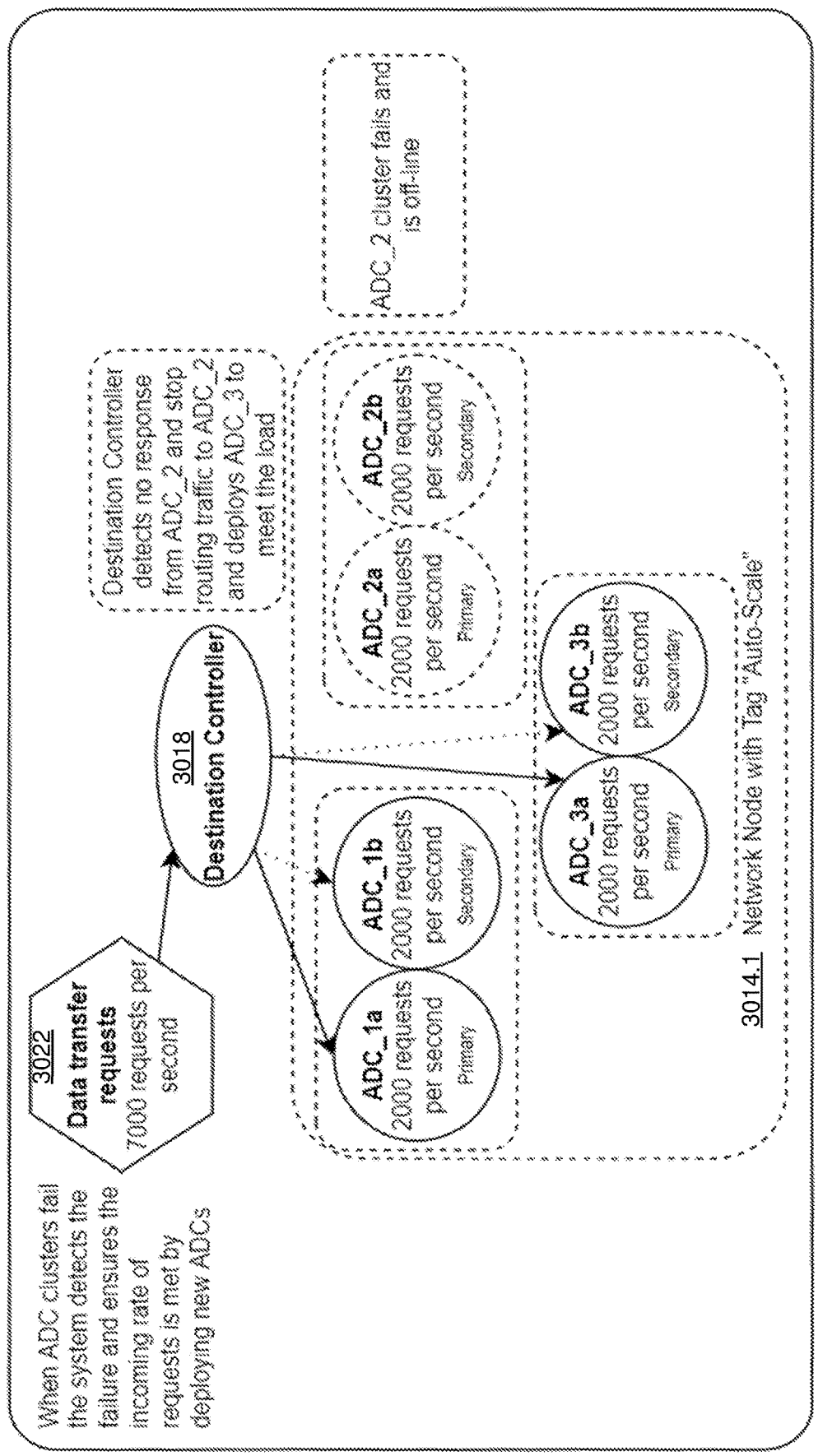
Figure 12:
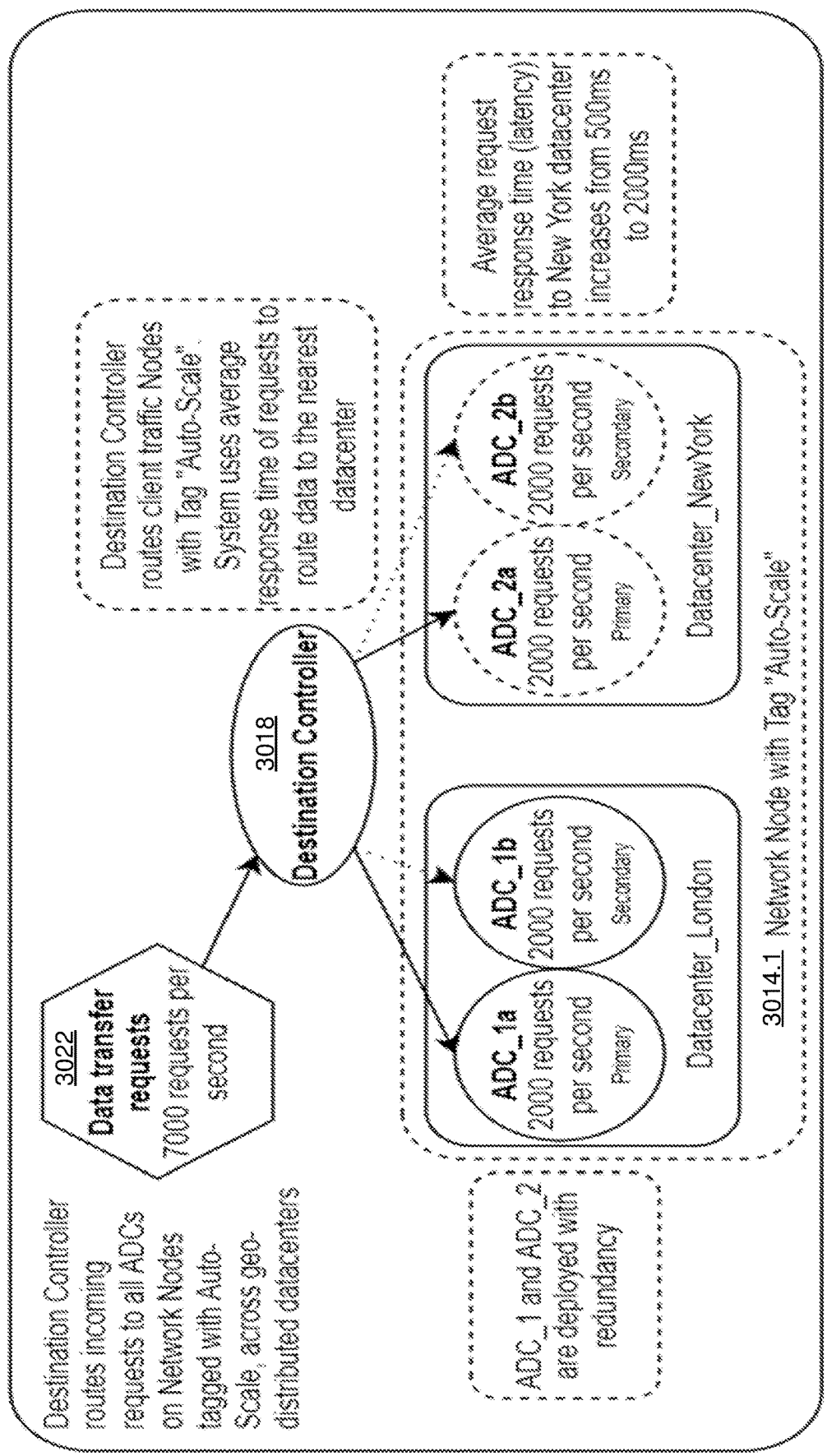
Figure 13:
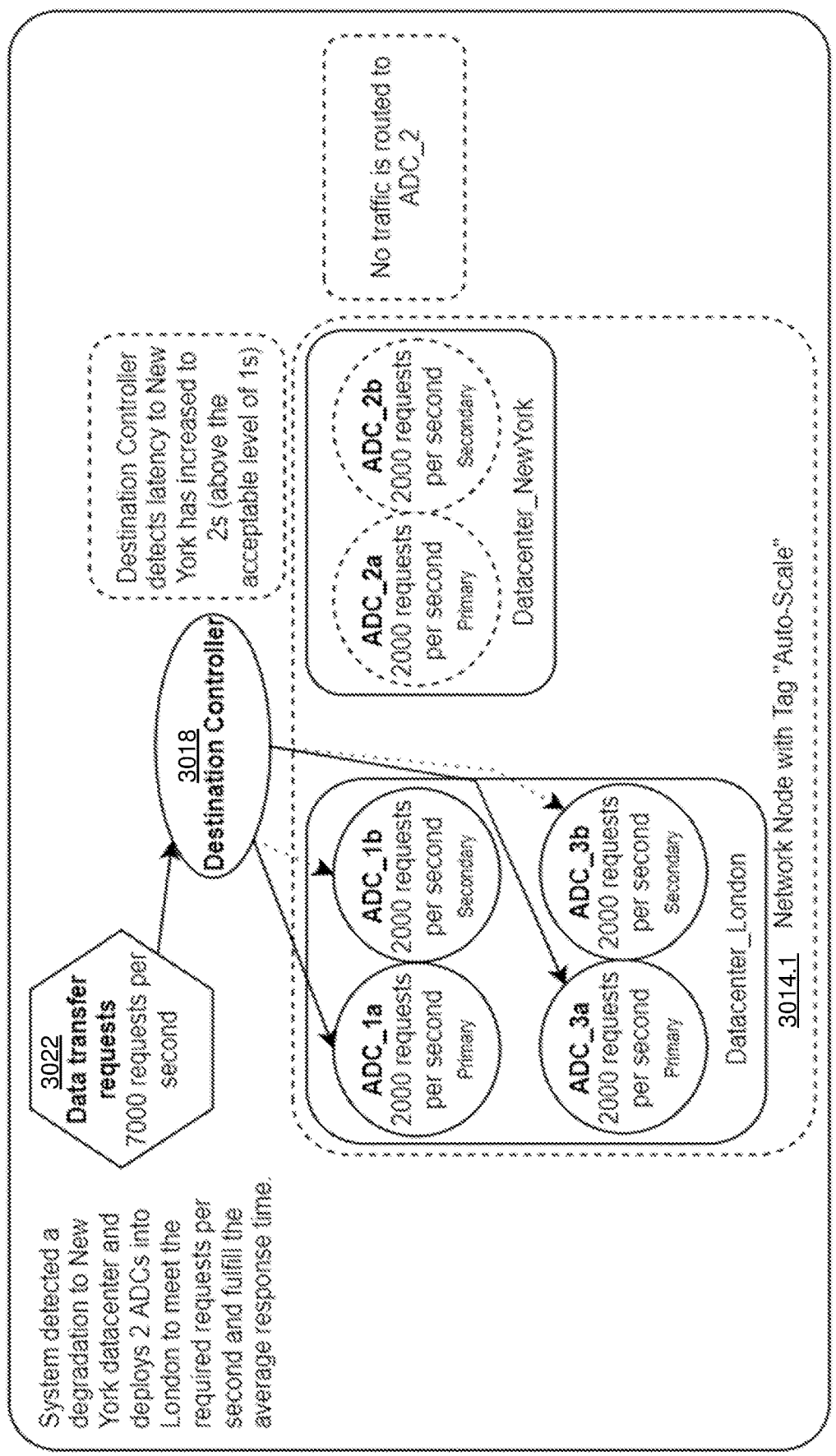

In FIG. 9 is shown a high-level block diagram illustrating exemplary components of the user device (3024). The user device (3024) may include a memory (3051), a processor (3053), a secure communications component (3055), and a data transfer request generating component (3057). The user device (3024) may further include a transmitting component and a receiving component (3059, 3061).

The ADC or application delivery controller may be a hardware device or a software implemented device. The ADC may provide load balancing and may also provide web acceleration and firewalling. The ADC may provide the point of entry to a service or set of services that may require high availability and/or high performance. The load balancing provide by the ADC or the server may provide monitoring and efficiently dispatching incoming requests to a pool of backends, such as web servers. The system may be a cloud-based system for deploying and managing ADCs in different environments. A small business may use the systems and methods disclosed, to deploy a single ADC into an Amazon™ Web Service (AWS), for on-premise virtual machine (VM) software installation (often referred to as VMware), or any custom Linux™ device. Larger organizations may use the disclosed systems and methods for running and controlling ADCs at scale—in multiple clouds, multiple AZs, and with many ADCs deployed. The disclosure may enable control of large numbers (for example thousands) of ADCs at once, and may facilitate managing micro-service, cloud-native or hyperscale deployments. An ADC may be deployed on one or on many network nodes.

Referring to FIG. 1, once the persistent data communications session (3040) is established, a data packet (3099) may be transmitted from the server computer (3012) to the client interface (3016) of the network node (3014). The data packet (3099) may be similar to a data packet (43.1) described below with reference to FIGS. 14-37, and may include a custom command, script, or recipe for a computing device at the network node (3014) or ADC to run or execute. One or more organizations may utilise the systems and methods disclosed, and the organizations may be grouped together. Configurations and servers for different organizations may be logically separated from other users and/or customers and/or organizations. Each user (3024a) may be assigned to an organization and all servers, configurations and services managed by that user may be held within that organization. Information from one organization may be kept invisible to other users or other organizations, and vice versa. The server computer (3012) may have access to, or may keep track of a number of network nodes (3014) (in other words, a number of managed nodes), node allowance, users, teams and subscription information may be made available to the server. Installation of the client interface (3016) onto an ADC or node may be performed manually, or automatically. Upon installation of the client interface software, a reference may be created to the node which the server (3012) may use to identify the node. The server may monitor health of nodes and keepalive states may be measured and reported at regular intervals and may be available via the control interface of the server computer (3012), or by using the relevant API (3050). System Load, Memory, Connection information, location and server information may be made available for each network node (3014.1 to n) managed by the server (3012). It may however be possible to issue an instruction to a specific node (3014) for any other specific information about that node. The network nodes (3014) may be operating system agnostic, and provided that a connection can be made with the server computer, communication may occur.

The destination controller (3018) may be one or more managed DNS addresses (or FQDNs) which point to one or more IPs, Nodes or Tags forming part of the system (3010). The destination controller may allow scalability of DNS and provisioning by using the system (3010) to serve DNS, and to set destinations based on Tags, labels, Nodes and ADCs instead of statically. This may enable redundancy, and auto-scaling network nodes without manual intervention. Additionally, it may enable the routing traffic to multiple data centers, or to the DR (3011) site in the event of a primary failure. The destination controller may enable routing of network traffic to nodes that are online—meaning that if a datacenter, node (3014), or backend (server computer (3012)) failure (or degradation) occurs, the system may move incoming traffic off of, or away from the problematic datacentre, node or server. The system (3010) may be operable in multi-cloud or multi-AZ environments, and may use a primary or backup configuration to route traffic to disaster recovery centers. This may be performed dynamically or automatically to provide auto-scalability. The system may allow network traffic to be sent to a tag group, for example including a cluster of ADCs. The number of ADCs in the tag group may be automatically scaled up or down as may be required to handle incoming traffic. Alternatively, the destination controller (3018) may send or direct active traffic to multiple endpoints, network nodes or ADCs at once. Uptime of near 100% may be provided on services or uptime of a service level agreement (SLA) on DNS queries may be provided, via our a DDoS-protected network. This may result in better performance of a DNS network compared to prior art systems and methods that the applicant is aware of. Global propagation, across a wide-spread, global, anycasted DNS network may be provided near-instantly or in near-real time. Traffic may be redirected to a more logical and efficient backend server globally, given the information that the ADC (3014) retains, stores or maintains from the servers (3012.1 to n) forming part of the system (3010).

For example: a first application server may exist in one geographic region (for example in San Francisco) and a second application server may exist in a second geographic region (for example in New York). The destination controller may be arranged to direct traffic accordingly. If the destination controller (3018) (or the system (3010)) detects that there is an outage elsewhere on the network which causes the response time to New York to be 400% above the standard, then traffic may automatically be re-routed to San Francisco.

In FIGS. 38-50 are shown a number of example screenshots (10001 to 10014), showing the example implementations of the control interface (3040) that may be used by an operator (3024*b*) of the disclosed systems and methods. Reference to "NOVA" should be construed so as to indicate a reference to the systems and methods disclosed herein.

Figure 38:
Figure 40:
Figure 41:
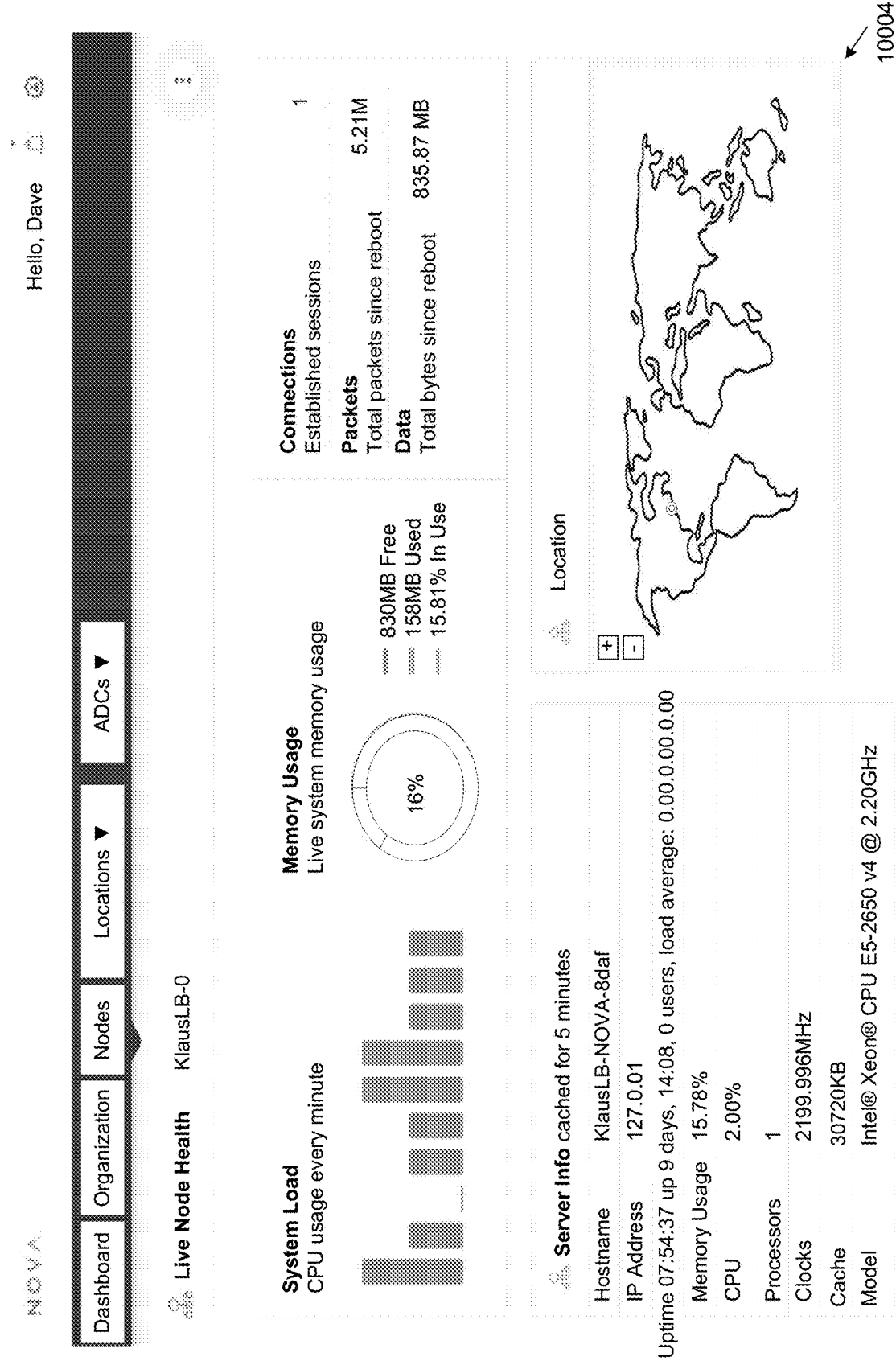

In the screenshot (10001) in FIG. 38, the operator (3024*b*) is able to see the number of network nodes that are online or offline as well as a geographical illustration of where the nodes are located. The number of sessions or connections of ADCs can also be seen. Average CPU utilization and average memory utilization may be shown via the control interface. In the screenshot (10002) in FIG. 39, a number of users in an organization may be managed and the number of nodes may be set. In the screenshot (10003) in FIG. 40, more information about nodes of each of a number of users is shown. In the screenshot (1004) in FIG. 41, overall statistics of system health, system load and memory usage is shown. In the screenshot (10005) in FIG. 42, information about Monitors, Alerts, Tags and Notifications are shown. In the screenshot (10006) in FIG. 43, more information is shown about Monitors, Log History and statuses of the various monitored nodes.

Figure 44:
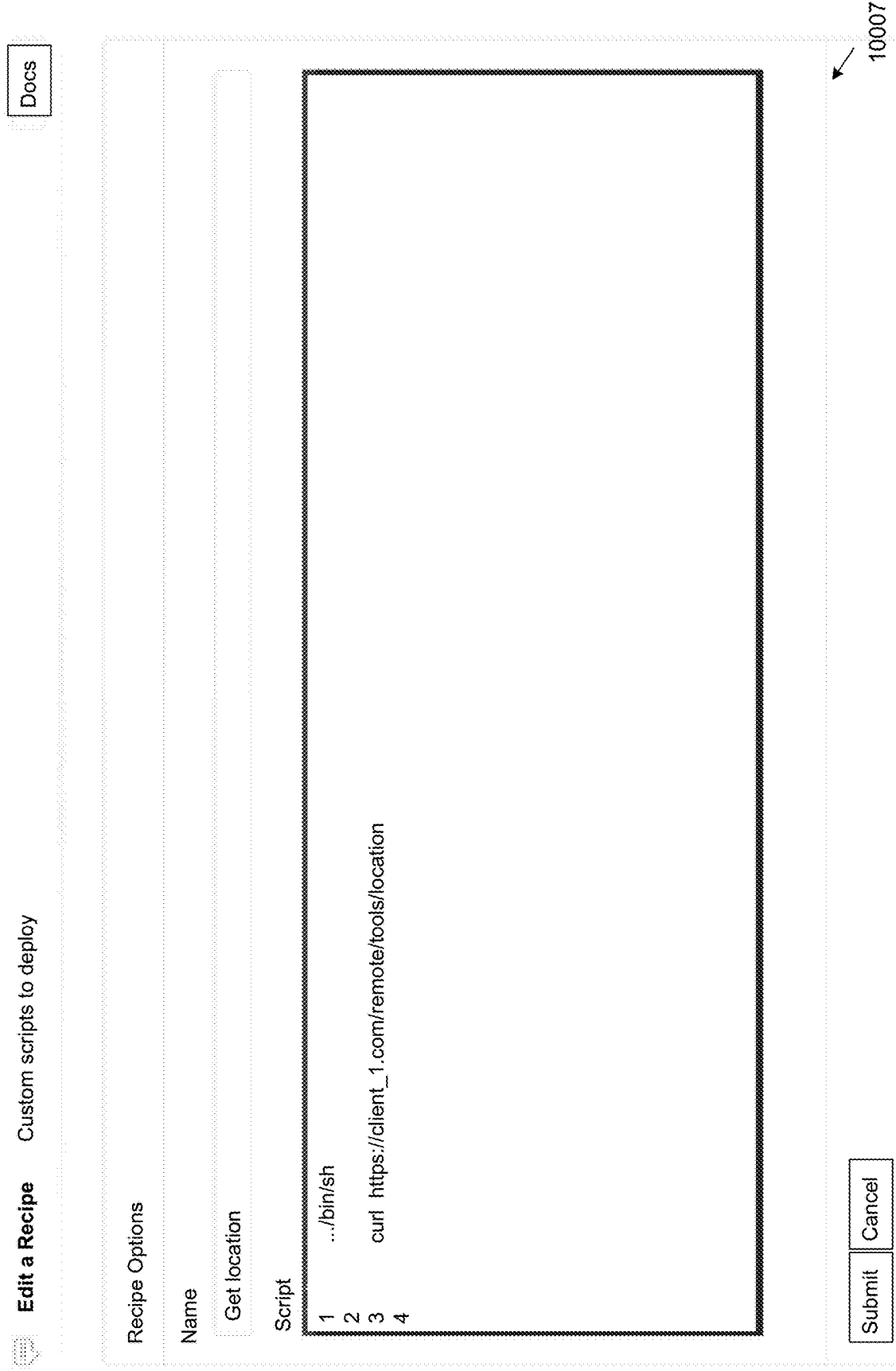
Figure 45:
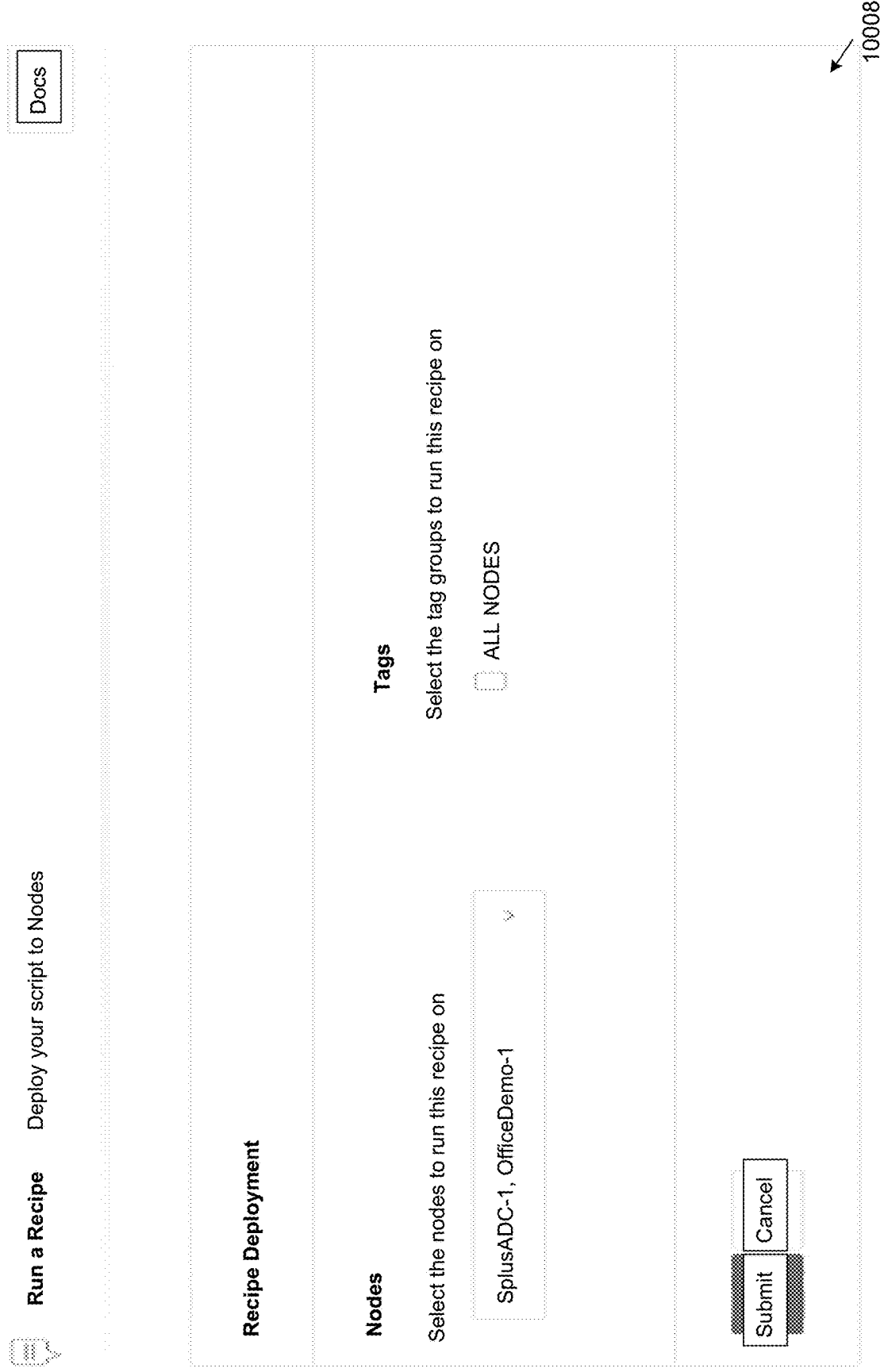
Figure 46:

In the screenshot (10007) in FIG. 44, there is illustrated how the operator (3024*b*) may issue or deploy an instruction, recipe or script (3099) to a node (3014). The script may for example cause the relevant node to return its location. In the screenshot (10008) in FIG. 45, there is illustrated how to deploy a recipe. A tick-box may be provided, for running the recipe, instruction or script only to nodes having a particular label or tag. In the screenshot (10009) in FIG. 46, there is shown a number of graphs and statistics about a number of queries or requests per second (for example for a particular node), for an hour, a day, or over a period of a month. The relevant numbers of queries may be displayed numerically or graphically. In the screenshot (10010) in FIG. 47, there is shown how manual IP addresses may be configured, types of health checks to be performed. Destinations or addresses may also be edited manually. In the screenshot (10011) in FIG. 48, there is shown details of the customer cloud (3036) as well as details about a number of managed endpoints, network nodes or ADCs managed by the cloud. In the screenshot (10012) in FIG. 49, there is shown an example of how nodes may be deployed by the operator (3024*b*). Health statistics are also shown, for example number of requests per second and a total amount of data transferred. In the screenshot (10013) in FIG. 50, there is shown information about the latency of each node (3014), as well as further information about the node (in the example the node is in the form of an ADC). In the screenshot (10014) in FIG. 51, there is shown more information about the plurality of managed ADCs, including a number of connections, cached items, cache size, cache rate and latency data.

Tagging or Labelling

Tags or labels may be applied by the server computer (3012) to one or more of the network nodes (3014.1 to n), ADCs, or even to the user devices (3024.1 to n). This may enable the server computer (3012) or the destination controller (3018) to group nodes (3014) together in simple or complex ways in order to perform other actions on them. These other actions may include monitoring, or running a recipe, custom command, or script on a tag (i.e. to be executed by one or more computing devices associated with that tag or label). In order to make the management of multiple nodes (3014.1 to n) easier and more efficient, the system (3010) may use a tagging system. When more network nodes or ADCs are added, one or more custom tags may be configured to identify that node (and others) by. For example, a tag or label may be applied by the server (3012) to a set of nodes as "aws" and "web". An operator (3024*b*) or customer of the system (3010) may require certain recipes to be deployed by computing devices having "aws" tags and other configurations or recipes that run on "web" tags. Many combinations of these may be possible.

Recipes, Custom Commands, or Scripts

Recipes may be referred to as shell scripts or instructions (3099) that may be deployed to one or many nodes (3014.1 to n) at a time. These instructions may be executed by a computing device at the ADC or network node, and the computing device may execute whatever is specified by the instructions. Results of the execution may be returned to the server computer (3012). A recipe may be a saved shell script, which may be deployed at any time to any node (3014) or to a group or collection of nodes (for example first to fourth nodes (3014.1 to 3014.4)). Given that it is a shell script, it may starts with a "bin/sh" executable at its top. After "bin/sh" the operator (3024*b*) may enter whatever is required to be executed by the node or endpoint.

As an example, the below recipe runs a ping on a network node (3014) and returns the response time to the server computer (3012).

!/bin/sh
/bin/ping -c 2 8.8.8.8

Deploying Recipes

Recipes (3099) may be deployed onto any number of Nodes or Node tags. A play button may for example be provided on the control interface (3040). When the play button for a recipe is clicked, the operator (3024*b*) may see a list of managed nodes (3014.1 to n) and tags and the operator (3024*b*) may can tick checkboxes on one or more of the tags to enable the nodes associated with the relevant tags. Applying tags or labels to network nodes may enable the operator (3024*b*) to run the recipe on many nodes at the same time.

Results

The recipes (3099) may utilize or implement a queue system, meaning they run in the background. The results may for example be collected in practice, by enabling software such as Slack™ for the organization of the operator (3024*b*), or via email. Below is an example of a Slack™ notice for the above Recipe example.

\*Recipe Result\*
\*Node\*: testThree
\*Recipe \*: Ping test
\*User\*: Admin
PING 8.8.8.8 (8.8.8.8) 56(84) bytes of data.
64 bytes from 8.8.8.8: icmp_seq=1 ttl=123 time=1.72 ms
64 bytes from 8.8.8.8: icmp_seq=2 ttl=123 time=1.57 ms
—8.8.8.8 ping statistics—
2 packets transmitted, 2 received, 0% packet loss, time 1001 ms
rtt min/avg/max/mdev=1.571/1.649/1.727/0.078 ms Telemetry and Monitoring The disclosed systems and methods may provide a flexible and customizable health monitoring system for nodes and ADC statistics. This may enable the operator (3024b) to customize alerts based on various metrics, and to receive notifications of these alerts via webhook, Slack, or email. The relevant metric or telemetry data (3020) that the operator (3024b) requires to be monitored can be set, and each metric or telemetry data may be compared against others. Below are some examples of basic monitors that may be created.

CPU usage is over 80%
Memory usage is over 70%
Connections are under 10
HTTP errors over 100

Notifications can be sent via webhooks, Slack and email, but other implementations are possible.

Monitors may be attached to Tags. This functionality may allows the operator (3024b) to monitor many nodes with a single rule. Any number of tags may be provided on a node (3014), and any number of tags may be attached to a monitor. Monitors or parameters relating to monitoring data may also function within groups of nodes or ADCs and individual servers. Health metrics from backend systems managed by the system (3010) may be obtained, which health metrics may be managed by the server computer (3012) or by the system (3010), which may provide useful analytics to an application server or to the operator (3024b) of the customer cloud infrastructure (3036) (or of the server computer (3012)). It should be appreciated that in some implementations, the operator (3024b) may manage a plurality of server computers (3012.1 to n) using the customer cloud infrastructure (3036). Telemetry and monitoring of the system (3010) may provide a cluster or set of servers or ADCs that can be viewed as a single service or as a software as a service (SaaS) and monitored accordingly.

Clouds

The operator (3024b) may add any number of public cloud providers (using API keys or tokens) for an organization. This may enable the system (3010) to deploy into a customer cloud infrastructure (3036) associated with the operator (3024b), as well as to read information about backends (such as virtual machines of the organization or of the operator (3024b)). This may enable the operator (3024b) to configure ADCs to automatically send traffic to matching tags, or Amazon™ Machine Image (AMI) IDs on the cloud. This may enable auto-scaling, allowing the system (3010) to automatically detect, deploy and manage ADCs based on metrics monitored holistically by the system (3010).

ADCs (Application Delivery Controllers)

The system (3010) may allow the creation of custom TCP load balancers, for example where the operator (3024b) specifies which ports to map and where. Advanced configurations for specific protocols, such as Hypertext Transfer Protocol (HTTP) or Hypertext Transfer Protocol Secure (HTTPS) may also be provided. All the ADC types may be enabled to send data to any of the ADC backends forming part of the system (3010). For example, manual IP addresses, AWS AMIs, etc. may be facilitated. The HTTP ADC may be provided by plain text Layer 7 HTTP to HTTP proxy, supporting sticky sessions, HTTP health checking and web acceleration. This may facilitate websites running plain HTTP (port 80).

HTTPS

The HTTPS ADC may be provided by a Layer 7 SSL HTTPS to HTTP/S proxy, supporting sticky sessions, HTTP health checking and web acceleration. The operator (3024b) may terminate SSL on the system (3010), or re-encryption may be performed after decryption, to pass the traffic through. Backends or backend server computers (3012.1 to n) may be used by the ADCs as the target location for traffic to be directed to. Backends may be automatically discovered within the Cloud infrastructure, and included in, or identified in the system using tags. If the operator (3024b) needs to keep the traffic encrypted, a Custom TCP load balancer may be used with just port 443 configured. Advanced HTTP/S functionality provided by the system may require being able to read SSL certificates.

DNS

The ADCs may be provided by or may be referred to as DNS gateway ADCs. The DNS gateway ADCs may enable the system (3010) to load balance incoming TCP and User Datagram Protocol (UDP) DNS requests (preferably at a very high rate). However, the system (3010) need not necessarily provide a caching DNS service. This means all requests may go through to DNS backends or server computers (3012). The applicant has found that practical implementations of the system may enable about 35,000 DNS requests per second on a single core or on a single CPU.

API Gateway

The API (3050) or gateway may be similar to the API (50) described below with reference to FIGS. 14-37. The API gateway (3050) may be similar to that of a HTTPS proxy, but designed to be a frontend gateway for an API of the operator or customer (3024b). It may support access restriction, path based routing and rate limiting.

Microsoft™ Exchange

Microsoft™ Exchange may require a large number of ports and URLs to be load balanced through to work properly. The Exchange ADC type provided by the present disclosure may enable this to be handled, as well as configuring timeouts and properties for Exchange/DAC cluster(s).

Remote Desktop Protocol (RDP)

A RDP may be provided by the systems and methods disclosed. An RDP ADC implementation may allow the operator (3024b) to load balance data to any RDP service (typically a Microsoft™ Remote desktop Service (RDS)). Data may be sent to connection brokers or directly to the RDP servers themselves. The systems and methods disclosed may automatically support RDP cookies for user stickiness and may handle timeouts, user migration, etc.

Certificate Management

The disclosure may enable the operator (3024b) and/or the server computer (3012) to add and manage SSL certificates. Alerts and monitoring may be available for expiry, and these features may be integrated in a software implementation.

ADC Attachments

ADC Attachments may be used to allow ADCs to be automatically deployed and brought online on a node that is being attached.

Providing a Persistent Data Communication Session—Description Relating to FIGS. 14-37

Figure 14:
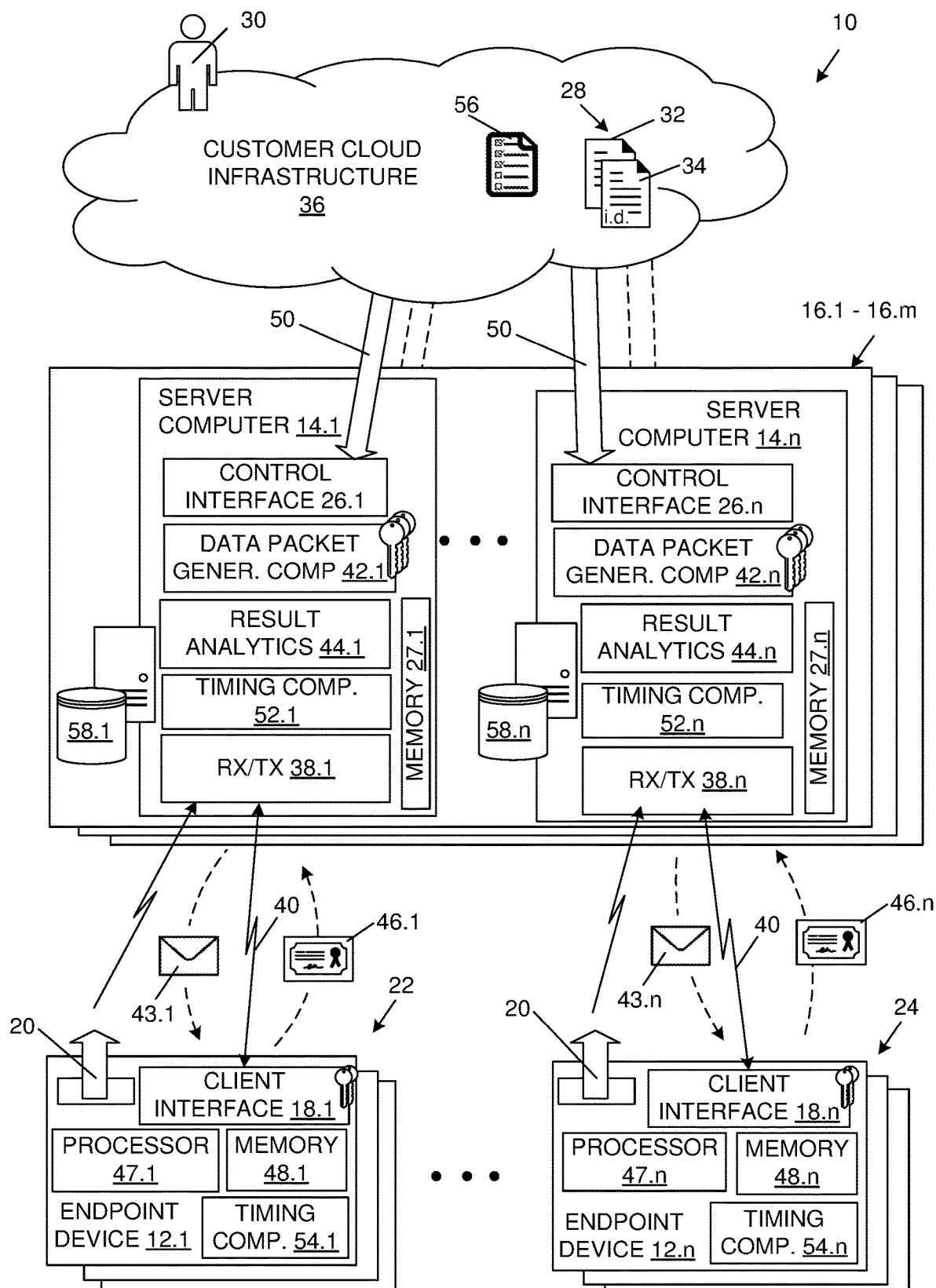
FIG. 14 is a high-level block diagram showing an exemplary implementation of a system for controlling a plurality of endpoint devices.

Referring to FIG. 14, there is provided a system (10) for controlling a plurality of endpoint devices (12.1 to 12.n) The system (10) may include at least one server computer, and may include a plurality of server computers (14.1 to 14.n) in data communication with the plurality of endpoint devices (12.1 to 12.n). Each server computer (14.1 to 14.n) may have a processor associated therewith. The servers (14.1 to 14.n) may be arranged in one or more server clusters (16.1 to 16.m), for example to provide server redundancy or to increase the number of endpoint devices that are able to be controlled. Each of the endpoint devices (12.1 to 12.n) may include a client interface (18.1 to 18.n). As is shown in FIG. 14, a first server computer (14.1) may be associated with a first group (22) having a number of endpoint devices (12), with an $n^{th}$ server (14.n) being associated with a second group (24) having a number of endpoint devices (12). In one example embodiment, an endpoint device (12) may be a thin client device configured to initiate communications with a server. Also, by way of example, the endpoint device (12) does not require a central registry in order to connect with the server. The client interface may be referred to as a thin client as the client interface may be arranged to occupy a small amount of storage space (for example, less than 10 Megabytes in some embodiments described below). A control interface (26.1) of the server (also described in more detail below) may be referred to as a thin server, as it may also be arranged to occupy a small amount of storage space (for example, less than 10 Megabytes in some of the described embodiments). The thin client and thin server may facilitate efficient operation of the system (10) as the required computing power and computing time needed may be reduced, compared to known systems that the applicant is aware of, as will be described below.

The server computers (14.1 to 14.n) may form part of, or may be connected to a customer cloud infrastructure (36) which may include or be connected to a plurality of other server computers forming part of the system (10). Each server computer may include a processor and a database thereat. The customer cloud infrastructure (36) may for example be associated with a customer (30) which may, in turn, be associated with one or more of the endpoint devices (12.1 to 12.n), however, other implementations are possible. Each server computer (14.1 to 14.n) may include the control interface (26.1 to 26.n) that may be configured to receive command data (28) to control one or more of the endpoint devices (12.1 to 12.n). The command data may be received from a customer (30) that wishes to control one or more of the endpoint devices (12.1 to 12.n). The command data (28) may for example include endpoint device instructions (32) and endpoint device identifiers (34). The server (14.1) may include a receiving component (38.1) for receiving multiple connection requests, each connection request originating from an endpoint device (12.1) identified by the received endpoint device identifiers (34).

The server computer (14.1) may be operable, responsive to receiving the connection request (20) of each endpoint device, to establish a persistent data communication session (40) between the server computer (14.1) and the client interface (18.1) of the endpoint device (12.1). In one example embodiment, a persistent data communication session may be a communication session that is initiated by a handshake process and continues until the connection is dropped. In some of the embodiments described, the endpoint device may automatically attempt to re-establish the connection after the connection is dropped or terminated. A secure HTTPS tunnel may be utilized or implemented in the persistent data communications session. A data packet generation component (42.1) may be provided at the server (14.1) for generating a data packet (43.1) which may include the command data (28) or part thereof. The data packet (43.1) destined for endpoint device (12.1) may include customer instructions or endpoint device instructions (32) for that particular endpoint device (12.1) and which may be specified by the customer (30).

At the server (14.1), a data packet transmitting component (38.1) may be operable to transmit the data packet (43.1) via the persistent data communication session (40) to the client interface (18.1) of each endpoint device identified by the endpoint device identifiers, to enable the endpoint device instructions (32) to be carried out by the endpoint device (12.1). The server (14.1) may further include a result analytics component (44.1) that may be operable to analyze result data (46.1) received by the receiving component (38.1) from the client interface (18.1) of the endpoint device (12.1), once the instructions are carried out. The instructions may be performed or carried out by a processor (47.1) associated with the endpoint device (12.1). In an example embodiment, the client interface (18.1) may be installed in a memory (48.1) or memory component of the endpoint device (12.1). It will be appreciated that other endpoint devices and other server computers of the system (10) may have similar components and features to endpoint device (12.1) and server computer (14.1).

The endpoint device instructions (32) may be configured to cause the processor (47.1) associated with the endpoint device (12.1) to carry out the endpoint device instructions (32). These endpoint device instructions may for example include any one or more of a read command, a write command and a run or execute command. Data, such as larger data files may also be transferred from the endpoint device (12.1) to the server computer (14.1) or vice versa during the persistent data communication session (40).

The client interface (18.1 to 18.n) of each endpoint device (12.1 to 12.n) may be configured, once the connection (40) between the client interface (18.1) and the server computer (14.1) is lost, to automatically transmit another outbound connection request (20) for the server computer (14.1) to reconnect or re-establish the persistent data communication session (40). The client interface (18.1) may further be configured to repetitively attempt to re-establish the persistent data communication session. These attempts may for example occur at intervals of once per second, or at increasing intervals of about 1, 2, 3, 4, 5, 6, 7, 8, 9, or up to 10 seconds, or at any other suitable interval, as will be described in more detail below with reference to FIG. 29.

The client interface (18.1) may be a standard client interface, and may be software that is downloaded and installed onto the endpoint device (12.1) from the server computer (14.1) during the persistent data communications session (40). Alternatively, the standard client interface (18.1) may be pre-installed onto the endpoint device during manufacture thereof. Updates such as client interface updates or firmware updates may also be transferred to the endpoint device (12.1) during the persistent data communications session, if needed. The client interface (18.1) may be hard coded in some embodiments. The client interface (18.1) may be dynamically updated during the persistent data communication session (40).

In an embodiment of the system (10), the client interface (18.1) may be configured, if the data packet (43.1) is received and the persistent data communication session (40) is subsequently terminated for some reason, to nevertheless cause the endpoint device (12.1) to carry out the endpoint device instructions (32), and then to transmit the result data (46.1) once the persistent data communication session (40) is re-established again.

The customer cloud infrastructure may be in data communication with the control interface (26.1) of the server computer (14.1) using an application programming interface (API), for example using a representational state transfer (REST) API (50) and utilizing Hypertext Transfer Protocol Secure (HTTPS). However, other protocols may also be used.

The system (10) may provide the advantage that the persistent data communications session (40) need only be established once, and then a HTTPS tunnel (40) may be established. After the outbound request (20) is received by the receiving component (38.1) at the server (14.1), a handshake process may be performed between the server computer (14.1) and the client interface (18.1) of the endpoint device (12.1) to initiate the persistent data communication session (40). The persistent data communication session (40) may be a secure link which is established or negotiated, after which the server computer (14.1) may transmit the data packet (43.1) via the persistent data communication session (40) to the client interface (18.1) of the endpoint device (12.1). Hence, subsequent responses or result data (46.1) and data packets (43.1) may be sent and received via the secure HTTPS tunnel (40), without requiring the secure link to be re-negotiated. In other words, the handshake process need only be performed once. This is unlike conventional configurations where server computers connect to a plurality of endpoint devices in batch or sequential mode, where all of the connections are not held open in a persistent manner. Moreover, conventional server computers may require secure communications to be re-established or re-negotiated numerous times during a single communications session with an endpoint device, even if the connection is not interrupted, which may increase the required processing power and required processing time.

The data packet (43.1) may be time stamped by a timing component (52.1) at the server (14.1) and the result data (46.1) may, in turn, be time stamped by a timing component (54.1) of the endpoint device (12.1). The result data (46.1) may include an indication of whether the endpoint device instructions (32) were carried out successfully or not, or it may include error data if the endpoint device instructions (32) were not carried out successfully. Once the result data (46.1) is received at the server (14.1), it may be transmitted or relayed to the customer cloud infrastructure for further processing. The result data (46.1) may also be analyzed by the result analytics component (44.1) at the server (14.1).

When the endpoint device instructions (32) in the data packet (43.1) are received by the endpoint device (12.1), the instructions may cause the processor (47.1) to carry out the endpoint device instructions (32). These endpoint device instructions (32) may include any one or more of a read command, a write command and a run or execute command. Data, such as larger data files, may additionally be transferred from the endpoint device (12.1) to the server computer (14.1), or vice versa, during the persistent data communication session (40).

Still referring to FIG. 14, the control interface (26.1) of the server computer (14.1) may be configured to receive a list (56) of the endpoint device identifiers from the customer (30) for storage in a database (58.1) associated with the server computer (14.1). The server computer may, in turn, be configured to access the list in the database (58.1) to retrieve each endpoint device identifier, for example an identifier for each endpoint device (12.1, 12.2, 12.3 . . . ). The relevant endpoint device identifier may be included in the data packet (43.1) destined for that endpoint device (12.1) during the persistent data communication session (40). The server computer (14.1) may be arranged to utilize or implement a look-up table, or the like, to retrieve the endpoint device identifier from the list (56).

When the data packet (43.1) is generated or packaged by the data packet generation component (42.1) of the server computer (14.1), the data packet may be encrypted at the server (14.1). Public and private key cryptography may be used to encrypt the data packet (43.1) (i.e. asymmetric cryptography) at the server (14.1). The client interface of the endpoint device (12.1) may, in turn, decrypt the data packet (43.1) when it is received via the persistent communication session (40). Public and private key cryptography may again be used on the client side, with the client interface (18.1) of the endpoint device (12.1) encrypting the result data (46.1) before it is transmitted back to the server (14.1). The server computer then decrypts the result data (46.1) when it is received from the client interface (18.1) of the endpoint device (12.1) during the persistent data communication session (40). In an exemplary embodiment of the present disclosure, the plurality of endpoint devices (12.1 to 12.*n*) may form part of an Internet of Things (IoT) network. However, different groups of endpoint devices (such as the first group (22) and the second group (24)) may form part of different digital networks controlled by the server computers (14.1 to 14.*n*) or server clusters (16.1 to 16.*m*).

The communications of the persistent communication session (40), as well as the communications from the customer cloud infrastructure (36) to the servers (14.1 to 14.*n*) may be provided by a communications protocol. The communications protocol utilized or implemented during the persistent communications session (40) may be a unicast protocol.

In the present embodiment, the communications protocol may include a set of protocol rules that governs communications between the server computers (14.1 to 14.*n*) and the client interface (18.1 to 18.*n*) of each endpoint device (12.1 to 12.*n*). The set of protocol rules may be referred to as a contract, and may include, but need not be limited to, any one or more of the following protocol rules:

- that only endpoint device instructions (32) originating from the customer (30) are to be carried out by each endpoint device (12.1 to 12.*n*), or by a particular endpoint device (12.1), or by a group of endpoint devices (e.g. the first group (22));
- that the data packet (43.1) can only be received from the server computer (14.1) during the persistent data communication session (40);
- that only a data packet (43.1) received from the server computer (14.1) and including the endpoint device identifier (34) (e.g. a unique identification (ID) code of endpoint device (12.1)) is able to be utilized or accessed by that particular endpoint device (14.1);
- that the endpoint device (12.1) or client interface (18.1) is only able to transmit the result data (46.1) to the server computer (14.1) if the received data packet (43.1) includes instructions originating from the server computer (14.1); and
- that the endpoint device (12.1) is only able to transmit the result data (46.1) to the server computer (14.1) if the result data is a directly derivable result of the endpoint device instructions (32).

The communications between the customer cloud infrastructure (36) and the server computer (14.1), as well as between the server computer (14.1) and the client interface (18.1) of the endpoint device (12.1) may be provided by a secure communications link, for example by way of Hypertext Transfer Protocol Secure (HTTPS) utilizing or implementing Secure Sockets Layer (SSL) or Transport Layer Security (TLS), or any other cryptographic protocol, including asymmetric cryptography that utilizes public and private key pairs. In a present embodiment of the system (10), the communications may be provided by HTTP or HTTPS tunneling technology, however, embodiments may be possible that utilize User Datagram Protocol (UDP), or any other similar protocol.

To establish the persistent data communication session, the outbound connection request (20) is transmitted from the endpoint device (12.1). Then, the server receives (38.1) the request (20) and an authentication of the endpoint device may be performed. The server computer (14.1) may look up the endpoint device (12.1) in the list (56) (which may be stored in the database (58.1) received from the cloud (36)) and may authenticate the endpoint device (12.1) before establishing the persistent data communication session (40) with the client interface (18.1) of that endpoint device (12.1). The handshake process as described above may be performed.

In the embodiment of the system (10), this handshake process may be performed in less than a second; alternatively, in less than 500 milliseconds (ms), and preferably in about 150 milliseconds This will also be discussed in more detail below. The persistent data communication session (40) may be a bi-directional session that enables communication between the server computer (14.1) and the client interface (18.1) of the endpoint device (12.1). The handshake and authentication process may open up the HTTPS tunnel (40) or persistent data communication session and thus enables the server computer (14.1) to transmit the data packet (43.1) very quickly and more efficiently than prior art methods or systems that the applicant is aware of. This may further enable controlling endpoint devices (12.1 to 12.n.) at a much larger scale. The data packet (43.1) may be transmitted via the persistent data communication session (40) to the endpoint device within less than 100 milliseconds, and preferably within about 25 milliseconds or within about 5 milliseconds. Stated differently, a latency of the bi-directional persistent data communication session may be about 5 milliseconds, excluding a round trip time (RTT).

This low latency, coupled with the persistent data communication session (40) may enable the system (10) to control each endpoint device (12.1 to 12.n) in near-real time. The servers (14.1 to 14.n) and other clusters (16.1 to 16.m) may thus control each endpoint device (12.1 to 12.n) in near real-time. This may enable control applications that are not possible with currently available systems and methods. The system (10) may for example be configured to implement, with the server computer (14.1) or with the customer cloud infrastructure (36), a machine learning algorithm to react or to respond in near real-time to result data (46.1 to 46.n) received from one or more of the plurality of endpoint devices (12.1 to 12.n).

It will be appreciated that the server computer (14.1) may be a physical server or a virtual server. In the present embodiment, the client interface (18.1 to 18.n) of each endpoint device (12.1 to 12.n) may be standardized so that it may operate on various types of devices, and may be a thin client. The control interfaces (26.1 to 26.n) of the server computers (14.1 to 14.n) may, in turn, each be a thin server. The thin client (18.1) of endpoint device (12.1) may thus be configured to pull data from the thin server (14.1). The thin client may occupy less than 100 megabytes, alternatively less than 10 megabytes of storage space on a memory (48.1 to 48.n) associated with each endpoint device (12.1 to 12.n) which occupied storage space may exclude the memory required for the given instruction and contents of any packets or files within. The thin server may, in turn, occupy less than 100 megabytes, alternatively less than 10 megabytes of storage space on a memory (27.1 to 27.n) associated with each of the server computers (14.1 to 14.n) which occupied storage space may exclude the memory required for the given instruction and contents of any packets or files within. The server computers (14.1 to 14.n) may be endpoint-agnostic. The thin server may be software downloaded onto the server computers (14.1 to 14.n) from the customer cloud infrastructure (36). The thin client or client interface (18.1 to 18.n) of each endpoint device (12.1 to 12.n) may also be endpoint-agnostic.

Figure 15:
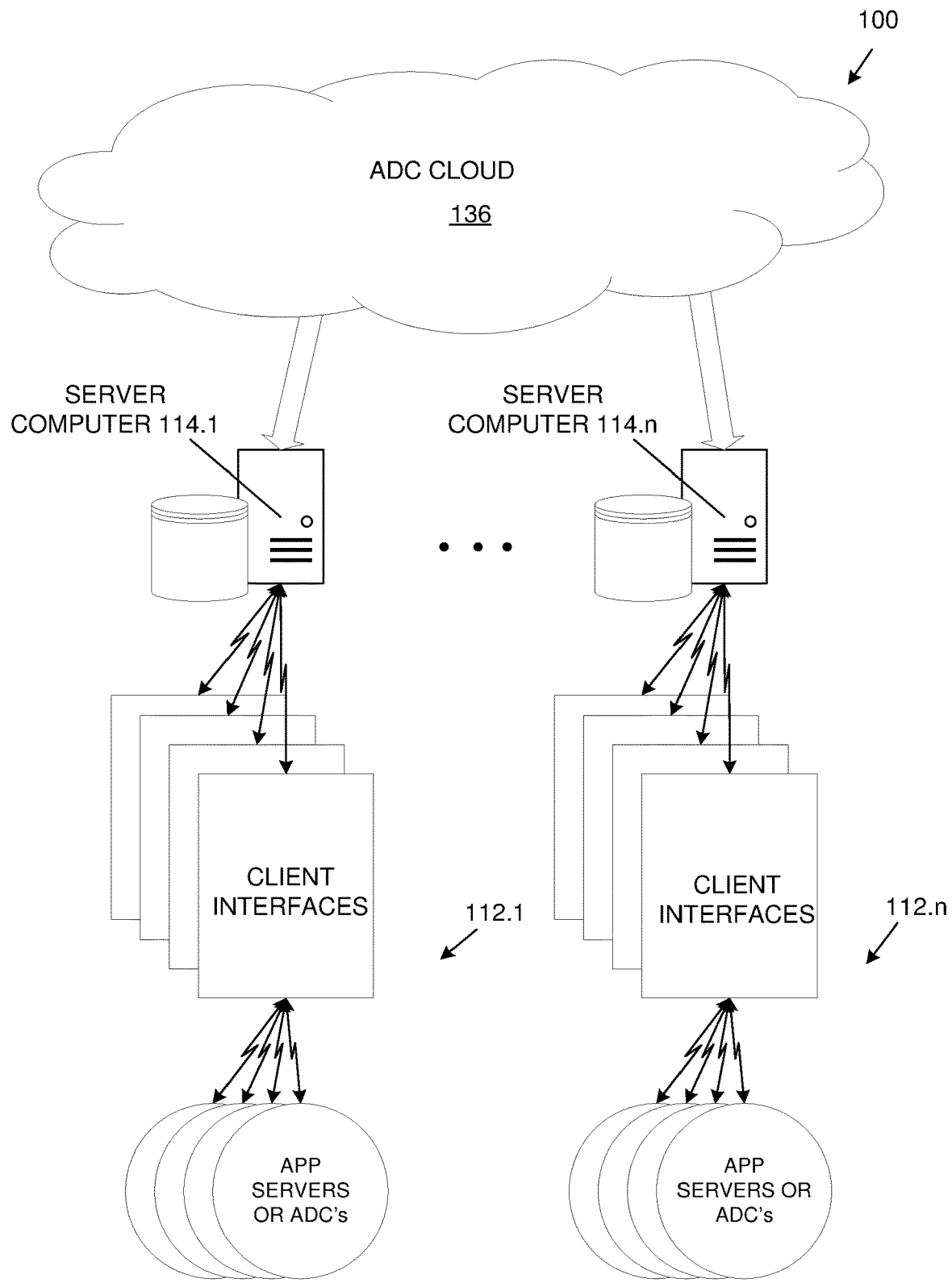
FIG. 15 is a high-level block diagram similar to FIG. 14, however showing an example use of the system by a major digital content provider (MDCP)

In FIG. 15 is shown a schematic high-level diagram showing an example implementation where a system (100) for controlling a plurality of endpoint devices (112.1 to 112.n) is provided for a major digital content provider (MDC). An Application Delivery Controller (ADC) cloud (136) is provided. The major digital content (MDC) provider may for example have a global set of a large number of ADCs, for example 10 000 ADCs may require control. The ability to communicate with all the ADCs through 1 or many servers (114.1 to 114.n) at very low-latency (near real-time), or as near as possible to simultaneously may be provided by the embodiments described herein.

Referring to FIGS. 14 and 15, the read, write and run commands (32) described above may be used. The read command may include reading data from the endpoint device (112.1). For example, reading data from configuration files, log files or obtaining live system information may be performed during the persistent data communication session (40). Moreover, network configuration settings may be validated. Data may be written to the endpoint device (112.1), and updating configurations for networking or the ADC may be performed. Execute commands on the endpoint device may be performed, such as restarting the endpoint device (112.1). Large files may also be transferred during the persistent data communications session (40). It may provide advantages to issue commands from the servers (114.1 to 114.n) to any or all of the clients (112.1 to 112.n), so that these commands may be issued and executed substantially in parallel and with as low latency as possible.

Every communication session (40) connection may be established securely, and a global standard library may be used. As described above, to comply with security best practices and to keep data secure, the communication session (40) may be SSL validated using SSL certificates over HTTPS. In the embodiment shown in FIG. 15, the endpoint devices (112.1 to 112.n) may be ADC's or App servers. In order to effectively manage the set of ADCs, it may be required to send and receive instructions between the servers (114.1 to 114.n) and the clients or client interfaces (112.1 to 112.n) in order to provide updates to configuration settings on the ADCs as well as sending data back from the clients (112.1 to 112.n) to the servers (114.1 to 114.n).

It may be necessary while transferring a large file from the ADC (112.1) to the server (114.1), mid-way through that file transfer during the communication session (40), to obtain statistics of a processor and memory (not shown in FIG. 15) associated with the relevant ADC (112.1). In the present embodiment, the system (100) may have the ability to establish multiple simultaneous connections between the server (114.1) and the ADC (112.1) for optimized communications (or as near as possible to simultaneous).

Implementing this protocol with an MDC with as low as possible latency may facilitate effectively scaling the number of ADCs (112.1 to 112.*n*) able to be controlled by the system (100). Outbound connection requests may thus originate from the ADC servers (i.e. from the endpoint devices (112.1 to 112.*n*)). The ADCs (112.1 to 112.*n*) may be located in a so-called demilitarized zone (DMZ) or subnetwork which may be locked down. The protocol or system (100) may therefore enable outbound connection requests. Outbound connections from the ADC servers (112.1 to 112.*n*) may be advantageous as it lowers the complexity of the networking and security infrastructure, and may for example remove the requirement for firewall updates. The outbound connection request may provide the benefit that the ADC server does not need to maintain a list of connections where a client may possibly exist, but only the client's current connection details.

If an interruption in the network or connectivity occurs between the ADC (112.1) and the server (114.1), the ADC (112.1) may continue and attempt to re-establish connection to the server (114.1). Once the data communication session is re-established, the instructions or work that commenced during the down-time may be sent back to the server (114.1). Hence, the endpoint devices or ADCs (112.1 to 112.*n*) may continue to function if there is a break in the connection between the server (114.1) and the ADC (112.1). Additionally, any instruction that was successfully received by the ADC that does not require a connection with the Server, may be executed, the result may be stored at the ADC or endpoint device (112.1), and the result may then be returned back to the server (114.1) once the connection or data communication session has been re-established.

There is hence provided the ability to schedule instructions on both the server (114.1) and the ADC (112.1) supported by a storage system to store results. Automation may thus be provided with the systems and methods described herein. Scheduling of instructions on both the server (114.1) and the client or endpoint device (112.1) may thus be performed. A scheduling system may also be supported with a local storage engine, so that in the event of a disconnect between the server (114.1) and the client (112.2), the schedule and/or instructions may be continued offline.

A RESTful API may be used providing feature parity which may enable integration with components of the system (100). A number of endpoint devices, for example ranging from 10's to millions may be controlled with the system (100) as it enables fast (near instant) outbound communication as well as near real-time control. Server/Management layer systems may require the ability to communicate to all the controlled or managed endpoint devices simultaneously, or near simultaneously (or ad-hoc). Changes or updates may additionally be pushed from the server to the endpoint devices which may cause them to read update data.

The system (100) may further plug into services such as Envoy™, Istio™, HAProxy™, Nginx™, and others, and may provide an application delivery mesh, managed or controlled from a centralized location, server (114.1) or cloud (136). The system (100) may be complementary to open source systems and may thus provide customizability, scriptability and tooling. The system (100) may be utilized with Linux™. The system (100) may also be retro-fitted or installed onto existing open source load balancers.

Still referring to FIG. 15, the system (100) may provide upwards communication to an integration system such as a cloud interface (136) or API aggregated management tool, while communicating downwards with all the attached clients (112.1 to 112.*n*). The plurality of servers (114.1 to 114.*n*) may be used in parallel, or substantially in parallel, and may provide the following features:

- A single server (114.1) may connect to Multiple Clients (112.1) (or a group of clients or endpoint devices (112.1));
- A single client (112.1) or endpoint device may connect to a single server (114.1);
- Many servers (114.1 to 114.*n*) may be used in parallel in a server pool or server cluster, and may manage or control different clients (112.1 to 112.*n*);
- In the event that one of the servers (114.1 to 114.*n*) is down (e.g. its power is interrupted), a client (112.1) may connect to another server (114.2 to 114.*n*) in the server pool. The relevant server (114.2 to 114.*n*) taking over may then source the required connection details from a shared resource (e.g. from the cloud (136)) that may only be available to servers forming part of the system (100).

Figure 16:
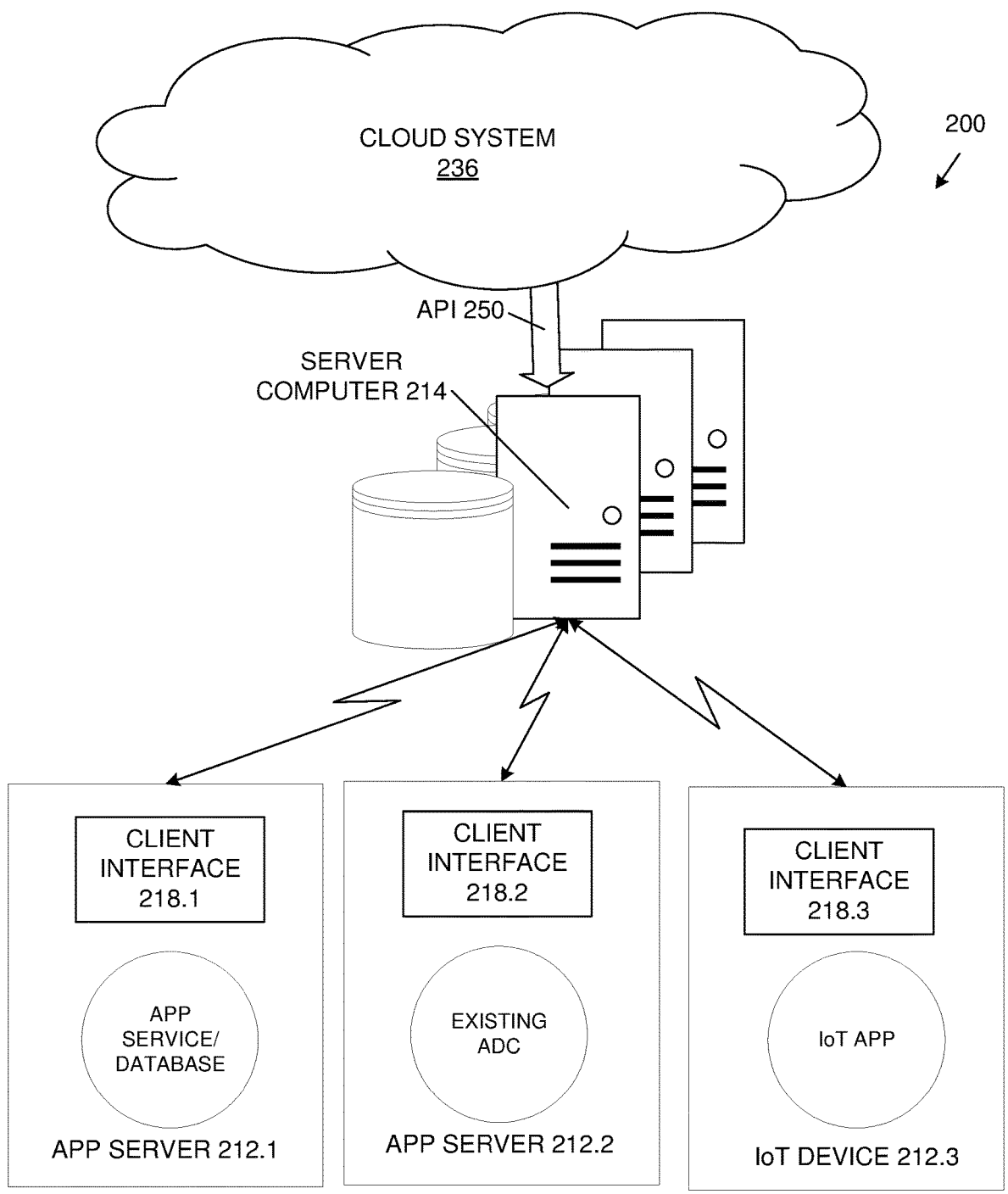
FIG. 16 is a high-level block diagram showing a protocol implementation and example applications of the system.

FIG. 16 shows a further implementation of a protocol implementation of a system (200) including a centralized server (214) for controlling endpoint devices (212.1, 212.2, 212.3) with client interfaces (218.1, 218.2, 218.3). For an exemplary MDCP use case, a cloud system (236) may manage multiple servers globally through the use of the server API (250). Instructions, also referred to as jobs, may be issued through the Server (214) to the various client interfaces (218.1 to 218.3) which may execute the instructions. An output or result of the instruction may then be communicated back from the client (218.1 to 218.3) to the Server (214) and finally back to the cloud system (236). Management or control may be performed via the API (250) as a user interface need not be required. An API integration tool for executing instructions may be used.

Figure 17:
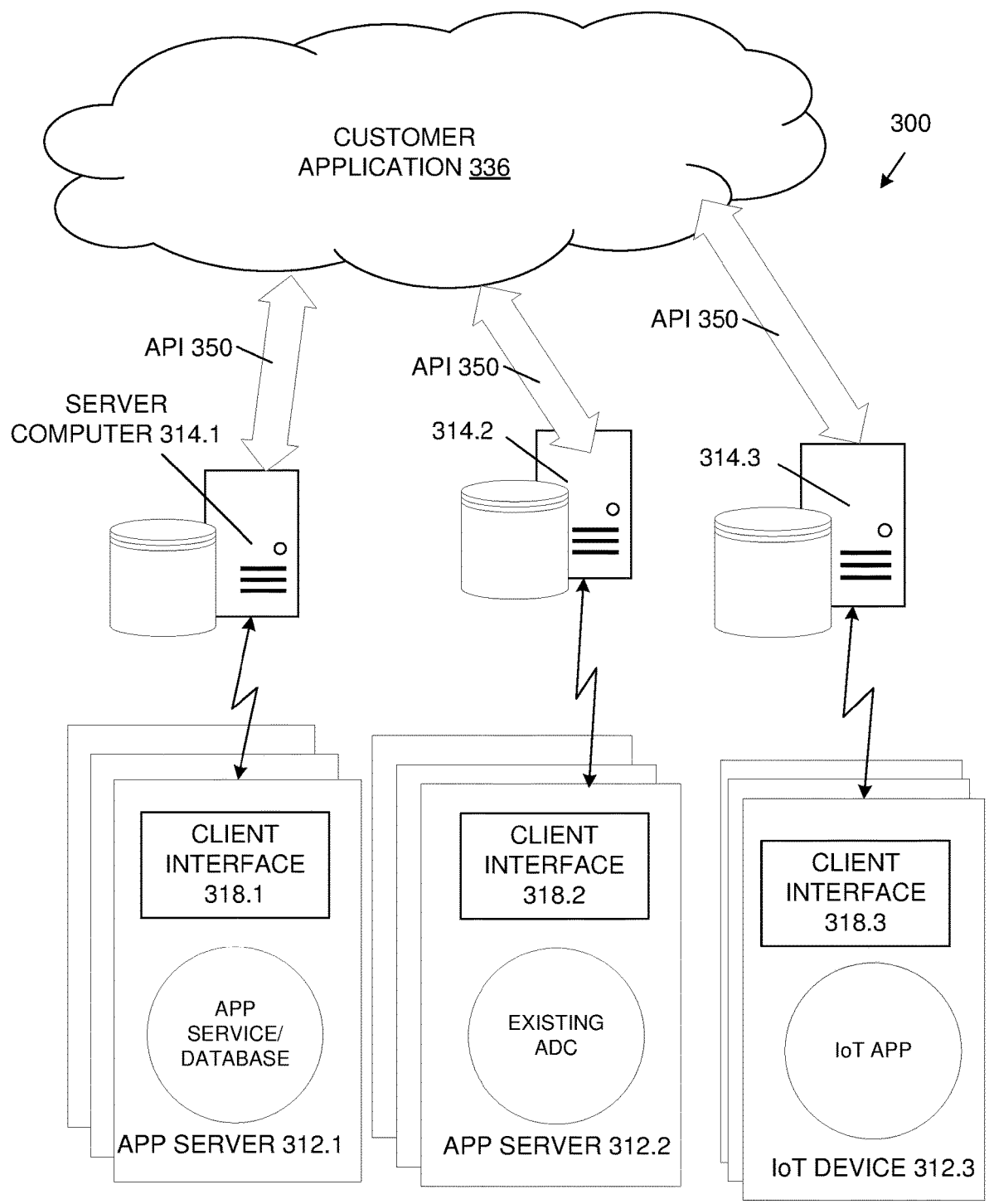
FIG. 17 is a high-level block diagram showing an example implementation of the system whereby a third-party application utilizes the system under license.

FIG. 17 shows an exemplary implementation wherein a system (300) may be provided as a licensed protocol for example in a customer datacenter implementation. A customer application may operate over the cloud (336). Further features may be similar to those described above for example in FIG. 16. As illustrated in FIG. 17, a third party or customer application (336) may utilize embodiments described herein under license. The licensed system (300) may provide a customer management application which may integrate with the servers (314.1 to 314.3) via the API (350), wherein each server may be operable to control or manage multiple sets of clients or client interfaces (318.1 to 318.3). The system may be utilized over a variety of devices, operating systems and a development language such as Go™ may be used. Websockets may furthermore be used for communications. Exemplary use cases of endpoint devices (312.1 to 312.3) may include application (App) services, databases, existing ADC's and IoT Apps.

Figure 18:
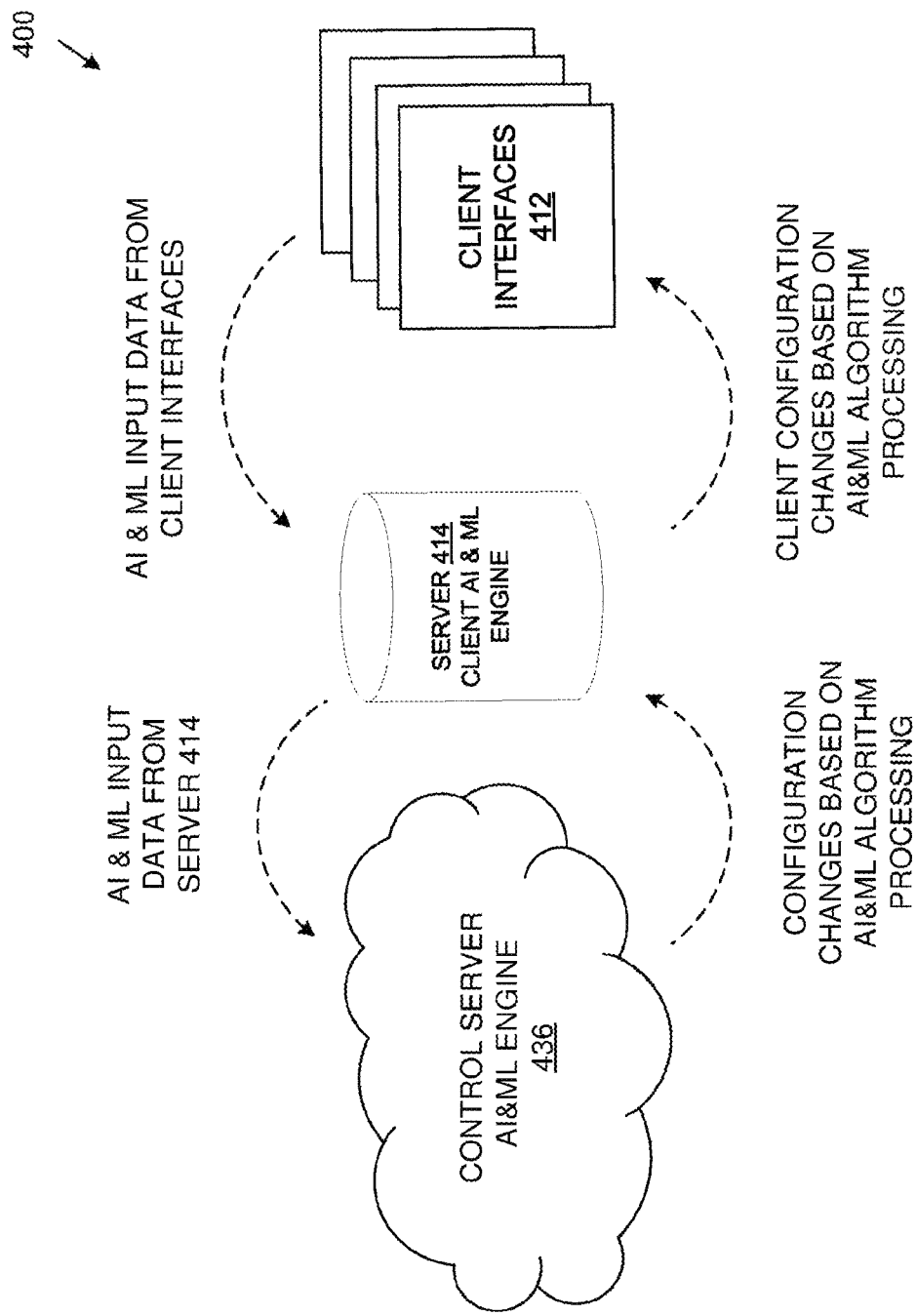
FIG. 18 is a high-level block diagram showing an exemplary machine learning implementation of the system.

FIG. 18 shows an exemplary system (400) of controlling a plurality of endpoint devices having client interfaces (412). Artificial Intelligence (AI) and/or Machine Learning (ML) input data may be received at the server (414), which may be a server similar to the server computer described above, however it may include a client AI and/or ML engine. AI and/or ML data from the server (414) may be sent to the cloud, or to a control server (436). The control server may also include an AI and/or ML engine thereat. Configuration changes based on AI and/or ML algorithm processing may then be transmitted back to the server (414), and client configuration changes based on the AI and/or ML algorithm processing may then be transmitted to the various clients.

This may be performed via the persistent data communication session(s) as described above.

The system (400) may for example be used in ADC applications. AI and/or ML require relatively large data sets or large amounts of data to learn from. AI and/or ML algorithms may utilize learning models. The protocol or system (400) may provide near-real time data from the client interfaces (412). The data from the client interfaces may be user-defined parameters from the clients (412) to the server (414). Data may hence be provided to the AI learning algorithm, and software logic may be adjusted according to simulations. Configuration settings may be optimized or enhanced and these optimized or enhanced settings may then be pushed back to the clients (412). The control server or cloud (436) may include a learning engine using AI and/or ML coupled with reactionary workflows. The one or more clients (412) may send data required by the learning models to the server (414), where it may be processed and may then trigger configuration changes to either scale up or down ADC settings depending on the AI configuration. As mentioned above, in exemplary embodiments, there may be a plurality of servers similar to the server (414) for example arranged in server clusters, and the control server (436) may poll the server (414) for data required for the scaling of servers and apply that data to the learning models. The control server (436) may deploy or reconfigure servers (414) depending on the output from these AI and/or ML algorithms.

Referring again to the exemplary implementation in FIG. 18, further features may provide for the AI to learn which behavior or data of the system (400) is considered normal, and accordingly the AI engine may adjust what it believes or determines to be a threat. This knowledge or information may be shared from and to the various nodes or endpoint devices. In this way, it may be possible to rapidly pick up new and unknown "0-day" threats that may provide advantages over prior art systems and methods that the applicant is aware of.

Figure 19:
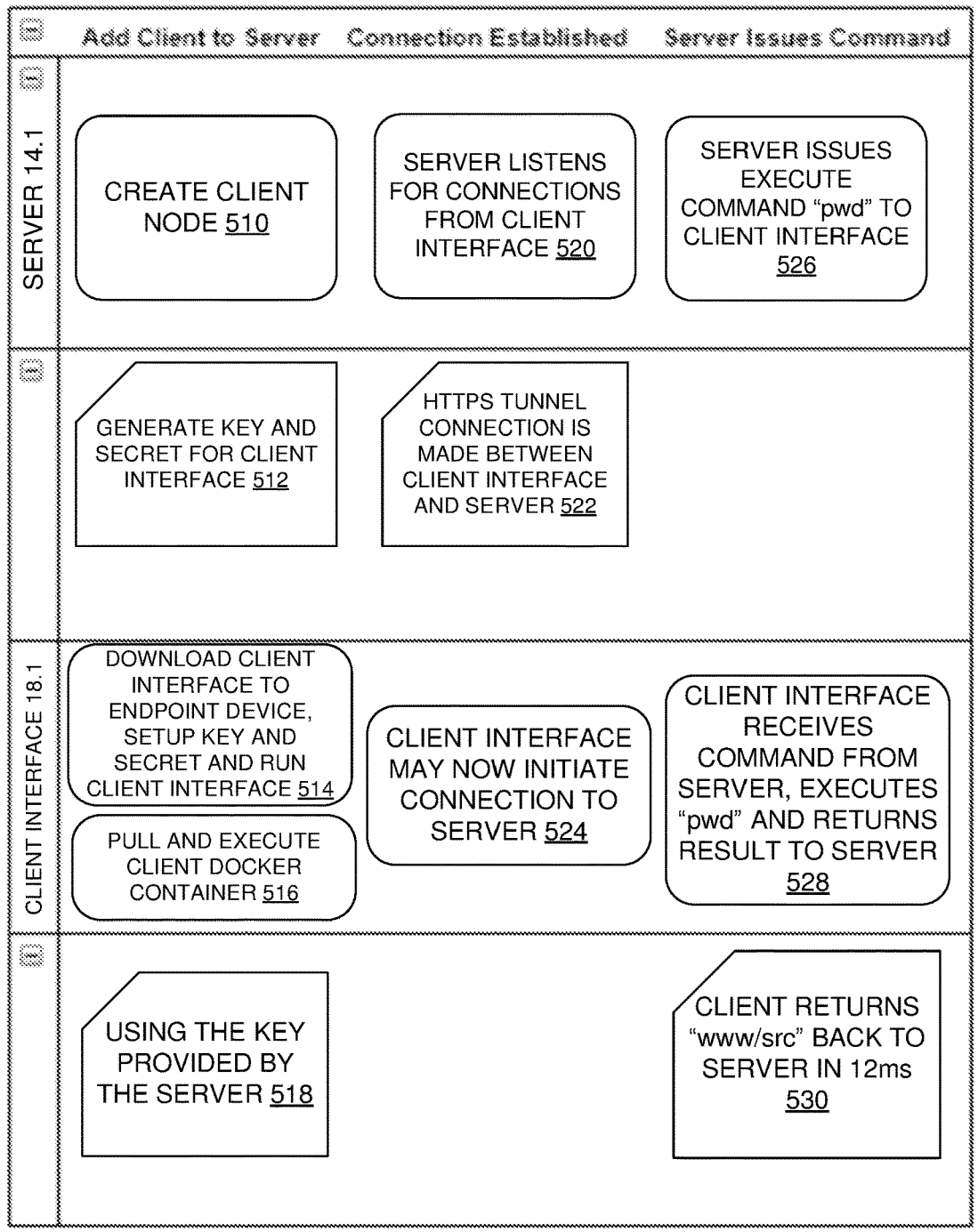
FIG. 19 is a schematic flow diagram showing communications in the system, between a server computer and a client interface.

Referring now to FIG. 19, there is shown a schematic flow diagram (500) showing communications in the system, in an example of communications between the server computer(s) (14.1 to 14.n) and each client interface (18.1 to 18.n) of FIG. 14. As described above, there is provided a protocol for communication between the client or client interfaces (18.1 to 18.n) and the one or more servers (14.1 to 14.n). An API may be available for each of the server (14.1), the client interface (18.1) and the overall protocol. The protocol may be binary safe, and may allow near-instant communication with low latency, at a massive or hyper scale. The protocol or system (10) may be capable of sending multiple communications, reading and writing multiple binary data and files (containing any type of information), and may execute a large number of commands substantially simultaneously and/or substantially in parallel. Communications via the protocol, i.e. between the client interfaces and the server(s), as well as between the server and the customer cloud infrastructure may also be encrypted.

To add a client or endpoint device to the server: A client node or endpoint device may be created (510). The server (14.1) may generate (512) a key pair (e.g. a public key and a secret or private key) for the client interface. The client interface may be downloaded (514) to the endpoint device, the key and secret key may be set up, and the client interface may be run by the processor (47.1). The endpoint device (14.1) may then pull (516) and execute a client docker container from the server (14.1). The key provided by the server may be used (518).

Once the connection is established: the server may listen (520) for connections from client interfaces. A HTTPS tunnel connection may be established (522). The client interface (18.1) may now be enabled to initiate (524) connections to the server (14.1) by initiating the request (20) for communications. The server (14.1) may then issue (526) commands or command data (28) (an example command of "pwd" may be sent) to the client interface (18.1). The command may be received (528) by the endpoint device, and executed, and the result may be returned to the server. The client interface (18.1) may return the result data (46.1) (for example including a result "www/src") back to the server in about 12 milliseconds.

Figure 20:
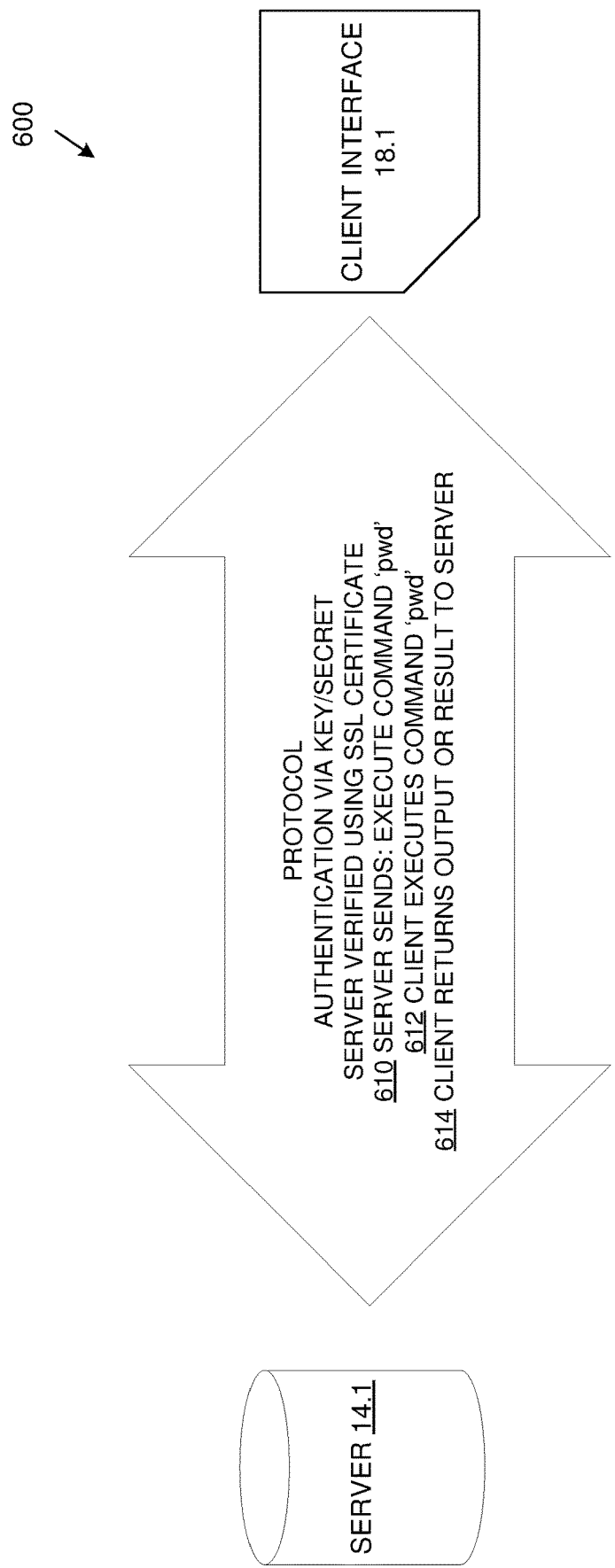
FIG. 20 is an exemplary diagram showing an authentication process between the server computer and the client interface.

Referring now to FIG. 20, there is shown an exemplary diagram (600) showing an authentication process between the server computer (14.1) and the client interface (18.1). The protocol or system may utilize authentication via a cryptographic key pair or key and secret, and the server verified using an SSL certificate. The server may send (610) the execute command 'pwd' to the client interface or client. The client or endpoint device (12.1) may execute (612) the command 'pwd'. The client may then return (614) the output or result to server (14.1).

Figure 21:
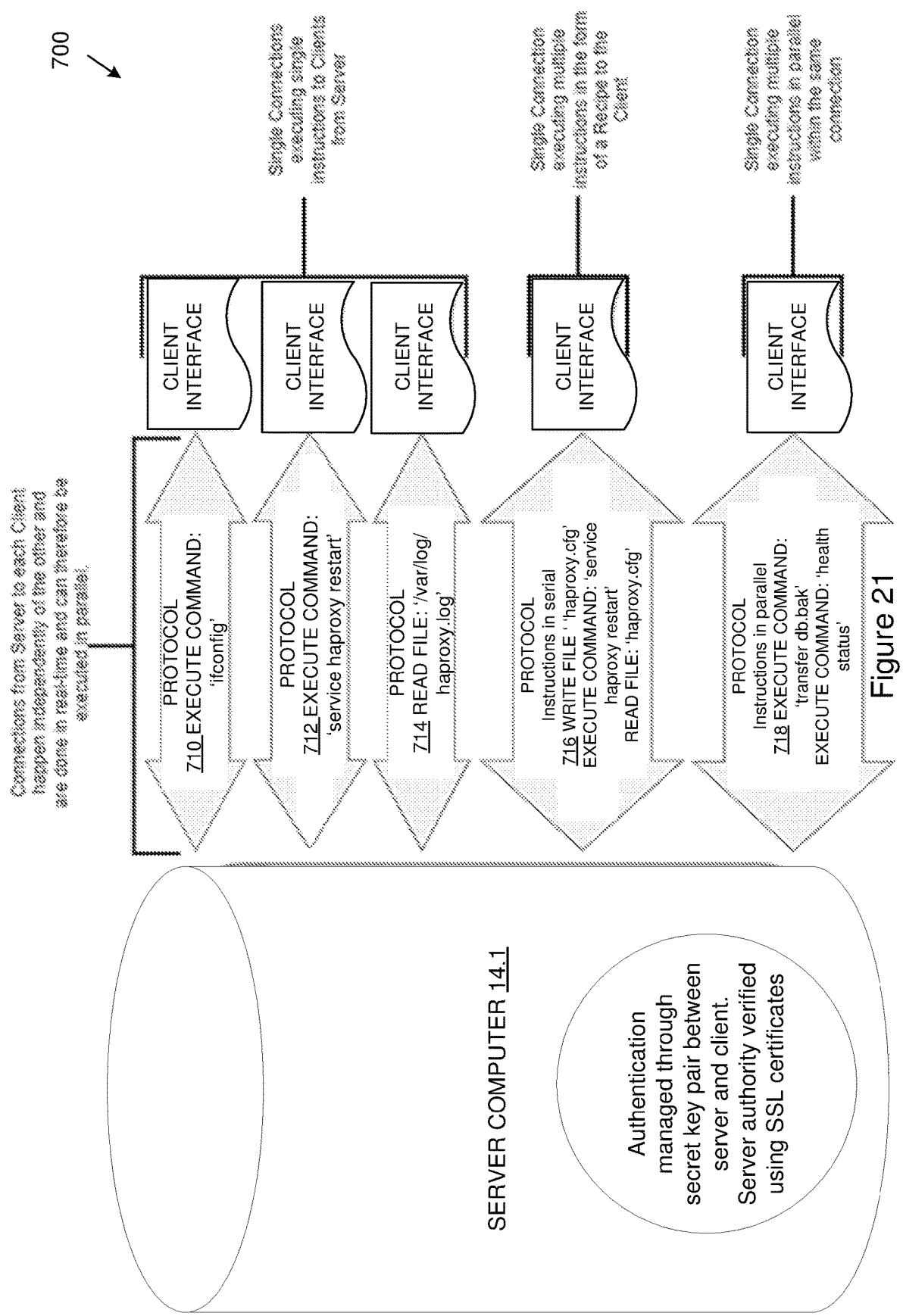
FIG. 21 is a high-level block diagram showing example commands transmitted from the server computer to the plurality of endpoint devices.

In FIG. 21 is shown a high-level block diagram (700) showing example commands transmitted from the server computer to the plurality of endpoint devices. Multiple connections may be established and multiple commands may be issued, when the server and client interface are already authenticated using a key pair. FIG. 21 Illustrates examples of types of communications with commands that may be used in the MDCP use case. At (710), a network interface configuration for an ADC may be obtained. A single command may be issued by the server to the client interface to ascertain once a connection is made, what the network configuration of the Linux™-based application server may be, by issuing 'ifconfig'. 'ifconfig' may return the network interface configuration for that system or endpoint device, containing information such as IP address, Gateway information, DNS Server information and the state of the interfaces. This may be relevant to MDCP as networking may be an important element of load balancing traffic for media content, and knowing exactly what the network configurations are for each of the ADCs may facilitate optimal running of services.

At (712), an ADC service may be restarted. A command may be issued by the server (14.1) to the client (18.1) to restart a 'HAProxy service' on an ADC (when the endpoint device (12.1) is an ADC server). Services (daemons) on ADC servers may often require a restart for various reasons which the server (14.1) may issue to the client (12.1) for execution. In this case, 'HAProxy' may be a load balancing application on the ADC which forwards the specific type of network traffic as per a set configuration. If that configuration is updated, a service restart of 'HAProxy' may be required, before the change may be applied correctly.

At (714), reading an application log file may be performed. When issues from the endpoint device are reported, log files may be a first port of call when troubleshooting an issue. It may be important that log files can be read over the protocol to enable support technicians to solve issues customers report. In the example provided, a customer of MDCP has encountered an issue with HAProxy failing to start up on a particular ADC. An MDCP support technician may read the /var/log/haproxy.log file through the server to understand what is the issue.

Executing a set of instructions may be performed in serial (716). A set of instructions may need to be executed in serial as there is a dependency on one instruction to have completed before another is executed, but a group of instructions can be pre-configured to be executed for the sequence to have value. In the exemplary case for MDCP, it may be required to update a specific configuration in HAProxy which requires a service restart as well as to read the configuration file back to ensure that the configuration is correctly updated. The server (14.1) may send through a set of three jobs, dependent on each other (a job chain):
  (i) WRITE /etc/haproxy/haproxy.cfg—this may replace the haproxy.cfg on the client system with that given by the server.
  (ii) Once the configuration file has been updated, the next instruction may be to restart the HAProxy service to activate the configuration changes, using EXECUTE service haproxy restart.
  (iii) To validate the configuration has been retained the haproxy.cfg file may be read back to the server (14.1) for analysis and validation using READ haproxy.cfg.

Executing instructions in parallel or substantially in parallel may be performed (718). Often there may be long running instructions sent by the server (14.1) to the client interface (18.1). The system may prevent or alleviate these long running instructions from hampering any other communication between the server (14.1) and the client or endpoint device (12.1). Parallel execution of instructions may allow for this by, using splicing to enable multiple threads of instruction execution.

A large file, such as a backup, as per a standard backup solution, would be transferred from the client to the server which, depending on the connection speed, could take up to an hour. During this period, it is critical that all service, system and throughput metrics continue to be reported back to the Server. Using splicing the reporting instruction may be processed whilst the file transfer is in progress.

Figure 22:
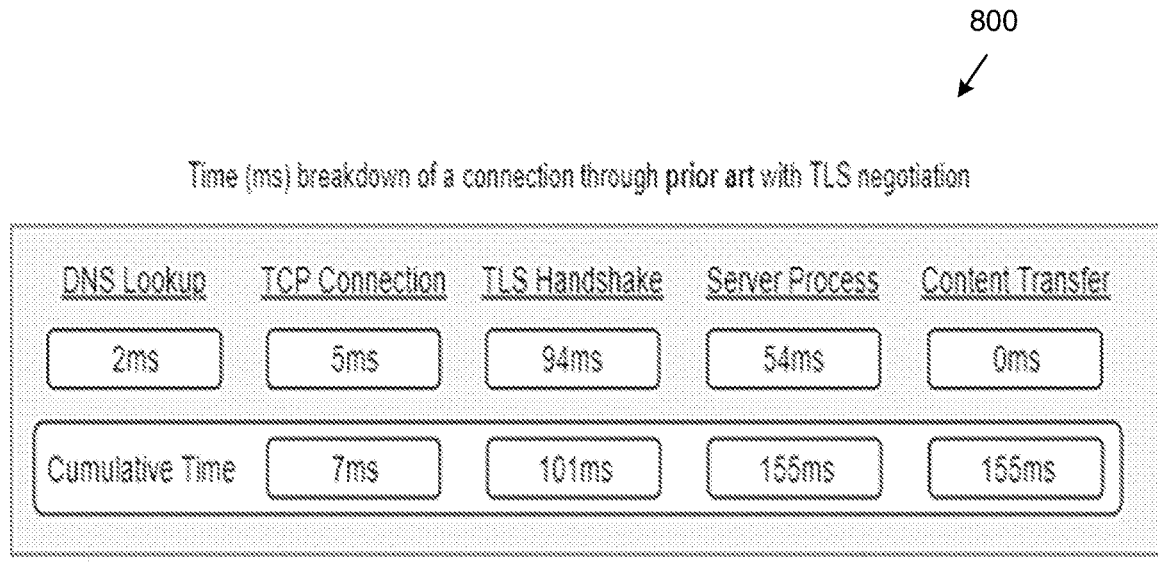
FIG. 22 is a diagram showing a breakdown of the time that a typical instruction would take using prior art methods and systems.
Figure 23:
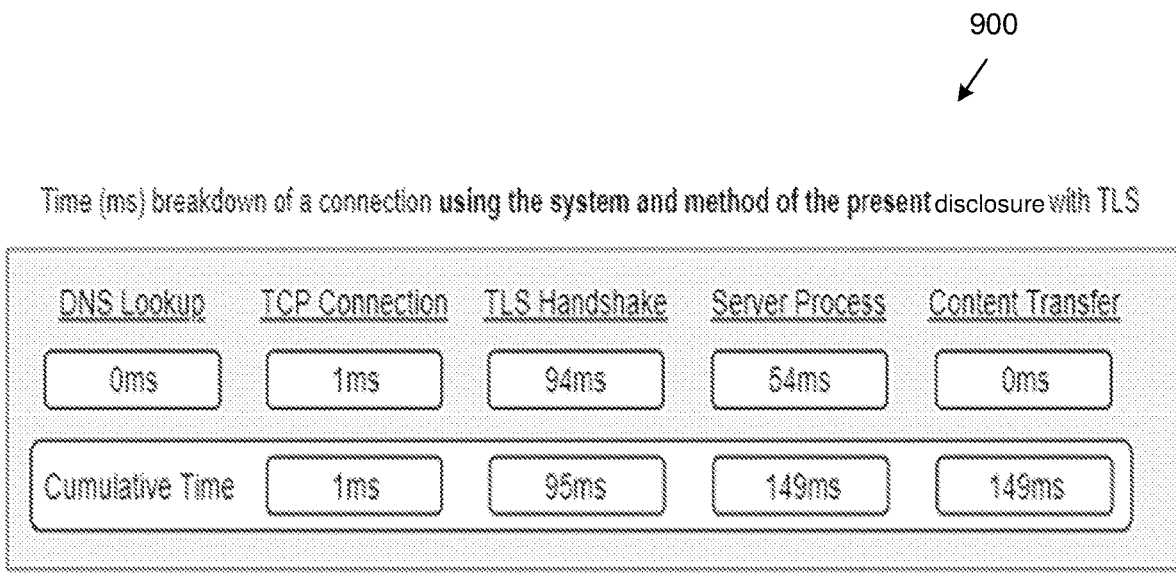
FIG. 23 is a diagram similar to FIG. 22, however showing a breakdown of the time that an instruction may take using the system and method of the present disclosure.

FIG. 22 shows a diagram (800) showing a breakdown of the time that a typical instruction would take using prior art methods and systems for an initial connection between two systems, for example between a server and an endpoint device. FIG. 23 shows a diagram (900) similar to FIG. 22, however it shows a breakdown of the time that an instruction may take using the system and method of the present disclosure for the initial connection between the server (14.1) and the client interface (18.1).

Figure 35:
FIG. 35 is a diagram showing a comparative view of prior art methods and systems to the present disclosure, illustrating the difference in connection latency for each initial connection.
Figure 36:
FIG. 36 is a diagram showing a comparative view of prior art methods and systems to the present disclosure illustrating the difference in connection latency for each instruction once a persistent connection is established.
Figure 37:
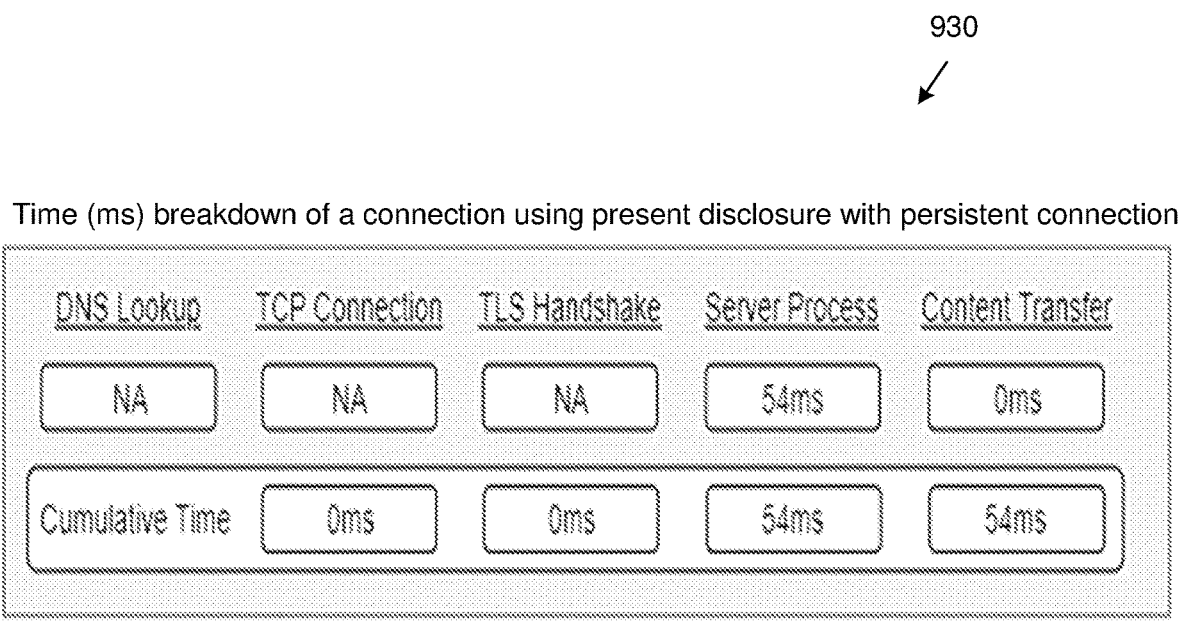
FIG. 37 is a diagram showing a breakdown of the time that a typical instruction would take using the system and method of the present disclosure once a persistent connection has been established.

FIG. 35 is a diagram (910) which illustrates a comparative view of prior art methods and systems as compared to the present disclosure, showing the difference in connection latency for each initial connection. FIG. 36 is a diagram (920) illustrating a comparative view of prior art methods and systems as compared to the present disclosure and shows the difference in connection latency for each instruction once a persistent connection is established. FIG. 37 is a diagram (930) showing a breakdown of the time that a typical instruction would take using the system and method of the present disclosure once a persistent connection has been established.

Description Detailing Reasons for Low Latency Coupled with Scale and Parallelism As mentioned in the background of this specification, previous methods of managing connections may include elements of the connection process that may not be essential when making use of HTTP tunneling technology.

Instantiating a Connection:
  The systems and methods may require that each instruction sent may first require a connection to be established. Couple this method with a secure component such as Transport Layer Security (TLS), it becomes clear that most of the time taken to complete the instruction is by setting up the connection securely, rather than processing the instruction.

Long-Polling
  This method of managing a connection is where a placeholder connection may be opened in anticipation of an instruction. This loses efficacy in the scenario where many instructions are being sent over a connection because the connection is still instantiated per instruction.

An example of a standard, prior art connection instantiation is shown in FIG. 22, utilizing TLS with instruction processing.

By comparison, a connection with instruction processing according to embodiments described herein is shown in FIG. 37. The protocol and system described herein may make use of HTTP tunnel technology. This may allow for the connection to be established once, and security to be negotiated and agreed once, and not on a per instruction basis. The benefit of this is illustrated by comparing the total times in FIGS. 22 and 37. With the prior art shown in FIG. 22, the total time is about 155 milliseconds (ms), whereas with the present embodiments of the disclosure the total time may be as little as about 54 ms as is indicated in FIG. 37.

In FIG. 23, for an initial connection using the present disclosure, a Domain Name System (DNS) lookup and name lookup may be made in about 0 ms or near-instantly. A Transmission Control Protocol (TCP) connection may be made in about 1 ms, a TLS handshake may take about 94 ms. Server processing may take about 54 ms and content transfer may be performed in about 0 ms or near-instantly. The total cumulative time may thus be about 149 ms. Once the initial connection is made, the persistent data communication session may be kept open.

As shown in FIG. 37, for the present disclosure, a Domain Name System (DNS) lookup, name lookup, TCP connection and TLS handshake may not need to be performed, once the persistent data communication session is established. Server processing may take about 54 ms and content transfer may take about 0 ms (in other words, less than 0.5 ms, or near-instantly). The total time taken to complete processing and transfer may thus be about 54 ms. It will be appreciated that FIGS. 22, 23 and 35 to 37 are examples, and actual time periods may vary. However, it will further be appreciated that the systems and methods described herein may be significantly faster than the prior art. It may be computationally expensive to begin communicating with security, but is may be very cheap or efficient to continue communicating with security once it has been established (i.e. once the persistent data communications session (40) is established for example with HTTPS tunneling).

Figure 24:
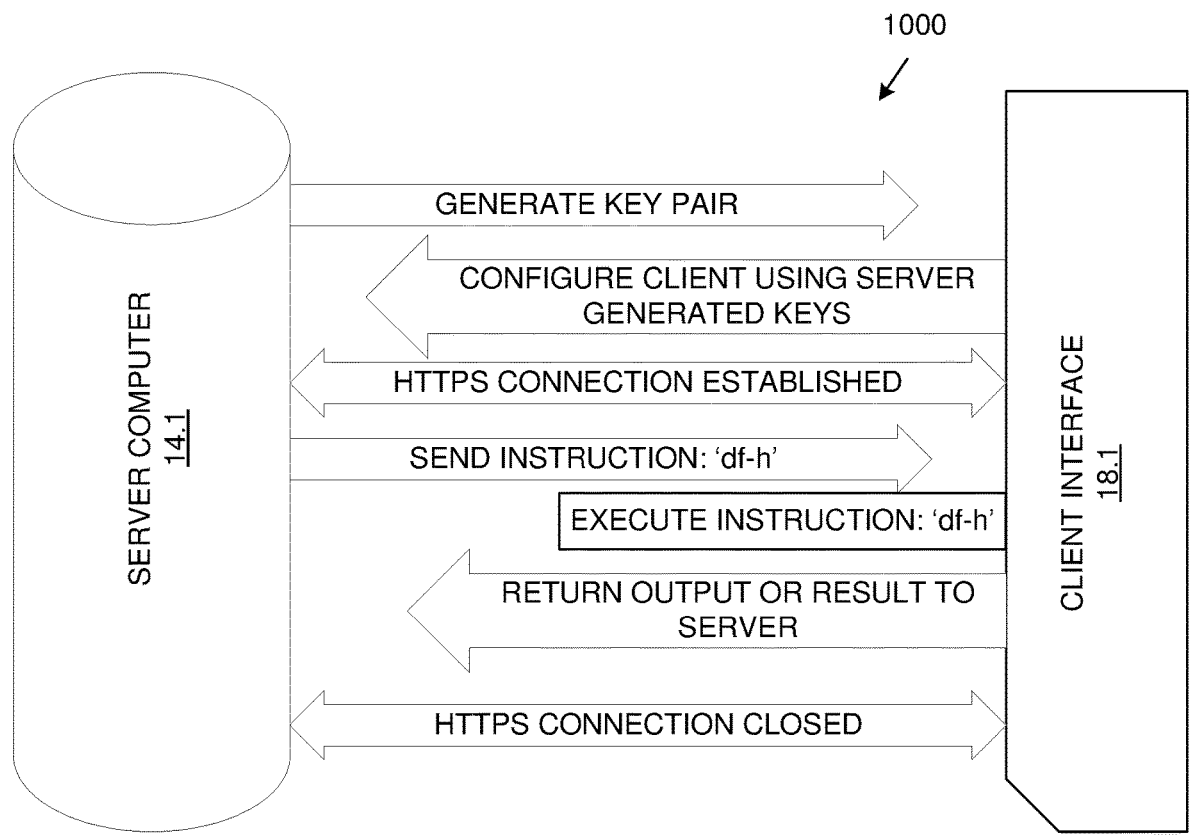
FIG. 24 is a high-level block diagram showing communication between the server computer and the client interface using Hypertext Transfer Protocol Secure (HTTPS) tunneling and cryptography.

In FIG. 24 is shown a high-level block diagram (1000) showing communication between the server computer (14.1) and the client interface (18.1) using Hypertext Transfer Protocol Secure (HTTPS) tunneling and cryptography. Authentication may be configured through a secret key pair that may be generated when the client or endpoint device (12.1) is created or registered on the server (14.1). The key may then be applied to the connection on the client interface (18.1) to pair the server (14.1) and client interface (18.1). The pairing may be utilized to create the persistent data communication session (40) and may be maintained for all future connections between the particular endpoint device (14.1) and the server (14.1).

Figure 25:
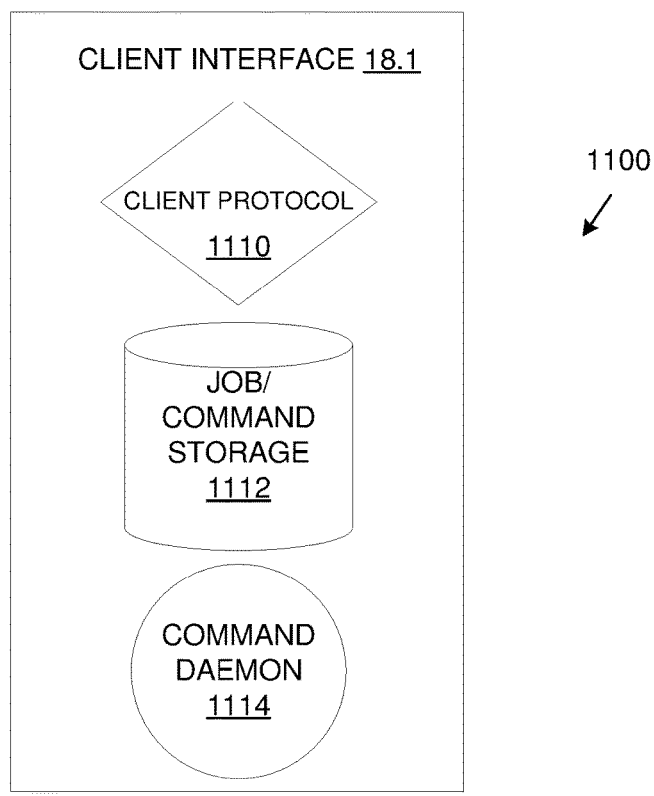
FIG. 25 is a high-level block diagram showing details of an exemplary client interface provided on one of the endpoint devices.

FIG. 25 illustrates a high-level block diagram (1100) showing details of an exemplary client interface (18.1) provided on endpoint device (14.1). A local state store may be provided at the client interface (18.1) The protocol (1110) may be a communication method used between the client interface (18.1) and the server (14.1). An API may be available for all primary functionality for the server, client and protocol. The protocol may be binary safe. It may be capable of sending multiple communications, reading and writing multiple binaries and files (containing any type of information), as well as executing almost any number of commands, in each case, substantially simultaneously and in parallel. Communications via the Protocol may be encrypted. The client interface may be able to control a host application server. The connection may be made outbound via an HTTPS connection from the client (18.1) to the server (14.1), meaning the server does not need inbound access to function with it. It can continue to run even where the connection to the server (14.1) fails, and the HTTPS connection means that it may be able to function in any networked environment.

The client interface or client (18.1) may be split into 3 main components:

1. A Job Storage Database (1112):
   All jobs that are scheduled or requested by the Server may be stored in a state within the Job Storage Database (1112);
   If a connection is lost between Client and Server, the state and relevant information may be stored and once the connection is restored, the response may be sent;
2. A Command Daemon (1114) or computer process:
   This daemon may listen and execute commands (28) received by the server (14.1) and may be responsible for returning the responses back to the server;
   The daemon may further be used for scheduling;
3. Client Protocol Implementation (1110)
   Management of connections to the Server (14.1) may be performed;
   The client (18.1) may connect out-bound to the Server (14.1)
   Multiple commands may be executed within the same connection tunnel (40)
   If the client (18.1) is not connected to the Server it may continuously try to re-establish the connection.

Figure 26:
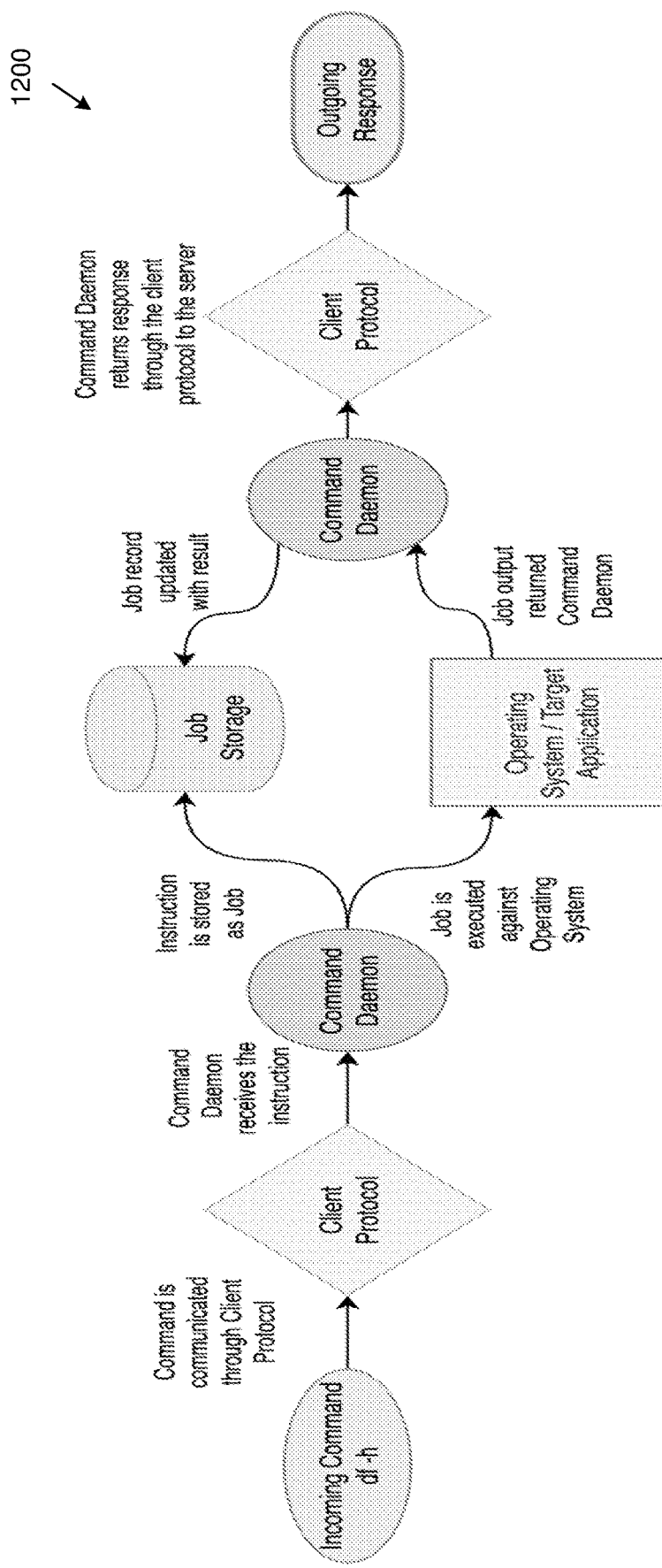
FIG. 26 is a flow diagram showing an exemplary method of controlling a plurality of endpoint devices, both on-line and off-line, and showing state keeping features.

FIG. 26 shows an example flow diagram (1200) of an exemplary method of controlling a plurality of endpoint devices, both on-line and off-line, and showing state keeping features.

Figure 27:
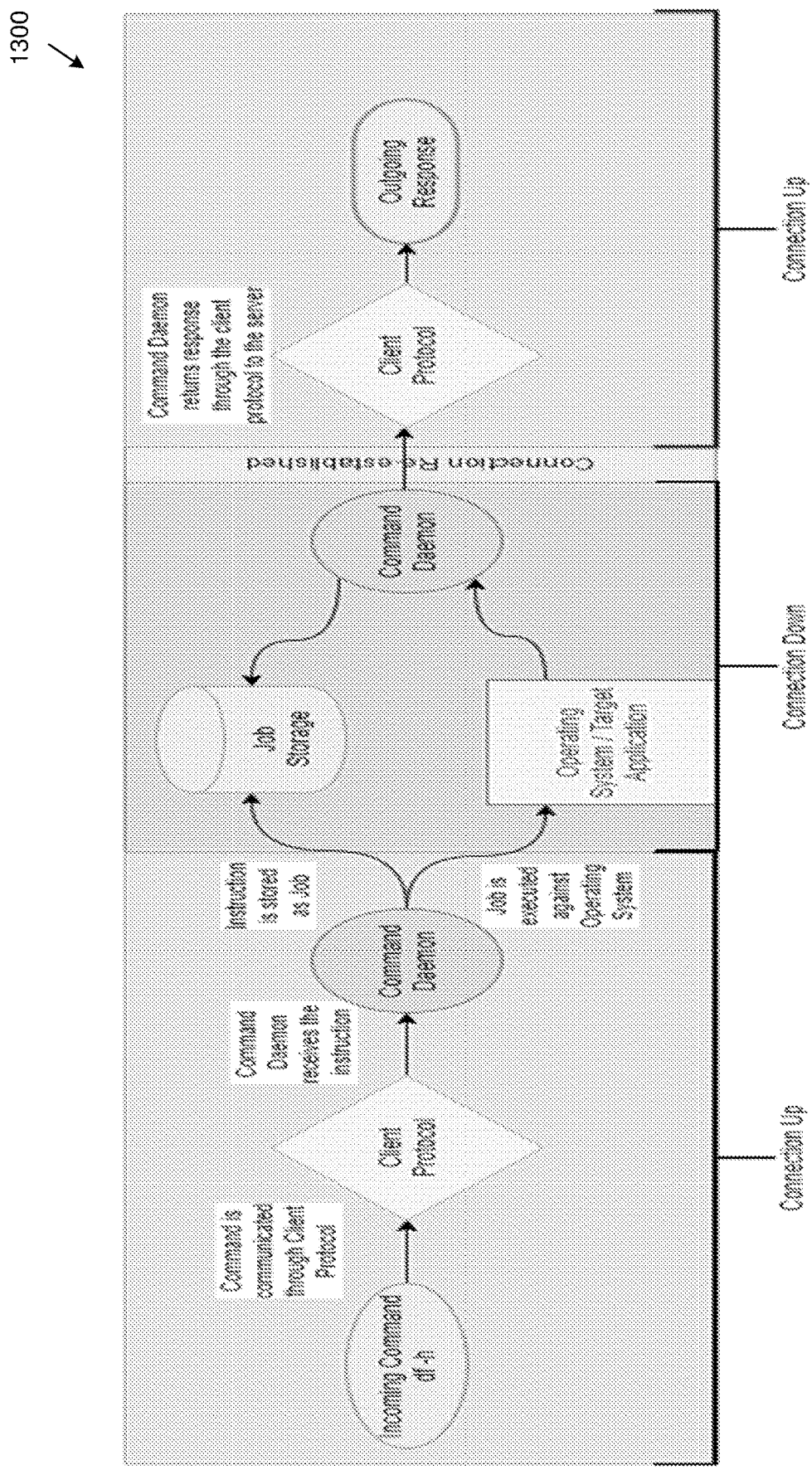
FIG. 27 is a flow diagram showing an example of how the system handles interruptions in connectivity between the server computer and the endpoint device.

FIG. 27 shows an example flow diagram of an example of how the systems described herein may handle interruptions in connectivity between the server computer (14.1) and the endpoint device (12.1).

Below are examples of commands that may be executed, and how the commands may be used to monitor or control devices or applications:

Return the status of a particular service running on a server: "ps -eflgrep haproxy"
   This may validate whether or not the haproxy process is currently running on the Linux™-based system;
   This may be required for ensuring the health of a system, security or troubleshooting;
A connection from the server to a desired target may be verified: "ping -c 5 8.8.8.8"
   This may validate, depending on the output, whether or not the system can connect via PING, for example to a Google™ DNS server, and may indicate that successful networking is in place;
   This could also be used to validate connections internal to a data centre;
   Ping may provide a simple tool to validate a connection as well as determine a base-line metric for latency between the two interfaces of a connection;
Start service on server: "service start haproxy"
   Various services exist on systems that the client interface (18.1) may be installed on, and these services can be managed through simple execute commands with the systems and methods disclosed herein, over the protocol via the server (14.1).
   If it is found that the "haproxy" service is not running, the server may issue a start command to get the "haproxy" into a needed state, i.e. to get it running.
Stop server on server: "service stop haproxy"
   In this case, an issue may be identified in haproxy and may require turning it off in order to correct the issue.
Write the string "log enabled 1" to the file haproxy.cfg
   If the system (10) is unable to gather enough information about an issue reported in the haproxy application on an endpoint device (12.1) or system, a course of action decided, may be to enable further logging.
Read configuration file "haproxy/haproxy.cfg"
   To ensure that the setting above has been updated correctly, validation of the change by reading back the updated file may be performed.
Transfer of a binary file for updates from server to client
   An update file may need to be sent across the protocol for performance optimizations and security improvements. The server can send the binary file to the client.

Figure 28:
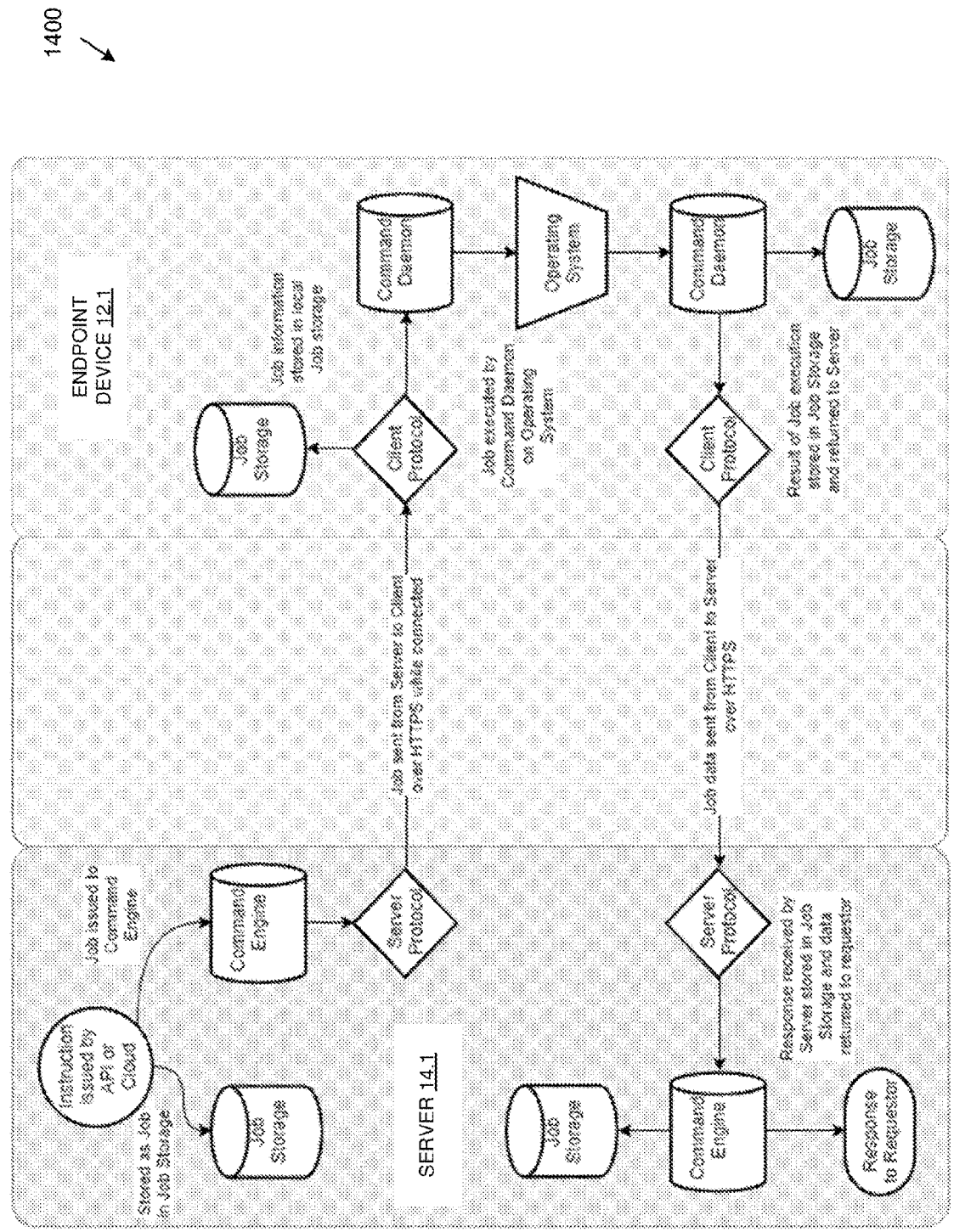
FIG. 28 is a diagram showing an example of how the client interface interacts with the server computer.

In FIG. 28, there is shown a diagram (1400) illustrating an example of how the client interface (18.1) of the endpoint device (12.1) may interact with the server computer (14.1) utilizing or implementing HTTPS tunneling.

Figure 29:
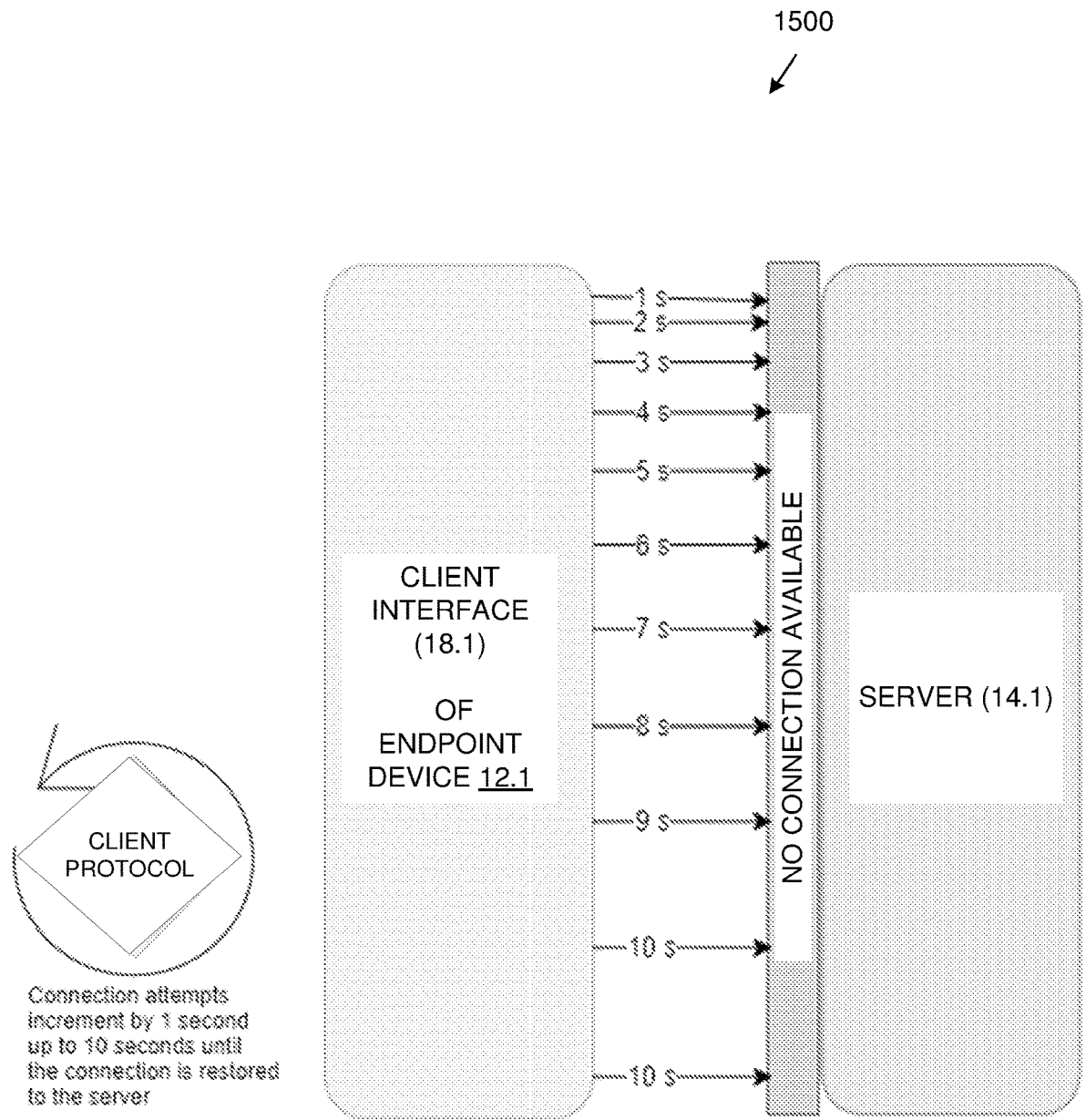
FIG. 29 is a diagram showing incremental intervals that may be utilized by the client interface to attempt to reconnect to the server computer once the connection is lost.

FIG. 29 shows a diagram (1500) showing incremental intervals that may be utilized or implemented by the client interface to attempt to reconnect to the server computer once the connection is lost. In the event that the persistent data communication session (40) between the client interface (18.1) and the server computer (14.1) loses connection, the client interface may attempt to reconnect to the server (14.1) in incremental intervals of about 1 second up to a maximum of about 10 seconds, however other intervals may be used if needed.

Figure 30:
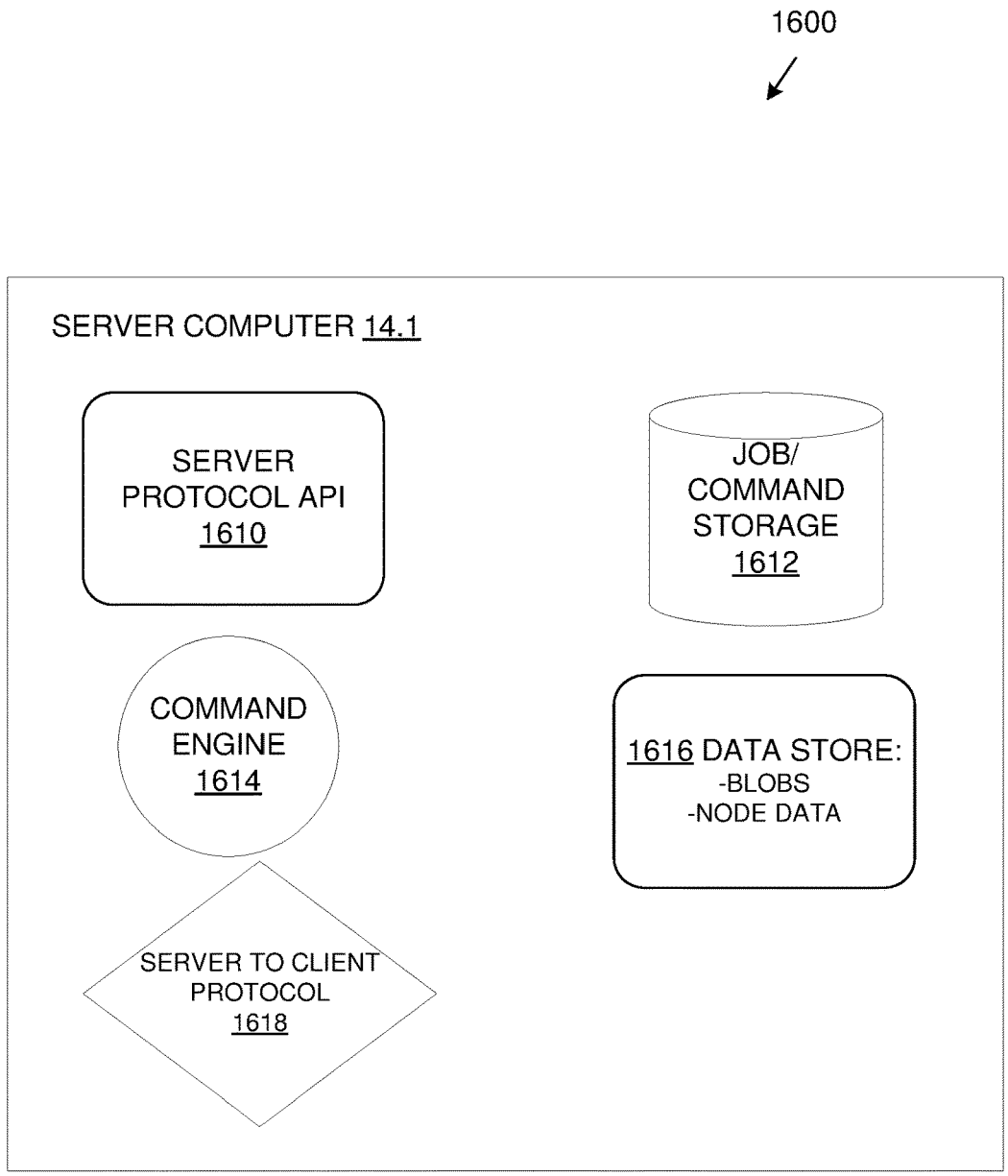
FIG. 30 is a block diagram showing various exemplary components that may form part of the server computer.

FIG. 30 shows an exemplary block diagram (1600) illustrating various exemplary components that may form part of the server computer (14.1), including a server protocol API (1610); a job or command storage database (1612); a command engine (1614); a data store (1616) for example for blobs of data and node data; and a server to client protocol (1618) may be provided.

The protocol utilized implemented may provide a communication method used between the client (18.1) and the server (14.1). An API may be available for functionality for the server, client and the protocol used. A Job may be a set of instructions (32) sent by the server (14.1) to the client (18.1) for execution. Job information may be stored in a Job Storage (1612) facility or database on both the server (14.1) and the endpoint device (12.1) or client. Jobs may include:
   Write a file
   Read a file
   Run or execute an instruction or command
Further features of the system may include the following:
A RESTful API (1610) may be utilized or implemented for server communication. A schematic example of the REST API (50) is also shown in FIG. 14:

All server functionality may be available via API
Connections to the API may be available through HTTPS only with pre-shared authentication Job Storage (1612)
Storage entries may be provided for Job information:
Already executed,
Currently being executed, and
Scheduled for execution
A current state of each Job and (if needed) job interval and start time Command Engine (1614)
The Command Engine (1614) may manage all Jobs sent to each client interface as well as the responses received back from the client interfaces.
Data may be written to the Job Storage database (1612)

A Data Store (1616) may be provided
A key value store may be provided for text and binary data compatible with the way that the server keeps nodes in memory;
Information may be fetched and stored at high-speed in large quantities;
Shared storage for node credentials;

Server to Client Protocol (1618)
Connection manager may be provided for all connections received from allowed clients or endpoint devices (12.1 to 12.$n$);
Job information may be sent and received over HTTPS to and from the client interfaces (18.1 to 18.$n$)

Binary Safe Transfers
The systems and methods described herein may transfer data using the protocol, which may be a binary safe communication standard that allows very efficient transfer of data, for example in two primary ways:
1. Large files: these may be chunked (see below and FIG. 32) and compressed due to the protocol being binary-safe.
2. Small data sets: Typical communication methods that are JavaScript Object Notation (JSON) based (or JSON-like) may consume more data to describe the field than the value of the field. The system, method and protocol disclosed herein may encode this data to a binary stream which then uses as little data and computing power as possible.

Multiple Connections between Server vs Client
The systems methods and protocol disclosed may support the ability to open multiple channels or persistent data communication sessions (40). Several outbound connections to the servers (14.1 to 14.$n$) may be utilized or implemented in order to have substantially parallel instruction sets. This may allow threaded client interfaces (18.1 to 18.$n$) to accept jobs on an event-based system and to run multiple tasks in parallel.

Connection Efficiency
Establishing a secure communication channel may be a computationally expensive task. The negotiation of a new HTTPS, SSH, etc channel may require public key negotiations which all apply a factor of 10-200 times more load than using an existing channel that is already negotiated and secured. The systems and methods disclosed herein may maintain a connection or communication session (40) once established, in order to communicate in the most power, computing and latency efficient method possible while it may ensure that communications are cryptographically secure.

Figure 31:
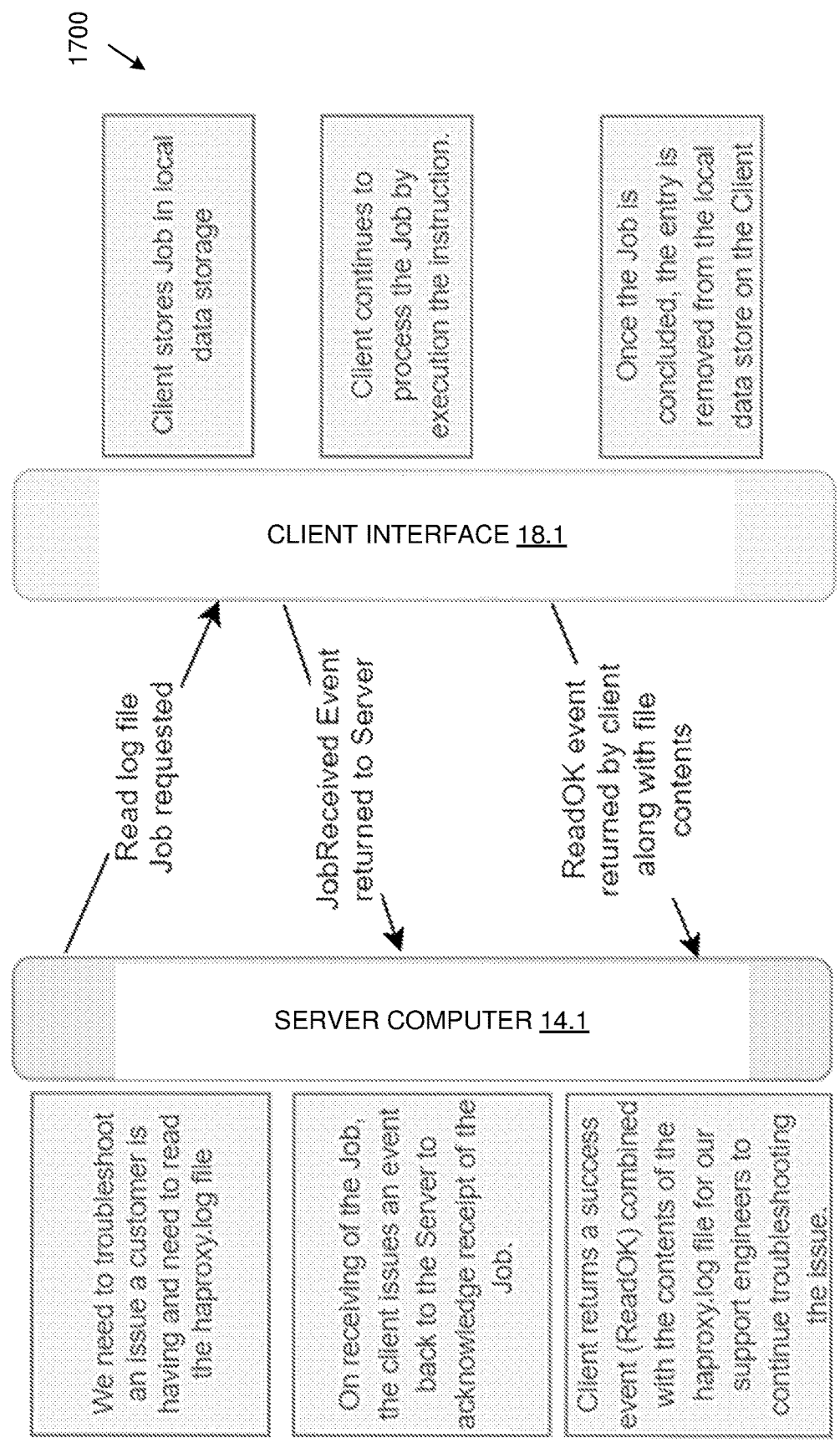
FIG. 31 is a diagram showing an example of how the system handles jobs to be performed by endpoint devices, as well as events that are communicated back to the sever computer.

Referring to FIG. 31, there is shown a diagram (1700) showing an example of how the system handles jobs to be performed by endpoint devices (18.1 to 18.$n$), as well as events that are communicated back to the server computer(s) (14.1 to 14.$n$).

Jobs and Event Communication
The communication between the server and client may be provided by using two operators, namely job (or command) and event.

A Job may be a work instruction (32) sent from the Server to the Client, from which at least 2 Events may occur. The first may be a job received event to acknowledge that the client has received the job, the second may be a result of the client attempting to execute the job. Depending on the type of work being done, more events may be triggered, for example a recurring job may trigger an event every time it is run. Events may also be where any errors and timeouts are noted back to the server. The client may for example not be able to execute a job, without specific instructions from the server, and may be under a "contract" or obligation to always return an event from a received job. These features are illustrated in the diagram (1700) in FIG. 31.

Data Store
The system may have an asynchronous contract based storage system on each node in the network (for example on each endpoint device), as well as at the server. These contracts may facilitate that for every action there is a reaction i.e. every job has one or more associated events with it. The client may store any events that have not synced to the server (due to loss of connection, delay, etc) until the contract is completed. This data may be American Standard Code for Information Interchange (ASCII codes) or binary information which may be kept in sync automatically between all the nodes and the server, and stored securely by the server.

Figure 32:
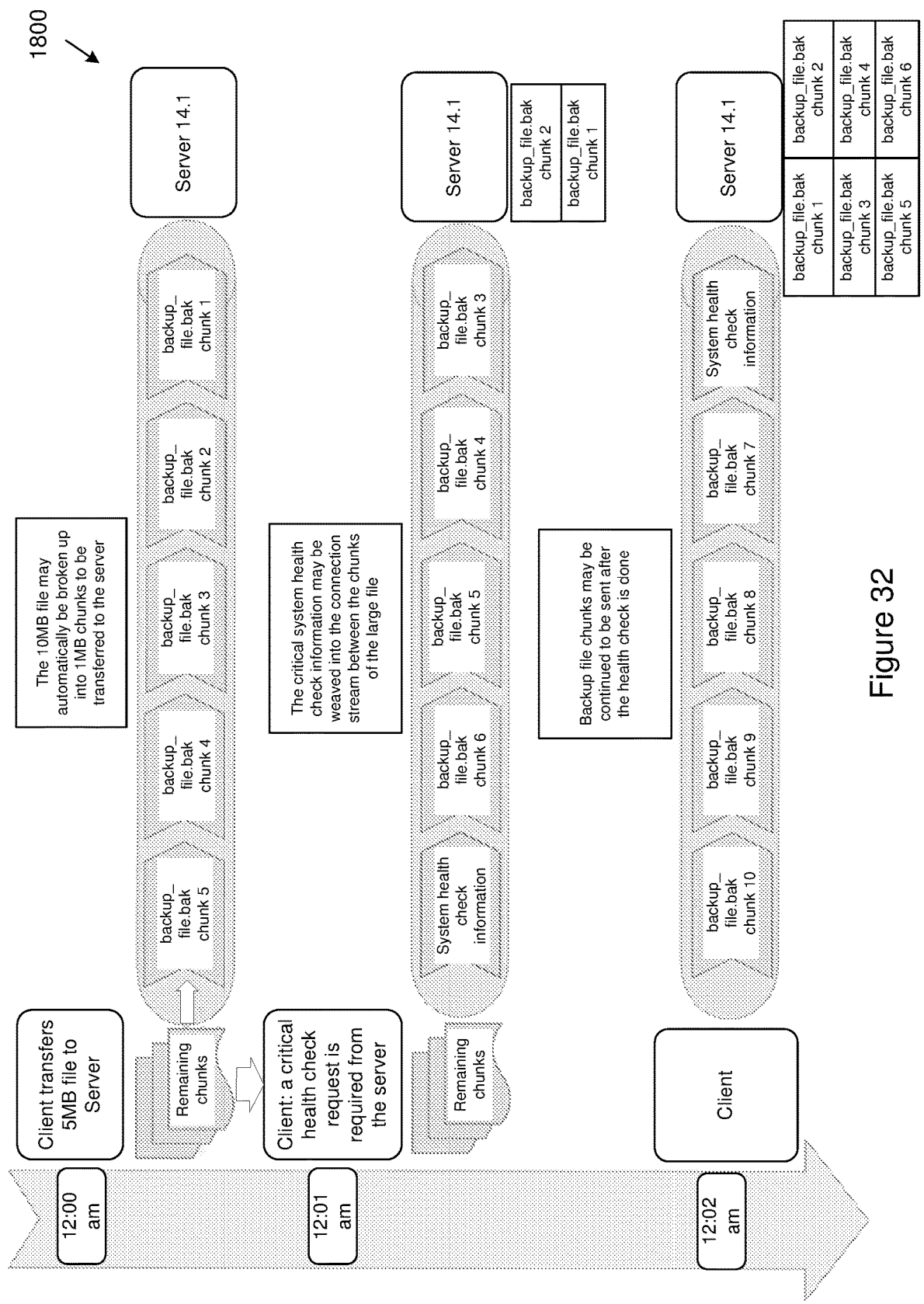
FIG. 32 is a diagram that shows how data may be transmitted in chunks from the client interface of the endpoint device to the server computer.

Usage of Chunks and Splicing to Attain Concurrency
In FIG. 32 there is shown a diagram (1800) that shows how data may be transmitted in chunks from the client interface of the endpoint device (e.g. endpoint device (12.1)) to the server computer (e.g. server computer (14.1)). This may be referred to as a chunking process (1800).

In order to prevent long-running instructions between the server and the client from holding up concurrent instructions, large files or payloads may automatically be split into similar size chunks for data transfer across the persistent data communication session (40).

In the example illustrated in FIG. 32, a backup file is transferred from the client to the server which may for example be 10 megabytes (MB) in size. This file may then be broken down into ten 1 megabyte chunks. Mid-way through the transfer of chunks, a high priority instruction may be required by the server to return health information of the client or client system or endpoint device. The system health job may then be weaved into the connection stream between the backup file chunks.

This chunking mechanism may provide advantages.
From the engineer or system managing the server, it may emulate a concept of concurrency, as two instructions may be processed through a single connection without the second instruction having to wait for the first to complete;
If there is a connection interruption during a large file transfer, there may be less chance of data corruption and the transfer may continue once the connection has been re-established; and
In IoT use case a "large file" may be a small file that takes a long time to transmit due to poor connectivity, etc. The automatic chunking behavior may ensure that concurrency may be preserved even when transferring a single command response over a relatively long time.

Referring again to FIG. 14, the endpoint devices may for example be ADC servers or nodes that connect out to the server (14.1). This may facilitate changing IP addresses to not affect functionality of the system (10) (E.g. Devices on ADSL or 4G with IP's that can change at irregular times). This may provide the following advantages:

Connecting out means that typically there is no need to change any firewall rules or configuration settings;

The server side does not need access to or need to configure the details of the client (IP:PORT);

Clients may be automatically deployed clients because they appear when they come online;

If the endpoint device changes its networking configuration or moves physical location it may not have any effect on the system (10);

This may enable wide-scale anonymous IoT reporting and control;

unnecessary duplicate messages may not be required (single authentication for the communication session);

Endpoint devices may be persistently connected not polling or on a schedule, and thousands or even millions of devices may be controlled concurrently;

Contracts may be used between two computer systems, meaning that for every action there may be a reaction and for every job there may be a guarantee;

This may allow data certainty for mission critical instructions;

Scheduling may allow accounting for the fact that connection windows may occur but more regular work may be required;

Loss in connectivity need not obstruct the execution of jobs and endpoint devices can catch up when connectivity is restored;

This may allow time-based schedules to continue and live jobs to resume;

The system may be as resilient as possible to non-optimal conditions. EG. A smart car driving out of reception will still continue to perform jobs or instructions offline and transmit results once connectivity is restored;

The system may be able to run on any hardware and any operating system. In other words, the system may be Device or Software or Application agnostic;

Data compression may be used by the system, for example during the persistent data communication session; Chunking (E.G. FIG. 32) may also utilize or implement compression of the various data chunks or parts;

The chunking may allow bi-directional communication with only a single session;

A single client may also connect to a single server;

The systems and methods described may provide for less energy usage, both at the server side and on the client side. This may provide less battery usage for example, and may provide features in mobile devices that was not previously possible;

Shared Resource system may be provided that manages a set of connection details between server and client; and The Command Engine (e.g. shown in FIG. 30) may be threaded, may keep a local state, and may implement a contract.

Figure 33:
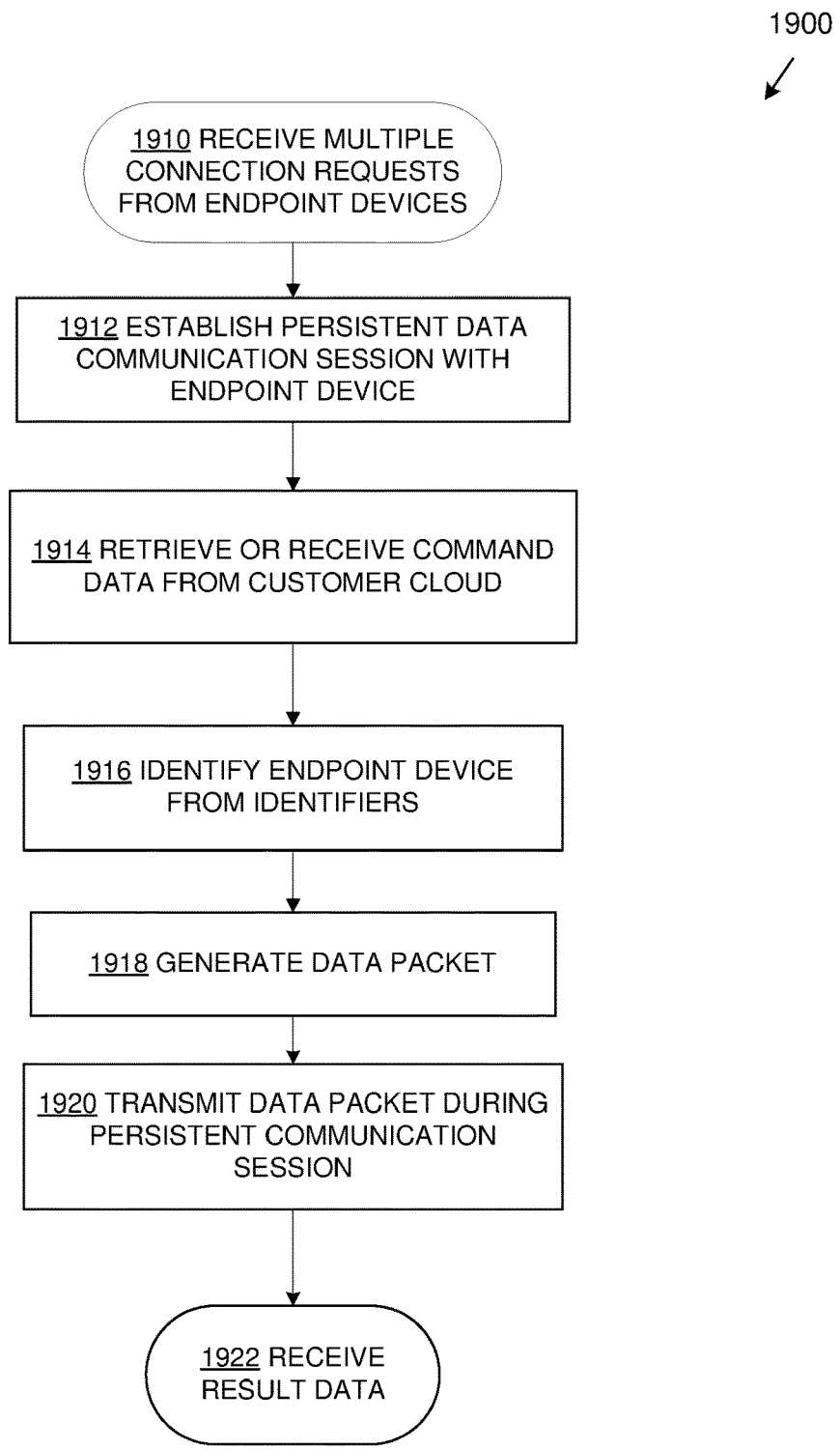
FIG. 33 is a high-level flow diagram illustrating an exemplary method of controlling a plurality of endpoint devices.

FIG. 33 is a high-level flow diagram illustrating an exemplary method (1900) of controlling a plurality of endpoint devices. The method (1900) may be conducted at a server computer such as server computer (14.1) (or via the cloud). The method may comprise receiving (1910), by the server computer (14.1), multiple connection requests (20) that each originate from an endpoint device (14.1 to 14.n), each endpoint device (12.1) having a client interface (18.1 to 18.n) thereat that generates the connection request (20) as an outbound connection request from the endpoint device (12.1 to 12.n) to the server computer (14.1). The method may further include establishing (1912), by the server computer (14.1), a persistent data communication session (40) between the server computer (14.1) and the client interface (18.1) of each endpoint device (12.1). The method may further include receiving or retrieving (1914), through a control interface (26.1) of the server computer (14.1), command data (28) to control one or more of the endpoint devices (12.1 to 12.n) (the command data may be received from a customer (30)), the command data (28) including endpoint device instructions (32) and endpoint device identifiers (34). The method (1900) may further include, for each endpoint device identified (1916) by the received endpoint device identifiers: generating (1918), by the server computer (14.1), a data packet (43.1) which may include the command data (28). The method may yet further include transmitting (1920), by the server computer (14.1), the data packet (43.1) via the persistent data communication session (40) to the client interface (18.1) of the endpoint device (12.1), to enable the endpoint device instructions (32) to be carried out by the endpoint device (12.1). The method may yet further include receiving (1922), by the server computer (14.1), result data (46.1) from the client interface (18.1) of the endpoint device (12.1) once the instructions are carried out.

Figure 34:
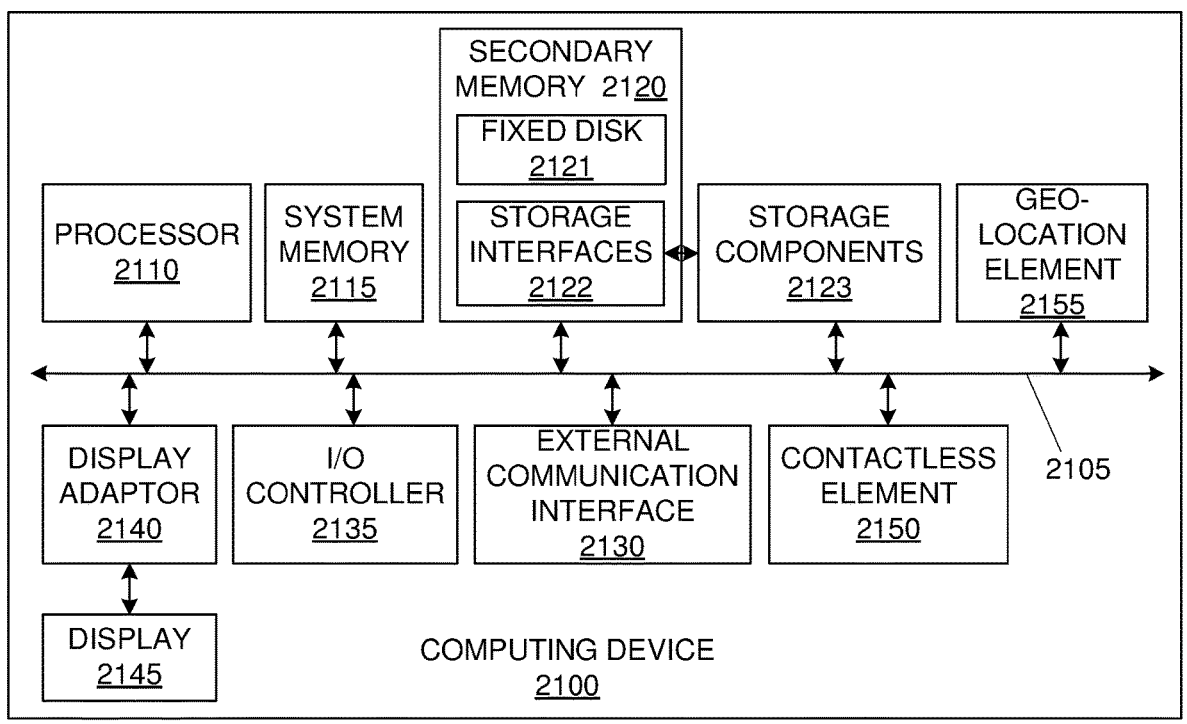
FIG. 34 illustrates an example of a computing device in which various aspects of the disclosure may be implemented.

FIG. 34 illustrates an example of a computing device (2100) in which various aspects of the disclosure may be implemented. The computing device (2100) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (2100) may be suitable for storing and executing computer program code. The various participants and elements in the previously described system diagrams may use any suitable number of subsystems or components of the computing device (2100) to facilitate the functions described herein. The computing device (2100) may include subsystems or components interconnected via a communication infrastructure (2105) (for example, a communications bus, a network, etc.). The computing device (2100) may include one or more processors (2110) and at least one memory component in the form of computer-readable media. The one or more processors (2110) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (2100) may be distributed over a number of physical locations (e.g. in a distributed, cluster or cloud-based computing configuration) and appropriate software units may be arranged to manage and/or process data on behalf of remote devices.

The memory components may include system memory (2115), which may include read only memory (ROM) and random-access memory (RAM). A basic input/output system (BIOS) may be stored in ROM. System software may be stored in the system memory (2115) including operating system software. The memory components may also include secondary memory (2120). The secondary memory (2120) may include a fixed disk (2121), such as a hard disk drive, and, optionally, one or more storage interfaces (2122) for interfacing with storage components (2123), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (2100) may include an external communications interface (2130) for operation of the computing device (2100) in a networked environment enabling transfer of data between multiple computing devices (2100) and/or the Internet. Data transferred via the external communications interface (2130) may be in the form of signals, which may be electronic, electromagnetic, optical, radio, or other types of signal. The external communications interface (2130) may enable communication of data between the computing device (2100) and other computing devices including servers and external storage facilities. Web services may be accessible by and/or from the computing device (2100) via the communications interface (2130).

The external communications interface (2130) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (2130) may include a subscriber identity module (SIM) in the form of an integrated circuit that stores an international mobile subscriber identity and the related key used to identify and authenticate a subscriber using the computing device (2100). One or more subscriber identity modules may be removable from or embedded in the computing device (2100).

The external communications interface (2130) may further include a contactless element (2150), which is typically implemented in the form of a semiconductor chip (or other data storage element) with an associated wireless transfer element, such as an antenna. The contactless element (2150) may be associated with (e.g., embedded within) the computing device (2100) and data or control instructions transmitted via a cellular network may be applied to the contactless element (2150) by means of a contactless element interface (not shown). The contactless element interface may function to permit the exchange of data and/or control instructions between computing device circuitry (and hence the cellular network) and the contactless element (2150). The contactless element (2150) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (2100) and an interrogation device. Thus, the computing device (2100) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (2110). A computer program product may be provided by a non-transient computer-readable medium, or may be provided via a signal or other transient means via the communications interface (2130).

Interconnection via the communication infrastructure (2105) allows the one or more processors (2110) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (2100) either directly or via an I/O controller (2135). One or more displays (2145) (which may be touch-sensitive displays) may be coupled to or integrally formed with the computing device (2100) via a display (2145) or video adapter (2140).

The computing device (2100) may include a geographical location element (2155) which is arranged to determine the geographical location of the computing device (2100). The geographical location element (2155) may for example be implemented by way of a global positioning system (GPS), or similar, receiver module. In some implementations the geographical location element (2155) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (2100). In some implementations, the geographical location element (2155) may implement inertial navigation to track and determine the geographical location of the communication device using an initial set point and inertial measurement data.

It will be appreciated that the various systems and methods disclosed herein may be used in combination with one another. For example, the system (3010) shown in FIG. 1 may be used with elements of the system (10) shown in FIG. 14, and vice versa. The methods shown in the flow diagrams in FIGS. 5 and 33 may also be used in conjunction with one another, or selected parts, steps or elements of these methods may be used.

The foregoing description has been presented for the purpose of illustration; it is not intended to be exhaustive or to limit the disclosure to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations. Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method for controlling network traffic, the method being conducted at a destination controller accessible by a server computer, the method comprising:
receiving, by the destination controller, telemetry data from a plurality of network nodes managed by the server computer;
receiving, by the destination controller, a data transfer request originating from a user device that is connected to the destination controller;
accessing, by the destination controller, a list of stored network node addresses;
applying, by the destination controller, one or more rules to the list of network node addresses to identify a network node address pointing to a network node for handling network traffic originating from the user device that generated the data transfer request,
wherein the network node identified by the destination controller:
services the data transfer request; and
transmits updated telemetry data of the network node to the destination controller, the destination controller updating the list of network node addresses based on received updated telemetry data;
wherein the plurality of network nodes managed by the server computer is a plurality of application delivery controllers (ADCs);
wherein the network node identified by the destination controller is an ADC; and
wherein the method includes labelling each ADC or each network node and routing traffic to a disaster recovery service if the label associated with an ADC indicates failure or overload of a computing device at the ADC, or at the server that is managing that ADC.

2. The method as claimed in claim 1, wherein the list of network node addresses is stored in a destination pool which is accessible to the destination controller, and wherein the destination pool is a database including the list of addresses of at least some of the plurality of network nodes managed by the server computer.

3. The method as claimed in claim 1, wherein the method includes receiving a connection request originating from the network node that has a client interface thereat that generates the connection request as an outbound connection request from that network node to the server computer; and establishing, by the network node, a persistent data communication session between the client interface of the network node and the server computer.

4. The method as claimed in claim 3, wherein the client interface of each network node is operating system agnostic.

5. The method as claimed in claim 3, wherein the client interface of each network node is a thin client that occupies less than 100 megabytes, alternatively less than 10 megabytes of storage space on a memory associated with each network node.

6. The method as claimed in claim 3, wherein the client interface of each network node is configured, once a connection between the client interface of the network node and the server computer is lost, to automatically transmit another outbound connection request for the server computer to reconnect or re-establish the persistent data communication session.

7. The method as claimed in claim 6, wherein the client interface is configured to repetitively attempt to re-establish the persistent data communication session.

8. The method as claimed in claim 3, wherein the method includes: authenticating, by the server computer, the network node before establishing the persistent data communication session with the client interface of that network node.

9. The method as claimed in claim 1, wherein the telemetry data includes data relating to the ADC or data relating to the server computer which manages the network node or ADC; and wherein the telemetry data includes any one or more of:
data relating to a Transmission Control Protocol (TCP) keepalive state of the ADC, or of the server computer;
processing capabilities of the ADC, or of the server computer;
current processing capacity of the ADC or of the server computer;
whether the ADC is offline or online, or whether the server computer is offline or online;
geographical location of the ADC or of the server computer;
ADC response time or server computer response time;

number of requests per second, or number of requests that are able to be processed per second;

data relating to a central processing unit (CPU) of the ADC or of the server computer;

memory data of the ADC or of the server computer;

load data of the ADC or of the server computer; and error rate associated with the ADC or with the server computer.

10. The method as claimed in claim 1, wherein the method includes providing a plurality of server computers, each managing one or more ADCs.

11. The method as claimed in claim 10, wherein the one or more rules that are applied by the destination controller to the list includes any one or more of:

that load data, equilibrium data, or balance data of one or more of the ADCs or of one or more of the server computers is to be used in order to determine where to direct network traffic;

that a geographical location of the user device, the ADC, or of a server computer is to be used to determine where to direct network traffic; and that automatic ADC scaling is to be applied, whereby a number of ADCs used is increased or decreased automatically, based on load or traffic conditions or a number of data transfer requests received.

12. The method as claimed in claim 10, wherein the method includes implementing an artificial intelligence (AI) module in conjunction with the destination controller, and wherein the AI module is configured for accessing stored telemetry data from each ADC that is managed, and to react in response thereto, and performing one or more of the following:

routing traffic away from server computers that lack efficiency or that are off-line;

automatically increasing a number of ADCs to handle network traffic from one or more user devices; and increasing the number of allocated ADCs based on:
traffic patterns or statistics;
outages of ADCs or server computers; or
telemetry data of one or more other ADCs or network nodes.

13. The method as claimed in claim 1, wherein the method includes assigning additional ADCs to handle traffic if the telemetry data is indicative that one of the plurality of ADCs is overloaded or offline.

14. The method as claimed in claim 1, wherein the server computer is network node-agnostic.

15. The method as claimed in claim 1, wherein the server computer forms part of, or is connected to a customer cloud infrastructure that includes a plurality of other server computers that are arranged carry out steps of the method, and wherein the customer cloud infrastructure is in data communication with a control interface of the server computer using an application programming interface (API), or a representational state transfer (REST) API.

16. The method as claimed in claim 15, wherein the plurality of server computers are arranged in one or more server clusters to provide redundancy.

17. The method as claimed in claim 15, wherein the communications between the customer cloud infrastructure and the server computer, as well as between the server computer and a client interface of the network node is provided by a secure communications link.

18. A system for controlling network traffic, the system comprising:

a server computer in data communication with a plurality of network nodes, each of the network nodes including a client interface thereat;

a destination controller that is accessible by the server computer and that is configured for receiving telemetry data from the plurality of network nodes managed by the server computer, and receiving a data transfer request originating from a user device that is connected to the destination controller;

a database that includes a list of stored network node addresses, wherein the database is accessible by the destination controller and the destination controller is configured to apply one or more rules to the list of network node addresses to identify a network node address pointing to a network node for handling network traffic originating from the user device that generated the data transfer request, to cause the identified network node to service the data transfer request;

a list updating component which is configured to receive updated telemetry data from the identified network node and to update the list of network node addresses in the database with the received updated telemetry data;

wherein the server computer or the destination controller is configured to label each network node, wherein the label includes data relating to the telemetry data or data relating to a computing device associated with the network node; and wherein the system is configured for routing traffic to a disaster recovery service if the label associated with a network node indicates failure or overload of a computing device at that network node, or at the server that is managing that network node.

* * * * *